(12) United States Patent
Ikai et al.

(10) Patent No.: US 10,873,746 B2
(45) Date of Patent: Dec. 22, 2020

(54) INTRA PREDICTION IMAGE GENERATION DEVICE USING CROSS-COMPONENT LINER MODEL, IMAGE DECODING APPARATUS, AND IMAGE CODING APPARATUS USING SAME

(71) Applicants: SHARP KABUSHIKI KAISHA, Sakai (JP); FG Innovation Company Limited, Tuen Mun (HK)

(72) Inventors: Tomohiro Ikai, Sakai (JP); Yukinobu Yasugi, Sakai (JP); Yoshiya Yamamoto, Sakai (JP); Tomonori Hashimoto, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/470,901

(22) PCT Filed: Dec. 13, 2017

(86) PCT No.: PCT/JP2017/044672
§ 371 (c)(1),
(2) Date: Jun. 18, 2019

(87) PCT Pub. No.: WO2018/116925
PCT Pub. Date: Jun. 28, 2018

(65) Prior Publication Data
US 2019/0327466 A1 Oct. 24, 2019

(30) Foreign Application Priority Data
Dec. 21, 2016 (JP) ................................. 2016-248198

(51) Int. Cl.
*H04N 19/11* (2014.01)
*H04N 19/186* (2014.01)
(Continued)

(52) U.S. Cl.
CPC ........... *H04N 19/11* (2014.11); *H04N 19/176* (2014.11); *H04N 19/182* (2014.11);
(Continued)

(58) Field of Classification Search
CPC .... H04N 19/11; H04N 19/105; H04N 19/186; H04N 19/593
See application file for complete search history.

(56) References Cited

U.S. PATENT DOCUMENTS 10,477,240 B2 * 11/2019 Zhang .................... H04N 19/59
2015/0373349 A1 * 12/2015 Zhang .................. H04N 19/463
375/240.02

(Continued)

OTHER PUBLICATIONS

Qualcomm Incorporated, "Multiple Direct Modes for chroma intra coding", JVET-D0111, Joint Video Exploration Team (JVET) of ITU-T SG 16 WP 3 and ISO/IEC JTC 1/SC 29/WG 11 4th Meeting: Chengdu, CN, Oct. 15-21, 2016.
(Continued)

*Primary Examiner* — Jamie J Atala
*Assistant Examiner* — Michael Robert Cammarata
(74) *Attorney, Agent, or Firm* — ScienBiziP, P.C.

(57) ABSTRACT

An intra prediction image decoding apparatus is provided with a prediction parameter derivation circuitry that derives prediction parameters of multiple luminance blocks. A Cross-component Linear Model (CCLM) is used to specify the model and the prediction parameter is obtained, and thus an intra prediction image with reference to the prediction parameters is generated.

6 Claims, 32 Drawing Sheets

(51) Int. Cl.
*H04N 19/176* (2014.01)
*H04N 19/182* (2014.01)
*H04N 19/593* (2014.01)
*H04N 19/70* (2014.01)

(52) U.S. Cl.
CPC ......... *H04N 19/186* (2014.11); *H04N 19/593* (2014.11); *H04N 19/70* (2014.11)

(56) References Cited

U.S. PATENT DOCUMENTS

| | | | |
|---|---|---|---|
| 2016/0219283 A1* | 7/2016 | Chen | H04N 19/105 |
| 2017/0339404 A1* | 11/2017 | Panusopone | H04N 19/107 |
| 2017/0347095 A1* | 11/2017 | Panusopone | H04N 19/119 |
| 2017/0347096 A1* | 11/2017 | Hong | H04N 19/119 |
| 2017/0347103 A1* | 11/2017 | Yu | H04N 19/184 |
| 2018/0063531 A1* | 3/2018 | Hu | H04N 19/176 |
| 2018/0091825 A1* | 3/2018 | Zhao | H04N 19/593 |
| 2019/0104303 A1* | 4/2019 | Xiu | H04N 19/182 |

OTHER PUBLICATIONS

Qualcomm Incorporated, "Enhanced Cross-component Linear Model Intra-prediction", JVET-D0110, Joint Video Exploration Team (JVET) of ITU-T SG 16 WP 3 and ISO/IEC JTC 1/SC 29/WG 11 4th Meeting: Chengdu, CN, Oct. 15-21, 2016.

* cited by examiner

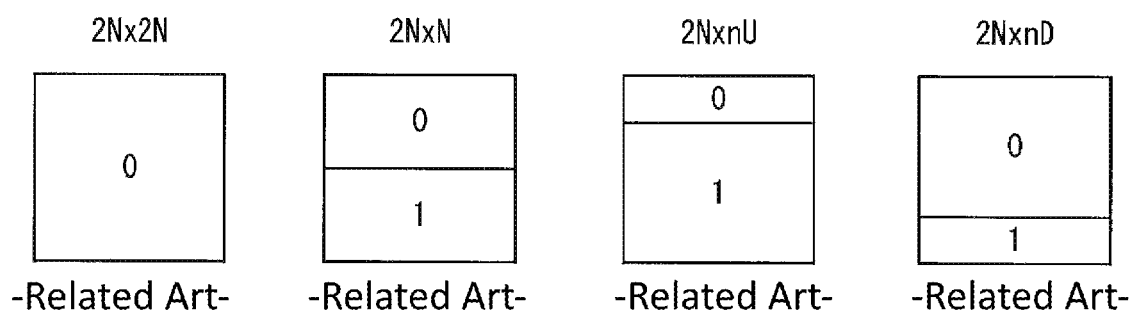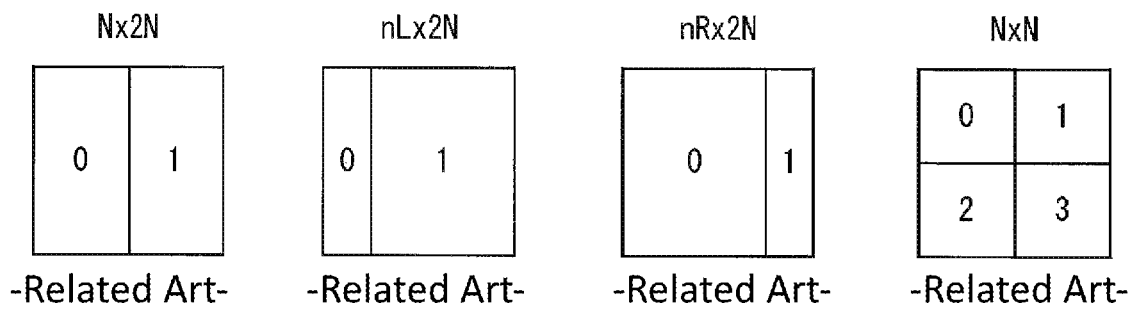

FIG. 4A  -Related Art-
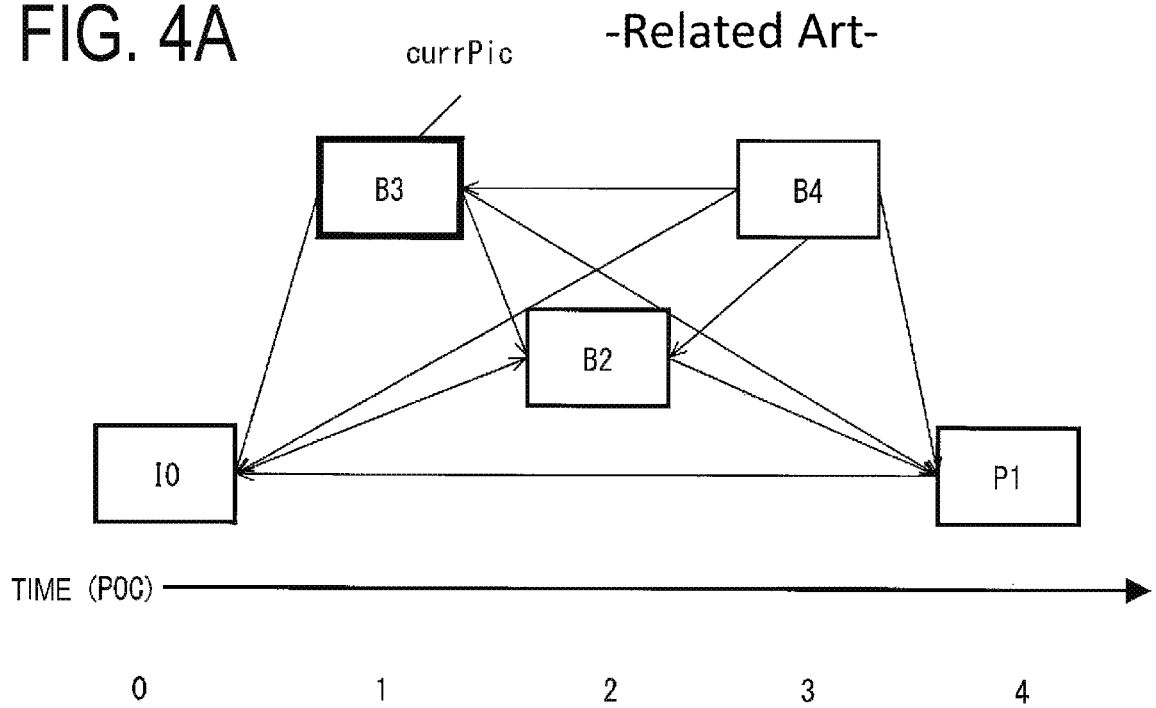
FIG. 4B -Related Art-
REFERENCE PICTURE LIST OF currPic (= B3)
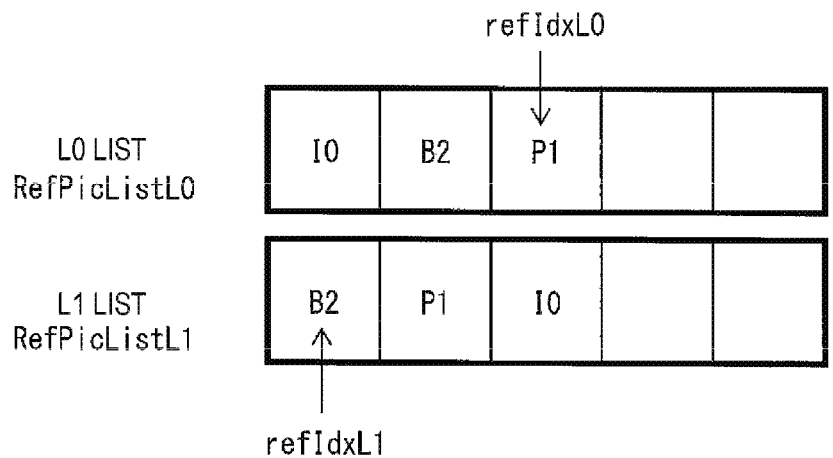

-Related Art-

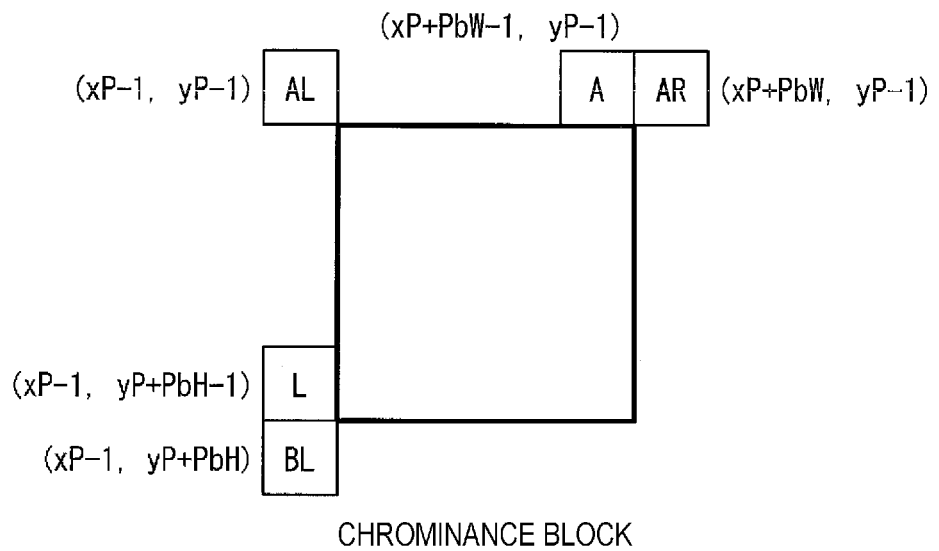
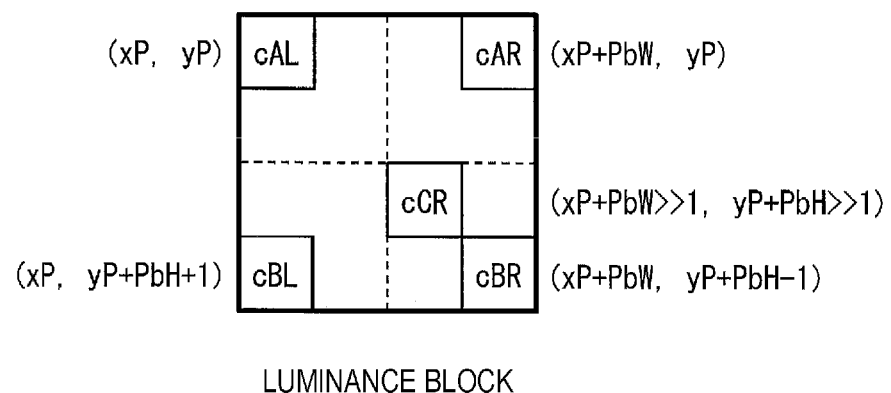
FIG. 12

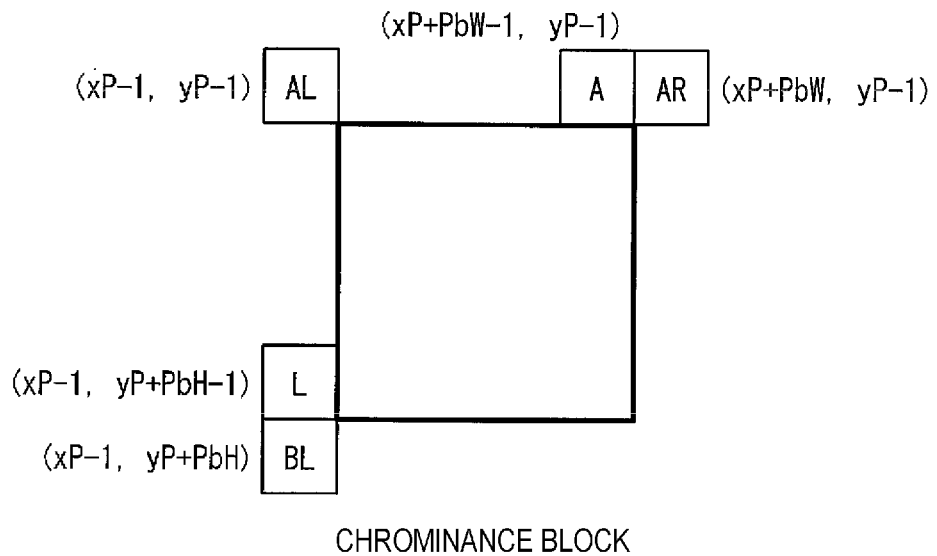
CHROMINANCE BLOCK
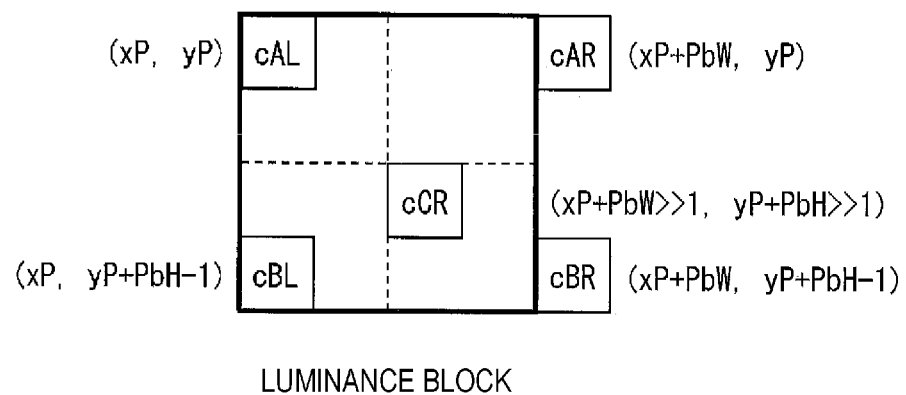
LUMINANCE BLOCK
FIG. 16

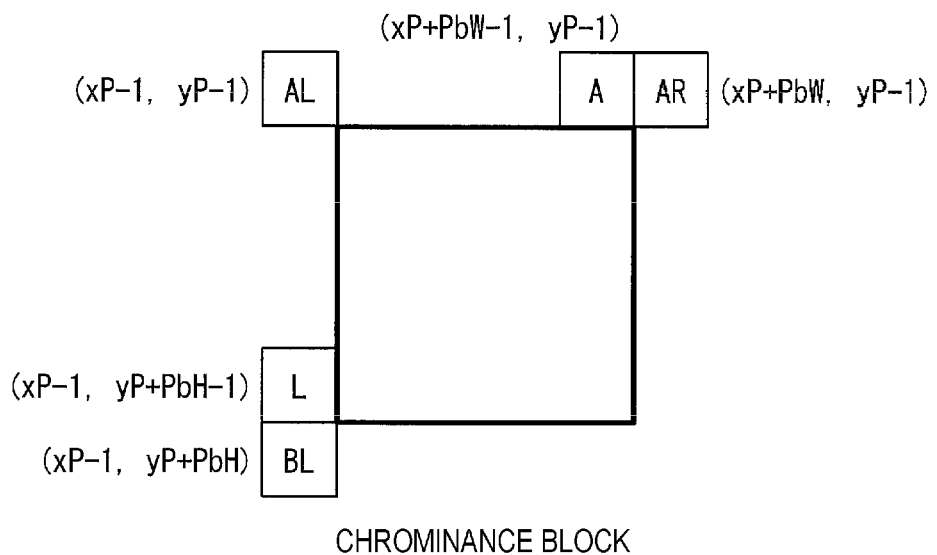
CHROMINANCE BLOCK
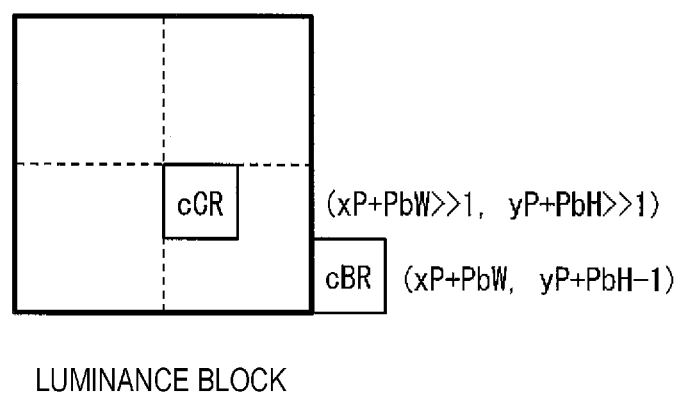
LUMINANCE BLOCK
FIG. 17

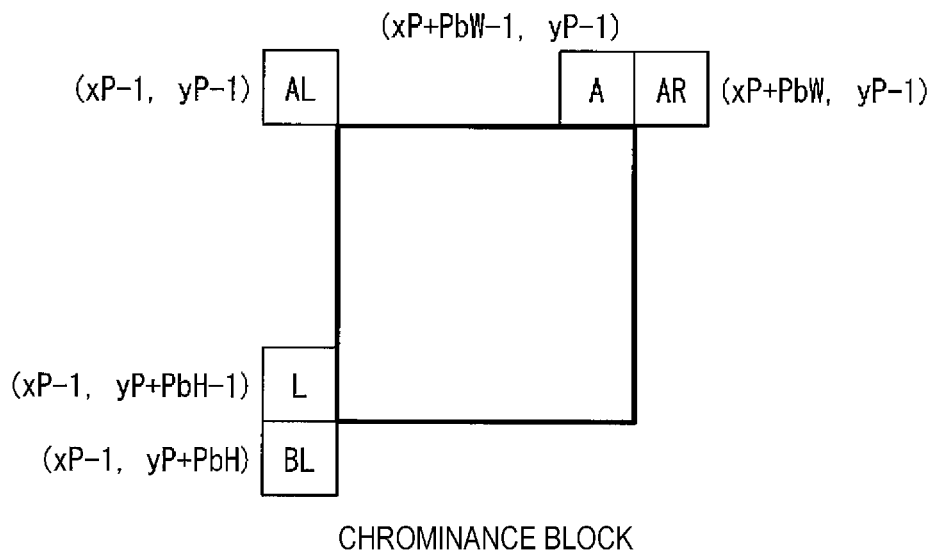
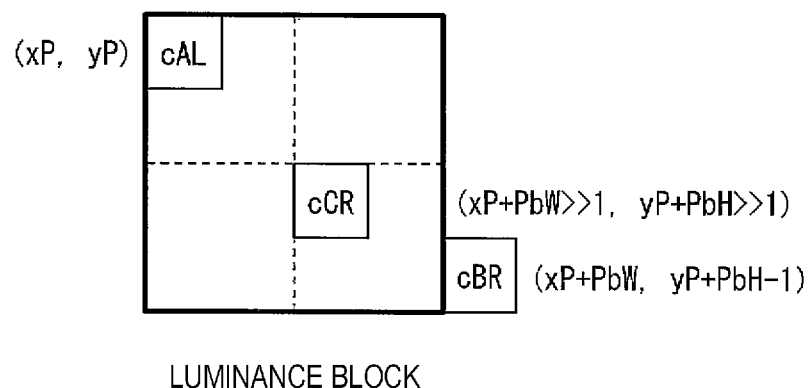
FIG. 18

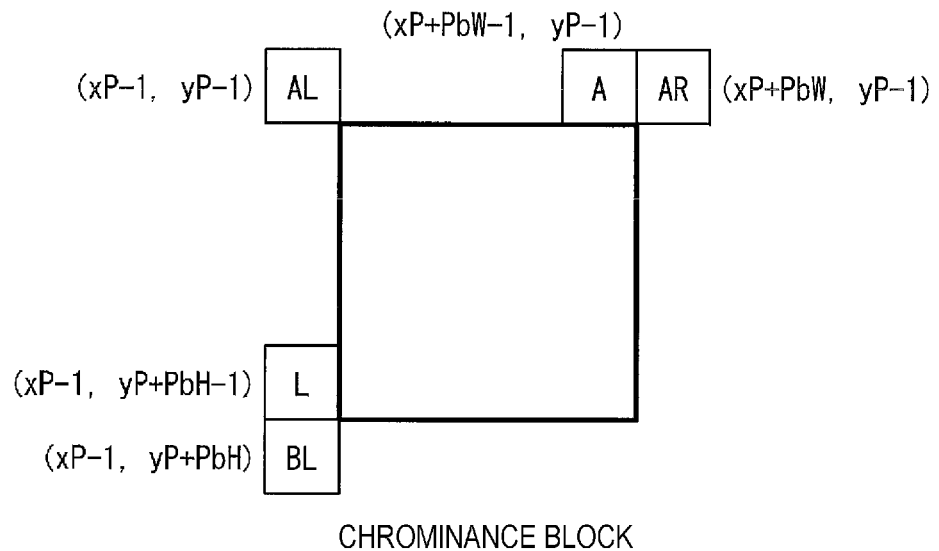
CHROMINANCE BLOCK
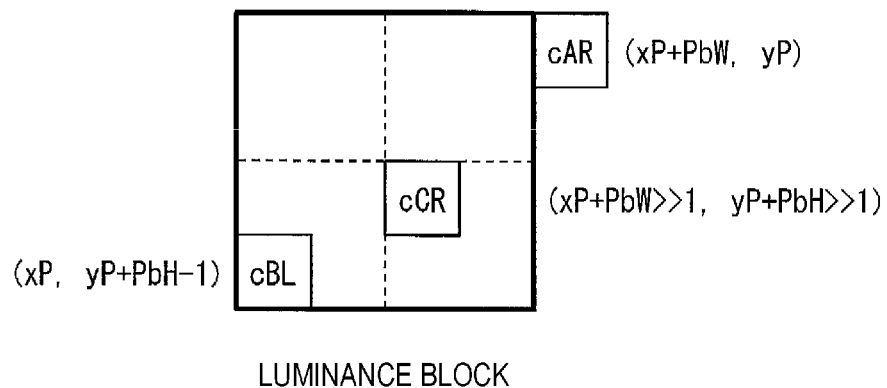
LUMINANCE BLOCK
FIG. 19

|    | x4 | x5 | x6 | x7 |
|----|----|----|----|----|
| x0 | refSamplesX[ ][ ] | | | |
| x1 | | | | |
| x2 | | | | |
| x3 | | | | |

|    | y4 | y5 | y6 | y7 |
|----|----|----|----|----|
| y0 | predSamplesY[ ][ ] | | | |
| y1 | | | | |
| y2 | | | | |
| y3 | | | | |

FIG. 25

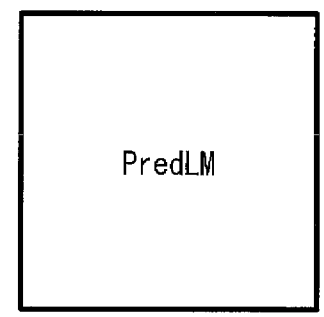
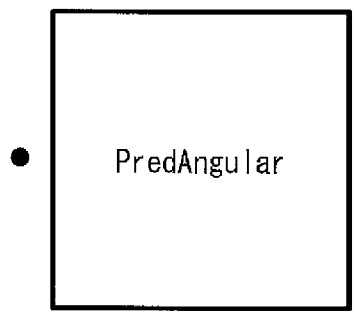
FIG. 27

INTRA PREDICTION IMAGE GENERATION DEVICE USING CROSS-COMPONENT LINER MODEL, IMAGE DECODING APPARATUS, AND IMAGE CODING APPARATUS USING SAME

TECHNICAL FIELD

The embodiments of the present invention relate to an intra prediction image generation apparatus, an image decoding apparatus, and an image coding apparatus.

BACKGROUND ART

An image coding apparatus which generates coded data by coding a video and an image decoding apparatus which generates decoded images by decoding the coded data are used to transmit and record a video efficiently.

For example, specific video coding schemes include methods suggested by H.264/AVC and High-Efficiency Video Coding (HEVC).

In such a video coding scheme, images (pictures) constituting a video are managed by a hierarchy structure including slices obtained by splitting images, units of coding (also referred to as Coding Unit (CUs)) obtained by splitting slices, prediction units (PUs) which are blocks obtained by splitting coding units, and transform units (TUs), and are coded/decoded for each CU.

In such a video coding scheme, a prediction image is generally generated based on local decoded images obtained by coding/decoding input images, and prediction residual (also referred to as "difference images" or "residual images") obtained by subtracting prediction images from input images (original image) is coded. Generation methods of prediction images include an inter-screen prediction (an inter prediction) and an intra-screen prediction (intra prediction).

In late years, as a split scheme of Coding Tree Units (CTUs) constituting a slice, BT split which splits CTUs in a binary tree is introduced in addition to QT split which splits CTUs in a quad tree. This BT split includes a horizontal split and a vertical split.

Examples of techniques of the recent video coding and decoding are described in NPL 1 and NPL 2. NPL 1 describes a Cross-component Linear Model (CCLM) which predicts a luminance image from a chrominance image using multiple models. NPL 2 describes a technique to derive prediction parameters of a chrominance block by using a luminance block and a chrominance block being independent trees.

CITATION LIST

Non Patent Literature

NPL 1: "Enhanced Cross-component Linear Model Intra-prediction", JVET-D0110, Joint Video Exploration Team (JVET) of ITU-T SG 16 WP 3 and ISO/IEC JTC PSC 29/WG 11 4th Meeting: Chengdu, C N, 15-21 Oct. 2016

NPL 2: "Multiple Direct Modes for chroma intra coding", WET-D0111, Joint Video Exploration Team CIVET) of ITU-T SG16 WP 3 and ISO/EC JTC 1/SC 29/WG 11 4th Meeting: Chengdu, C N, 15-21 Oct. 2016

SUMMARY OF INVENTION

Technical Problem

However, there is room for improvement in the generation of an intra prediction image of chrominance according to the related art. An object of an aspect of the present invention is to provide an intra prediction image generation apparatus that can improve coding efficiency in terms of generation of an intra prediction image of chrominance. An object of another aspect of the present invention is to provide an intra prediction image generation apparatus that can improve prediction accuracy while suppressing the complexity of computation processing during generation in terms of generation of an intra prediction image of chrominance.

Solution to Problem

An intra prediction image generation apparatus according to one aspect of the present invention, to solve the above mentioned problems, is an intra prediction image generation apparatus for generating an intra prediction image used for an intra prediction, the intra prediction image generation apparatus including: a prediction parameter derivation unit configured to derive a prediction parameter for each of multiple luminance blocks included in a target coding unit; a sub-block coordinate derivation unit configured to derive multiple sub-block coordinates in a chrominance block corresponding to the target coding unit; and a prediction image generation unit configured to generate, for each sub-block specified by each of the multiple sub-block coordinates derived by the sub-block coordinate derivation unit, the intra prediction image with reference to a prediction parameter derived for one of the multiple luminance blocks corresponding to one of the sub-blocks.

An intra prediction image generation apparatus according to one aspect of the present invention, to solve the above mentioned problems, is an intra prediction image generation apparatus for generating an ultra prediction image used for an intra prediction, the intra prediction image generation apparatus including: an MPM candidate list derivation unit configured to derive an MPM candidate list; a prediction parameter derivation unit configured to derive a prediction parameter for a chrominance block with reference to the MPM candidate list derived by the MPM candidate list derivation unit; and a prediction image generation unit configured to generate the intra prediction image with reference to the prediction parameter derived by the prediction parameter derivation unit, wherein the MPM candidate list includes a prediction parameter derived with reference to a neighboring luminance block next to, on a lower side in a processing order, a corresponding luminance block corresponding to the chrominance block.

An intra prediction image generation apparatus according to one aspect of the present invention, to solve the above mentioned problems, is a prediction image generation apparatus for generating an intra prediction image used for an intra prediction, the intra prediction image generation apparatus including: a prediction mode derivation unit configured to derive a chrominance prediction mode with reference to an MPM candidate list; and a prediction image generation unit configured to generate the prediction image with reference to the chrominance prediction mode derived by the prediction mode derivation unit, wherein in a case that a prediction mode derived by the prediction mode derivation unit is an intra block copy, the prediction image generation unit generates the prediction image with reference to a motion vector which has been derived as a luminance prediction mode.

An intra prediction image generation apparatus according to one aspect of the present invention, to solve the above mentioned problems, is an intra prediction image generation apparatus for generating an intra prediction image used for an intra prediction, the intra prediction image generation apparatus including: a first derivation unit configured to derive a first pixel value of a target pixel in a target color component by a linear prediction with reference to a pixel value of another color component previously, derived in the target pixel; a second derivation unit configured to derive a second pixel value of a target pixel by a directional prediction with reference to a pixel value around the target pixel which has been derived; and a prediction image generation unit configured to generate the prediction image with reference to the first pixel value and the second pixel value, wherein the prediction image generation unit includes a weight configuration unit configured to set a first weight to be multiplied by the first pixel value and a second weight to be multiplied by the second pixel value.

An intra prediction image generation apparatus according to one aspect of the present invention, to solve the above mentioned problems, is an intra prediction image generation apparatus for generating an intra prediction image used for an intra prediction, the intra prediction image generation apparatus including: a parameter derivation unit configured to derive a parameter used for a linear prediction to derive a pixel value of a target pixel in a target color component with reference to a pixel value of another color component previously derived in the target pixel; and a prediction image generation unit configured to generate the prediction image by the linear prediction using the parameters, wherein the parameter used by the prediction image generation unit is (1) the parameter derived by the parameter derivation unit with reference to a left neighboring region next to, on a left side, a target block including the target pixel, (2) the parameter derived by the parameter derivation unit with reference to a top neighboring region next to, on a top side, the target block, or (3) the parameter derived by the parameter derivation unit with reference to both the left neighboring region and the top neighboring region.

An intra prediction image generation apparatus according to one aspect of the present invention, to solve the above mentioned problems, is an intra prediction image generation apparatus for generating an intra prediction image used for an intra prediction, the intra prediction image generation apparatus including: a parameter derivation unit configured to derive a parameter used for a linear prediction to derive a pixel value of a target pixel in a target color component with reference to a pixel value of another color component previously derived in the target pixel; and a prediction image generation unit configured to generate a prediction image by the linear prediction using the parameters, wherein the parameter derivation unit divides reference pixels included in neighboring regions next to a target block including the target pixel into multiple sets, and derives the parameters by using the reference pixels, the number of which is a number resulting from exponential multiplication with base 2, that are included in each of the multiple sets.

An intra prediction image generation apparatus according to one aspect of the present invention, to solve the above mentioned problems, is an intra prediction image generation apparatus for generating an intra prediction image used for an intra prediction, the intra prediction image generation apparatus including: a parameter derivation unit configured to derive a parameter used for a linear prediction to derive a pixel value of a target pixel in a target color component with reference to a pixel value of another color component previously derived in the target pixel; and a prediction image generation unit configured to generate a prediction image by the linear prediction using the parameters, wherein the parameter derivation unit divides reference pixels included in neighboring regions next to a target block including the target pixel into multiple sets, adds at least one reference pixel to a set(s) where the number of the reference pixels is not a number resulting from exponential multiplication with base 2, and then derives the parameters.

Advantageous Effects of Invention

According to an aspect of the present invention, an effect is exhibited in which coding efficiency can be improved in terms of generation of an intra prediction image of chrominance. According to another aspect of the present invention, an effect is exhibited in which prediction accuracy can be improved while suppressing the complexity of the computation processing during generation in terms of generating an intra prediction image of chrominance.

BRIEF DESCRIPTION OF DRAWINGS

FIGS. 3A to 3H are diagrams illustrating patterns of PU split modes. FIGS. 3A to 3H indicate partition shapes in cases that PU split modes are 2N×2N, 2N×N, 2N×nU, 2N×nD, N×2N, nL×2N, nR×2N, and N×N, respectively.

FIGS. 4A and 4B are conceptual diagrams illustrating an example of reference pictures and reference picture lists.

FIG. 12 is a schematic diagram to describe prediction modes included in an MPM candidate list derived by an MPM candidate list derivation unit in the intra prediction parameter coding unit illustrated in FIG. 10 and in the intra prediction parameter decoding unit illustrated in FIG. 11.

FIG. 16 is a diagram illustrating an example of reference points of the MPM candidate list.

FIG. 17 is a diagram illustrating another example of the reference points of the MPM candidate list.

FIG. 18 is a diagram illustrating still another example of the reference points of the MPM candidate list.

FIG. 19 is the diagram illustrating yet another example of the reference points of the MPM candidate list.

FIG. 25 is a diagram for describing pixels to refer to in the derivation of CCLM prediction parameters.

FIG. 27 is a diagram illustrating an example of weights configured for each prediction image in adding a prediction image derived by CCLM prediction and a prediction image derived by directional prediction together to derive a prediction image.

FIG. 35A illustrates the transmitting apparatus equipped with the image coding apparatus, and FIG. 35B illustrates the receiving apparatus equipped with the image decoding apparatus.

FIG. 36A illustrates the recording apparatus equipped with the image coding apparatus, and FIG. 36B illustrates the regeneration apparatus equipped with the image decoding apparatus.

DESCRIPTION OF EMBODIMENTS

Embodiment 1

Embodiments of the present invention will be described below with reference to the drawings.

Figure 1:
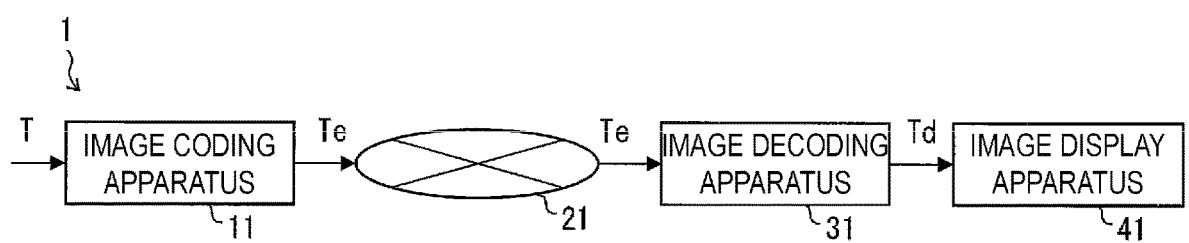
FIG. 1 is a schematic diagram illustrating a configuration of an image transmission system according to Embodiment 1.

FIG. 1 is a schematic diagram illustrating a configuration of an image transmission system 1 according to the present embodiment.

The image transmission system 1 is a system configured to transmit codes of a coding target image having been coded, decode the transmitted codes, and display the image. The image transmission system 1 is configured to include an image coding apparatus 11, a network 21, an image decoding apparatus 31, and an image display apparatus 41.

An image T indicating an image of a single layer or multiple layers is input to the image coding apparatus 11. A layer is a concept used to distinguish multiple pictures in a case that there are one or more pictures to configure a certain time. For example, coding identical pictures in multiple layers having different image qualities and resolutions is scalable coding, and coding pictures having different viewpoints in multiple layers is view scalable coding. In a case of performing a prediction (an inter-layer prediction or an inter-view prediction) between pictures in multiple layers, the coding efficiency greatly improves. In a case of not performing a prediction or in a case of (simulcast), the coded data can be compiled.

The network 21 transmits a coding stream Te generated by the image coding apparatus 11 to the image decoding apparatus 31. The network 21 is the internet, a Wide Area Network (WAN), a Local Area Network (LAN), or a combination thereof. The network 21 is not necessarily a bidirectional communication network, but may be a unidirectional communication network configured to transmit broadcast waves such as digital terrestrial television broadcasting and satellite broadcasting. The network 21 may be substituted by a storage medium that records the coding stream Te, such as a Digital Versatile Disc (DVD) and a Blue-ray Disc (BD).

The image decoding apparatus 31 decodes each of coding streams Te transmitted by the network 21, and generates one or multiple decoded images Td.

The image display apparatus 41 displays all or part of the one or multiple decoded images Td generated by the image decoding apparatus 31. For example, the image display apparatus 41 includes a display device such as a liquid crystal display and an organic Electro-luminescence (EL) display. In spacial scalable coding or SNR scalable coding, in a case that the image decoding apparatus 31 and the image display apparatus 41 have high processing capability, enhanced layer images having high image qualities are displayed, or in a case of having lower processing capability, base layer images which do not require as high processing capability and display capability as the enhanced layer are displayed.

Operator

Operators used herein will be described below.

$\gg$ is a right bit shift, $\ll$ is a left bit shift, & is a bitwise AND, | is bitwise OR, and |= is a sum operation (OR) with another condition.

x?y:z is a ternary operator to take y in a case that x is true (other than 0), and take z in a case that x is false (0).

Clip3 (a, b, c) is a function to clip c in a value equal to or greater than a and equal to or less than b, and a function to return a in a case that c is less than a (c<a), return b in a case that c is greater than b (c>b), and return c otherwise (however, a is equal to or less than b (a<=b)).

Structure of Coding Stream Te

Prior to the detailed descriptions of the image coding apparatus 11 and the image decoding apparatus 31 according to the present embodiment, the data structure of the coding stream Te generated by the image coding apparatus 11 and decoded by the image decoding apparatus 31 will be described.

Figure 2:
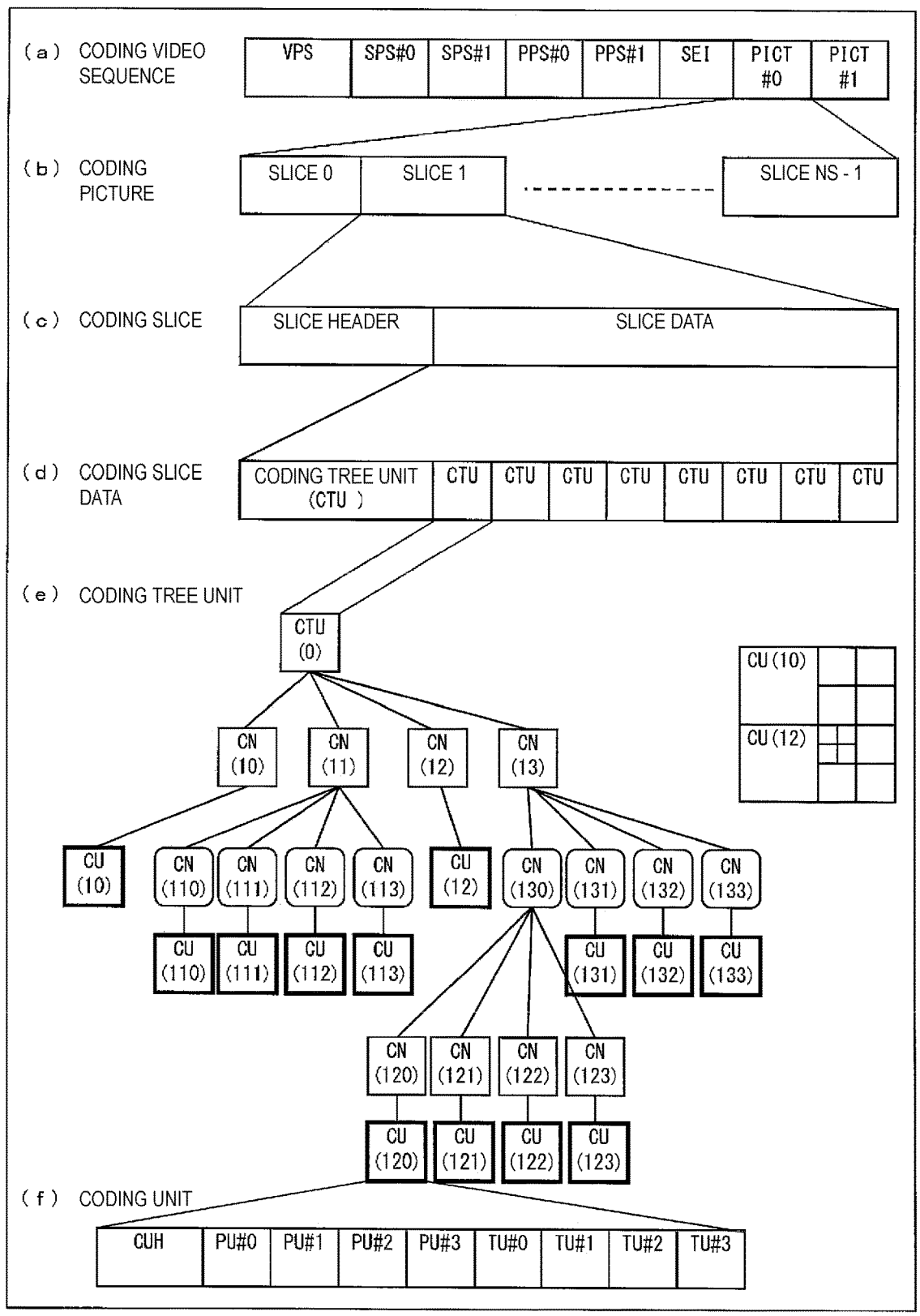
FIG. 2 is a diagram illustrating a hierarchy structure of data of a coding stream according to Embodiment 1.

FIG. 2 is a diagram illustrating the hierarchy structure of data in the coding stream Te. The coding stream Te includes a sequence and multiple pictures constituting a sequence illustratively. FIG. 2 is a diagram illustrating a coding video sequence prescribing a sequence SEQ, a coding picture prescribing a picture PICT, a coding slice prescribing a slice S, coding slice data prescribing slice data, coding tree units included in coding slice data, and Coding Units (CUs) included in a coding tree unit, respectively.

Coding Video Sequence

In the coding video sequence, a set of data referred to by the image decoding apparatus 31 to decode the sequence SEQ of the processing target is prescribed. As illustrated in part (a) of FIG. 2, the sequence SEQ includes a Video Parameter Set, a Sequence Parameter Set SPS, a Picture Parameter Set PPS, a picture PICT, and Supplemental Enhancement Information SEI. Here, values indicated after # indicate layer IDs. In FIG. 2, although the example where coded data of #0 and #1, in other words, layer 0 and layer 1 exists is illustrated, types of layers and the number of layers are not limited to this.

In a video parameter set VPS, in a video constituted by multiple layers, a set of coding parameters common to multiple videos and a set of coding parameters related to multiple layers and an individual layer included in a video are prescribed.

In a sequence parameter set SPS, a set of coding parameters referred to by the image decoding apparatus 31 to decode the target sequence is prescribed. For example, the width and the height of the picture are prescribed. Note that multiple SPSs may exist. In that case, any of multiple SPSs is selected by PPSs.

In a picture parameter set PPS, a set of coding parameters referred to by the image decoding apparatus 31 to decode each picture in the target sequence is prescribed. For example, a reference value (pic_init_qp_minus26) of the quantization step size used for decoding of the picture and a flag (weighted_pred_flag) indicating an application of a weighted prediction are included. Note that multiple PPSs may exist. In that case, any of multiple PPSs is selected by each picture in the target sequence.

Coding Picture

In a coding picture, a set of data referred to by the image decoding apparatus 31 to decode a picture PICT of the processing target is prescribed. As illustrated in part (b) of FIG. 2, the picture PICT includes slices S0 to $S_{NS-1}$ (NS is the total number of slices included in the picture PICT).

Note that in a case not necessary to distinguish the slices S0 to $S_{NS-1}$, subscripts of reference signs may be omitted and described below. The same applies to data included in the coding stream Te described below and described with subscripts added.

Coding Slice

In a coding slice, a set of data referred to by the image decoding apparatus 31 to decode a slice S of the processing target is prescribed. As illustrated in part (c) FIG. 2, the slice S includes a slice header SH and slice data SDATA.

The slice header SH includes a coding parameter group referred to by the image decoding apparatus 31 to determine the decoding method of the target slice. Slice type specification information (slice_type) to specify the slice type is one example of a coding parameter included in the slice header SH.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like.

Note that, the slice header SH may include a reference (pic_parameter_set_id) to the picture parameter set PPS included in the coding video sequence.

Coding Slice Data

In coding slice data, a set of data referred to by the image decoding apparatus 31 to decode slice data SDATA of the processing target is prescribed. As illustrated in part (d) of FIG. 2, the slice data SDATA includes Coding Tree Units (CTUs). A CTU is a fixed size (for example, 64×64) rectangle constituting a slice, and may be referred to as a Largest Coding Unit (LCU).

Coding Tree Unit

As illustrated in part (e) FIG. 2, a set of data referred to by the image decoding apparatus 31 to decode a coding tree unit of the processing target is prescribed. The coding tree unit is split by recursive quad tree splits (QT splits) or binary tree splits (BT splits). Nodes of the tree structure obtained by the recursive quad tree splits or binary tree splits are referred to as Coding Nodes (CNs). Intermediate nodes of quad trees and binary trees are Coding Trees (CTs), and the coding tree unit itself is also prescribed as the highest coding tree.

The CTU includes a QT split flag (cu_split_flag) indicating whether or not to perform the QT split, and a BT split mode (split_bt_mode) indicating the split method of the BT split. In a case that cu_split_flag is 1, the CN is split into four coding nodes CNs. In a case that cu_split_flag is 0, the coding node CN is not split, but has one Coding Unit (CU) as a node. On the other hand, in a case that split_bt_mode is 2, the CN is split horizontally into two coding nodes CNs. In a case that split_bt_mode is 1, the CN is split vertically into two coding nodes CNs. In a case that split_bt_mode is 0, the coding node CN is not split, but has one coding unit CU as a node. A coding unit CU is an end node of the coding tree, and is not split anymore. The coding unit CU is a basic unit of coding processing.

For example, in a case that the size of the coding tree unit CTU is 64×64 pixels, a size of the coding unit which can be taken is any of 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, and 8×8 pixels. However, depending on the number of times and combinations of splits, constraints related to sizes of the coding unit, and the like, sizes other than these can be also taken.

Coding Unit

As illustrated in part (f) of FIG. 2, a set of data referred to by the image decoding apparatus 31 to decode a coding unit of the processing target is prescribed. Specifically, the coding unit is constituted by a prediction tree, a transform tree, and a CU header CUH. In the CU header, the prediction mode, the split method (PU split mode), and the like are prescribed.

In a prediction tree, prediction information (a reference picture index, a motion vector, and the like) of each prediction unit (PU) where the coding unit is split into one or multiple is prescribed. In another expression, the prediction unit is one or multiple non-overlapping regions constituting the coding unit. The prediction tree includes one or multiple prediction units obtained by the above-mentioned split. Note that, a unit of prediction where the prediction unit is further split is referred to as a "subblock" below. The subblock is constituted by multiple pixels. In a case that sizes of the prediction unit and the subblock are the same, there is one subblock in the prediction unit. In a case that the prediction unit is larger than the size of the subblock, the prediction unit is split into subblocks. For example, in a case that the prediction unit is 8×8, and the subblock is 4×4, the prediction unit is split into four subblocks formed by two horizontal splits and two vertical splits. Note that the split to sub-blocks may be performed with reference to the split flag, or may be performed by deriving respective sub-block coordinates without referring to the split flag. A prediction processing may be performed for each of the prediction units (subblocks).

Generally speaking, there are two types of split in the prediction tree including a case of an intra prediction and a case of an inter prediction. The intra prediction is a prediction in the same picture, and the inter prediction refers to a prediction processing performed between mutually different pictures (for example, between display times or between layer images).

In the case of the intra prediction, the split method includes 2N×2N (the same size as the coding unit) and N×N. In the case of the inter prediction, the split method includes coding by the PU partition mode (part_mode) of the coded data, and includes 2N×2N (the same size as the coding unit), 2N×N, 2N×nU, 2N×nD, N×2N, nL×2N, nR×2N and N×N, and the like. Note that 2N×N and N×2N indicate a symmetric split of 1:1, and 2N×nU, 2N×nD and nL×2N, nR×2N indicate an asymmetry split of 1:3 and 3:1. PUs included in the CU are expressed as PU0, PU1, PU2, and PU3 sequentially.

FIGS. 3A to 3H illustrate shapes of partitions in respective PU split modes (positions of boundaries of PU splits) specifically. FIG. 3A indicates a partition of 2N×2N, and FIGS. 3B, 3C, and 3D indicate partitions (horizontally long partitions) of 2N×N, 2N×nU, and 2N×nD, respectively. FIGS. 3E, 3F, and 3G indicate partitions (vertically long partitions) in cases of N×2N, nL×2N, and nR×2N, respectively, and FIG. 3H indicates a partition of N×N. Note that horizontally long partitions and vertically long partitions are collectively referred to as rectangular partitions, and 2N×2N and N×N are collectively referred to as square partitions.

In the transform tree, the coding unit is split into one or multiple transform units, and the position and the size of each transform unit are prescribed. In another expression, the transform unit is one or multiple non-overlapping regions constituting the coding unit. The transform tree includes one or multiple transform units obtained by the above-mentioned splits.

The splits in the transform tree include those to allocate regions that are in the same size as the coding unit as the transform unit, and those by recursive quad tree splits similar to the above-mentioned splits of CUs. The transform processing is performed for each of these transform units.

Prediction Parameter

A prediction image of Prediction Units (PUs) is derived by prediction parameters attached to the PUs. The prediction parameters include prediction parameters of the intra prediction or prediction parameters of the inter prediction. The prediction parameters of the inter prediction (inter prediction parameters) will be described below. The inter prediction parameters are constituted by prediction list utilization flags predFlagL0 and predFlagL1, reference picture indexes refIdxL0 and refIdxL1, and motion vectors mvL0 and mvL1. The prediction list utilization flags predFlagL0 and predFlagL1 are flags to indicate whether or not reference picture lists referred to as L0 list and L1 list respectively are used, and the corresponding reference picture lists are used in a case that the value is 1. Note that in a case that the present specification mentions "a flag indicating whether or not XX", a flag being other than 0 (for example, 1) is assumed as a case of XX and a flag being 0 is assumed as a case of not XX, and 1 is treated as true and 0 is treated as false in a logical negation, a logical product, and the like (the same is applied below). However, other values can be used for true values and false values in actual apparatuses and methods.

For example, syntax elements to derive the inter prediction parameters included in coded data include a PU partition mode part_mode, a merge flag merge_flag, a merge index merge_idx, an inter prediction indicator inter_pred_idc, a reference picture index refIdxLX, a prediction vector index mvp_LX_idx, and a difference vector mvdLX.

Reference Picture List

A reference picture list is a list constituted by reference pictures stored in a reference picture memory 306. FIGS. 4A and 4B are conceptual diagrams illustrating an example of reference pictures and reference picture lists. In FIG. 4A, the rectangles indicate pictures, the arrows indicate reference relationships of pictures, the horizontal axis indicates time, each of I, P, and B in the rectangles indicates an intra-picture, a uni-prediction picture, a hi-prediction picture, and the numbers in the rectangles indicate the decoding order. As illustrated, the decoding order of the pictures is I0, P1, B2, B3, and B4, and the display order is I0, B3, B2, B4, and P1. FIG. 4B indicates an example of reference picture lists. The reference picture lists are lists to represent candidates of reference pictures, and one picture (slice) may include one or more reference picture lists. In the illustrated example, the target picture B3 includes two reference picture lists, i.e., the L0 list RefPicList0 and the L1 list RefPicList1. In a case that the target picture is B3, the reference pictures are I0, P1, and B2, the reference pictures include these pictures as elements. For an individual prediction unit, which picture in a reference picture list RefPicListX is actually referred to is specified with a reference picture index refIdxLX. The diagram indicates an example where reference pictures P1 and B2 are referred to by refIdxL0 and refIdxL1.

Merge Prediction and AMVP Prediction

Decoding (coding) methods of prediction parameters include a merge prediction (merge) mode and an Adaptive Motion Vector Prediction (AMVP) mode, and a merge flag merge_flag is a flag to identify them. The merge prediction mode is a mode to use prediction parameters of neighboring PUs already processed without including a prediction list utilization flag predFlagLX (or an inter prediction indicator inter_pred_idc), a reference picture index refIdxLX, and a motion vector mvLX in coded data, and the AMVP mode is a mode to include an inter prediction indicator inter_pred_idc, a reference picture index refIdxLX, a motion vector mvLX in coded data. Note that the motion vector mvLX is coded as a prediction vector index mvp_LX_idx identifying a prediction vector mvpLX and a difference vector mvdLX.

The inter prediction indicator inter_pred_idc is a value indicating the type and the number of reference pictures, and takes any value of PRED_L0, PRED_L1, and PRED_BI. PRED_L0 and PRED_L1 indicate to use reference pictures managed in the reference picture lists of the L0 list and the L1 list respectively, and indicate to use one reference picture (uni-prediction). PRED_BI indicates to use two reference pictures (bi-prediction BiPred), and use reference pictures managed in the L0 list and the L1 list. The prediction vector index mvp_LX_idx is an index indicating a prediction vector, and the reference picture index refIdxLX is an index indicating reference pictures managed in a reference picture list. Note that LX is a description method used in a case of not distinguishing the L0 prediction and the L1 prediction, and distinguishes parameters for the L0 list and parameters for the L1 list by replacing LX with L0 or L1.

The merge index merge_idx is an index to indicate to use either prediction parameter as a prediction parameter of the decoding target PU among prediction parameter candidates (merge candidates) derived from PUs for which the processing is completed.

Motion Vector

The motion vector mvLX indicates a gap quantity between blocks in two different pictures. A prediction vector and a difference vector related to the motion vector mvLX is referred to as a prediction vector mvpLX and a difference vector mvdLX respectively.

Inter Prediction indicator inter_pred_idc and Prediction List Utilization Flag predFlagLX Relationships between an inter prediction indicator inter_pred_idc and prediction list utilization flags predFlagL0 and predFlagL1 are as follows, and those can be converted mutually.

inter_pred_idc=(predFlagL1<<1)+predFlagL0 predFlagL0=inter_pred_idc & 1 predFlagL1=inter_pred_idc>>1

Note that an inter prediction parameter may use a prediction list utilization flag or may use an inter prediction indicator. The determination using the prediction list utilization flag may be replaced with the determination using the inter prediction indicator. On the contrary, the determination using the inter prediction indicator may be replaced with the determination using the prediction list utilization flag.

Determination of Bi-Prediction biPred

A flag biPred of whether or not a hi-prediction BiPred can be derived from whether or not two prediction list utilization flags are both 1. For example, the flag can be derived by the following equation.

biPred=(predFlagL0==1 && predFlagL1==1)

The flag biPred can be also derived from whether an inter prediction indicator is a value indicating to use two prediction lists (reference pictures), For example, the flag can be derived by the following equation.

biPred=(inter_pred_idc==PRED_BI)?1:0

The equation can be also expressed by following equation.

biPred=(inter_pred_idc==PRED_BI)

Note that, for example, PRED_BI can use the value of 3.

Configuration of Image Decoding Apparatus

Figure 5:
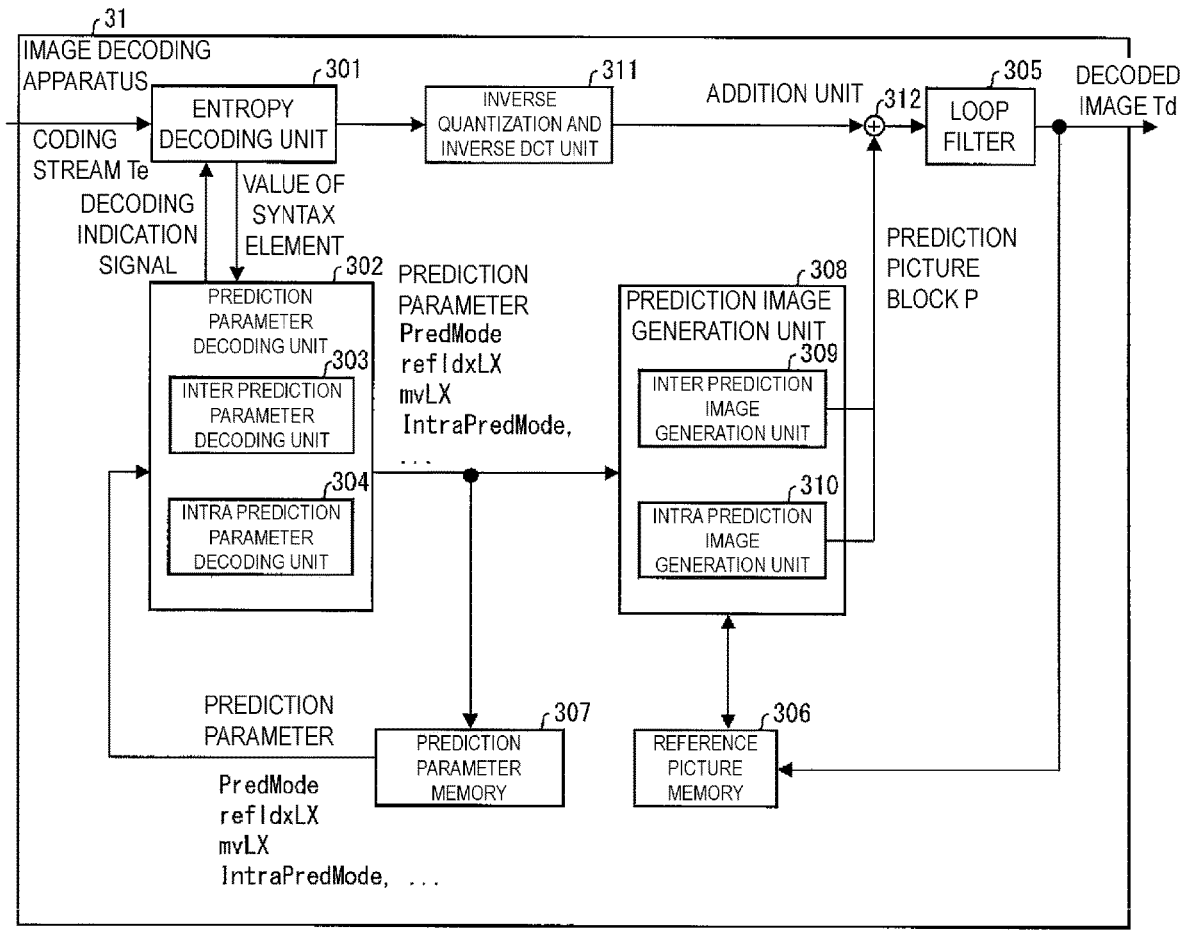
FIG. 5 is a block diagram illustrating a configuration of an image decoding apparatus according to Embodiment 1.

The configuration of the image decoding apparatus 31 according to the present embodiment will now be described. FIG. 5 is a block diagram illustrating the configuration of the image decoding apparatus 31 according to the present embodiment. The image decoding apparatus 31 is configured to include an entropy decoding unit 301, a prediction parameter decoding unit (a prediction image decoding apparatus) 302, a loop filter 305, a reference picture memory 306, a prediction parameter memory 307, a prediction image generation unit (a prediction image generation apparatus) 308, an inverse quantization and inverse DCT unit 311, and an addition unit 312.

The prediction parameter decoding unit 302 is configured to include an inter prediction parameter decoding unit 303 and an intra prediction parameter decoding unit 304. The prediction image generation unit (an intra prediction image generation apparatus) 308 is configured to include an inter prediction image generation unit 309 and an intra prediction image generation unit 310.

The entropy decoding unit 301 performs entropy decoding on the coding stream Te input from the outside, and separates and decodes individual codes (syntax elements). Separated codes include prediction information to generate a prediction image and residual information to generate a difference image, and the like.

The entropy decoding unit 301 outputs part of the separated codes to the prediction parameter decoding unit 302. For example, part of the separated codes includes a prediction mode predMode, a PU partition mode part_mode, a merge flag merge_flag, a merge index merge_idx, an inter prediction indicator inter_pred_idc, a reference picture index refIdxLX, a prediction vector index mvp_LX_idx, and a difference vector mvdLX. The control of which code to decode is performed based on the indication of the prediction parameter decoding unit 302. The entropy decoding unit 301 outputs quantization coefficients to the inverse quantization and inverse DCT unit 311. These quantization coefficients are coefficients obtained by performing Discrete Cosine Transform (DCT) on residual signals to quantize in coding process.

The inter prediction parameter decoding unit 303 decodes inter prediction parameters with reference to prediction parameters stored in the prediction parameter memory 307 based on codes input from the entropy decoding unit 301.

The inter prediction parameter decoding unit 303 outputs decoded inter prediction parameters to the prediction image generation unit 308, and also stores the decoded inter prediction parameters in the prediction parameter memory 307. The details of the inter prediction parameter decoding unit 303 will be described below.

The intra prediction parameter decoding unit 304 decodes ultra prediction parameters with reference to prediction parameters stored in the prediction parameter memory 307 based on codes input from the entropy decoding unit 301. The intra prediction parameters are parameters used in processing to predict CUs in one picture, for example, an intra prediction mode IntraPredMode. The intra prediction parameter decoding unit 304 outputs decoded intra prediction parameters to the prediction image generation unit 308, and also stores the decoded intra prediction parameters in the prediction parameter memory 307.

The intra prediction parameter decoding unit 304 may derive different intra prediction modes for luminance and chrominance. In this case, the intra prediction parameter decoding unit 304 decodes a luminance prediction mode IntraPredModeY as a prediction parameter of luminance, and decodes a chrominance prediction mode IntraPredModeC as a prediction parameter of chrominance. The luminance prediction mode IntraPredModeY includes 35 modes, and corresponds to a planar prediction (0), a DC prediction (1), directional predictions (2 to 34). The chrominance prediction mode IntraPredModeC uses any of a planar prediction (0), a DC prediction (1), directional predictions (2 to 34), and a LM mode (35). The intra prediction parameter decoding unit 304 may decode a flag indicating whether IntraPredModeC is a mode same as the luminance mode, assign IntraPredModeY to IntraPredModeC in a case of indicating that the flag is the mode same as the luminance mode, and decode a planar prediction (0), a DC prediction (1), directional predictions (2 to 34), and a LM mode (35) as IntraPredModeC in a case of indicating that the flag is a mode different from the luminance mode.

The loop filter 305 applies a filter such as a deblocking filter, a sample adaptive offset (SAO), and an adaptive loop filter (ALF) on a decoded image of a CU generated the addition unit 312.

The reference picture memory 306 stores the decoded image of the CU generated by the addition unit 312 in a prescribed position for each picture and CU of the decoding target.

The prediction parameter memory 307 stores prediction parameters in prescribed positions for each picture and prediction unit (or a subblock, a fixed size block, and a pixel) of the decoding target. Specifically, the prediction parameter memory 307 stores inter prediction parameters decoded by the inter prediction parameter decoding unit 303, intra prediction parameters decoded by the intra prediction parameter decoding unit 304 and a prediction mode pred-Mode separated by the entropy decoding unit 301. For example, the inter prediction parameters stored include a prediction list utilization flag predFlagLX (an inter prediction indicator inter_pred_idc), a reference picture index refIdxLX, and a motion vector mvLX.

To the prediction image generation unit 308, a prediction mode predMode input from the entropy decoding unit 301 is input, and prediction parameters are input from the prediction parameter decoding unit 302. The prediction image generation unit 308 reads reference pictures from the reference picture memory 306. The prediction image generation unit 308 generates prediction images of PUs using prediction parameters input and reference pictures read with the prediction mode indicated by the prediction mode pred-Mode.

Here, in a case that the prediction mode predMode indicates the inter prediction mode, the inter prediction image generation unit 309 generates prediction images of PUs by the inter prediction using inter prediction parameters input from the inter prediction parameter decoding unit 303 and reference pictures read.

For a reference picture list (the L0 list or the L1 list) where the prediction list utilization flag predFlagLX is 1, the inter prediction image generation unit 309 reads reference picture blocks from the reference picture memory 306 in positions indicated by the motion vector mvLX, based on the decoding target PU from reference pictures indicated by the reference picture index refIdxLX. The inter prediction image generation unit 309 performs a prediction based on reference picture blocks read and generates a prediction image of PUs. The inter prediction image generation unit 309 outputs the generated prediction image of the PUs to the addition unit 312.

In a case that the prediction mode predMode indicates the intra prediction mode, the intra prediction image generation unit 310 performs the intra prediction using intra prediction parameters input from the intra prediction parameter decoding unit 304 and reference pictures read. Specifically, the intra prediction image generation unit 310 reads neighboring PUs, which are pictures of the decoding target, in the prescribed range from the decoding target PU among PUs already decoded, from the reference picture memory 306. The prescribed range is, for example, any of the neighboring PUs of at the left, the top left, the top, and the top right in a case that the decoding target PU shifts in the order of the so-called raster scan sequentially, and varies according to intra prediction modes. The order of the raster scan is the order to shift sequentially from the left edge to the right edge in each picture for each row from the top edge to the bottom edge.

The intra prediction image generation unit 310 performs a prediction in the prediction mode indicated by the intra prediction mode IntraPredMode for neighboring PUs read, and generates a prediction image of the PUs. The intra prediction image generation unit 310 outputs the generated prediction image of the PUs to the addition unit 312.

In a case that the intra prediction parameter decoding unit 304 derives different intra prediction modes for luminance and chrominance, the intra prediction image generation unit 310 generates a prediction image of PUs of luminance by any of a planar prediction (0), a DC prediction (1), and directional predictions (2 to 34) depending on the luminance prediction mode IntraPredModeY, and generates a prediction image of PUs of chrominance by any of a planar prediction (0), a DC prediction (1), directional predictions (2 to 34), and LM mode (35) depending on the chrominance prediction mode IntraPredModeC.

The inverse quantization and inverse DCT unit 311 inverse quantizes quantization coefficients input from the entropy decoding unit 301 and calculates DCT coefficients. The inverse quantization and inverse DCT unit 311 performs an Inverse Discrete Cosine Transform (an inverse DCT, an inverse discrete cosine transform) for the calculated DCT coefficients, and calculates residual signals. The inverse quantization and inverse DCT unit 311 outputs the calculated residual signals to the addition unit 312.

The addition unit 312 adds prediction images of PUs input from the inter prediction image generation unit 309 or the intra prediction image generation unit 310 and residual signals input from the inverse quantization and inverse DCT unit 311 for every pixel, and generates decoded images of PUs. The addition unit 312 stores the generated decoded images of the PUs in the reference picture memory 306, and outputs the decoded images Td where the generated decoded images of the PUs are integrated for every picture to the outside.

Configuration of Image Coding Apparatus

Figure 6:
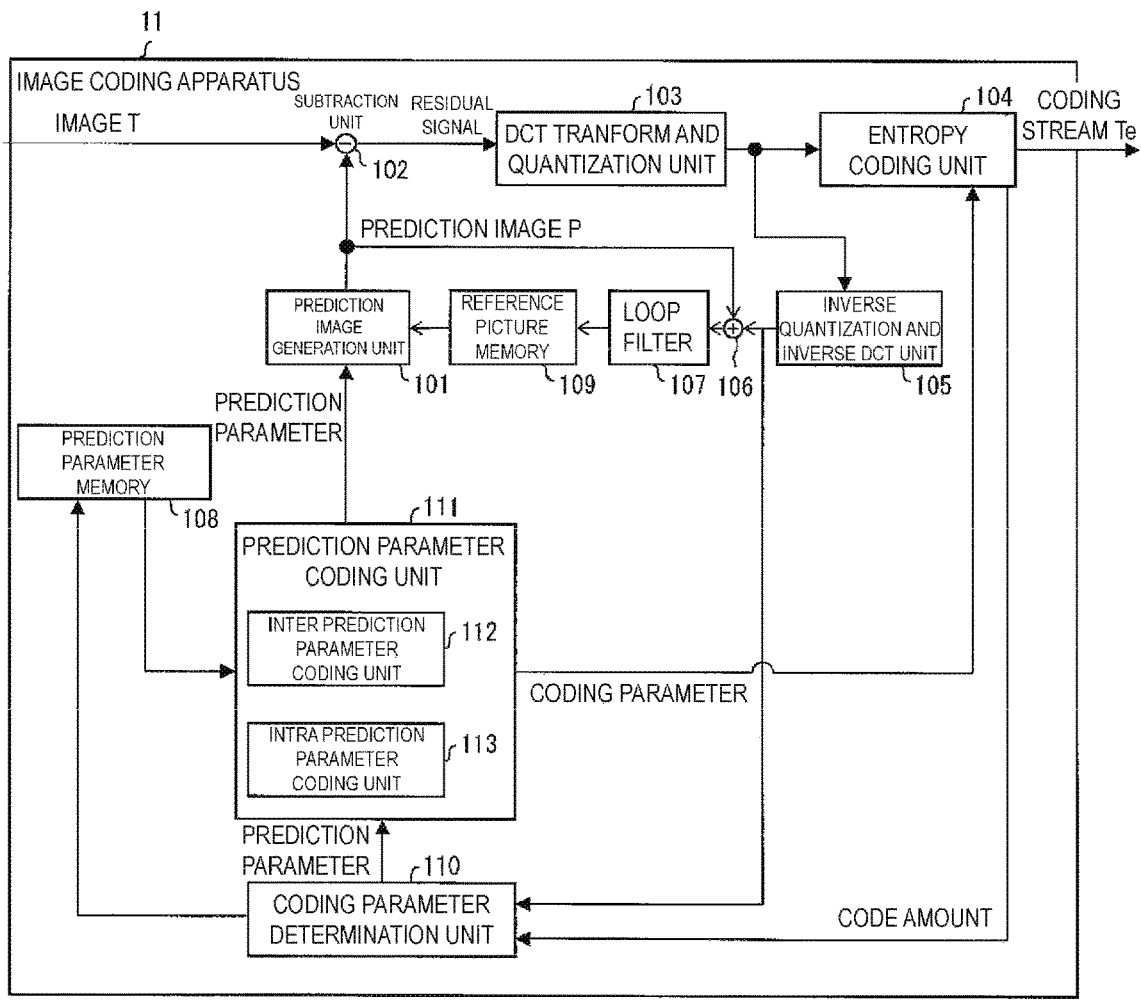
FIG. 6 is a block diagram illustrating a configuration of an image coding apparatus according to Embodiment 1.

The configuration of the image coding apparatus 11 according to the present embodiment will now be described. FIG. 6 is a block diagram illustrating the configuration of the image coding apparatus 11 according to the present embodiment. The image coding apparatus 11 is configured to include a prediction image generation unit (an intra prediction image generation apparatus) 101, a subtraction unit 102, a DCT and quantization unit 103, an entropy coding unit 104, an inverse quantization and inverse DCT unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, and a prediction parameter coding unit 111. The prediction parameter coding unit 111 is configured to include an inter prediction parameter coding unit 112 and an intra prediction parameter coding unit 113.

For each picture of an image T, the prediction image generation unit 101 generates a prediction image P of a prediction unit PU for each coding unit CU that is a region where the picture is split. Here, the prediction image generation unit 101 reads blocks that have been decoded from the reference picture memory 109, based on prediction parameters input from the prediction parameter coding unit 111. For example, in a case of an inter prediction, a prediction parameter input from the prediction parameter coding unit 111 is a motion vector. The prediction image generation unit 101 reads a block in the position in the reference image indicated by the motion vector with the target PU as the starting point. In a case of the intra prediction, a prediction parameter is, for example, an intra prediction mode. The prediction image generation unit 101 reads pixel values of neighboring PUs used in the intra prediction mode from the reference picture memory 109, and generates the prediction image P of the PUs. The prediction image generation unit 101 generates the prediction image P of the PUs using one prediction scheme among multiple prediction schemes for the reference picture blocks read. The prediction image generation unit 101 outputs the generated prediction image P of the PUs to the subtraction unit 102.

CU Shapes Obtained by QTBT Splits

Figure 7:
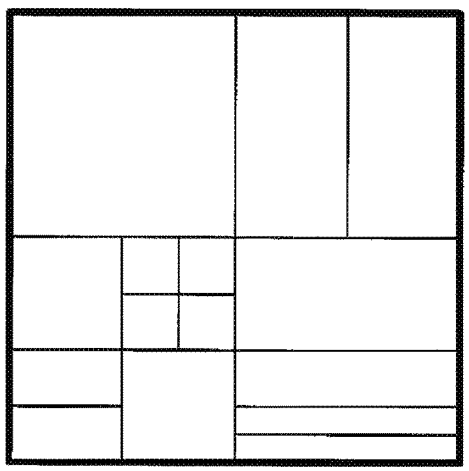
FIG. 7 is a schematic diagram illustrating shapes of CUs obtained by QTBT splits.

FIG. 7 is a schematic diagram illustrating shapes of CUs obtained by QTBT splits according to the present embodiment. As illustrated in FIG. 7, vertically long/horizontally long/square CUs are obtained by pictures with QT splits, and further QT splits or BT splits.

Note that, although not specifically illustrated, attribute information such as the positions or the dimensions of blocks during processing or of the processed blocks (CU/PU/TU) is supplied to a required spot appropriately.

Operation of Prediction Parameter Decoding Unit 302

Figure 8:
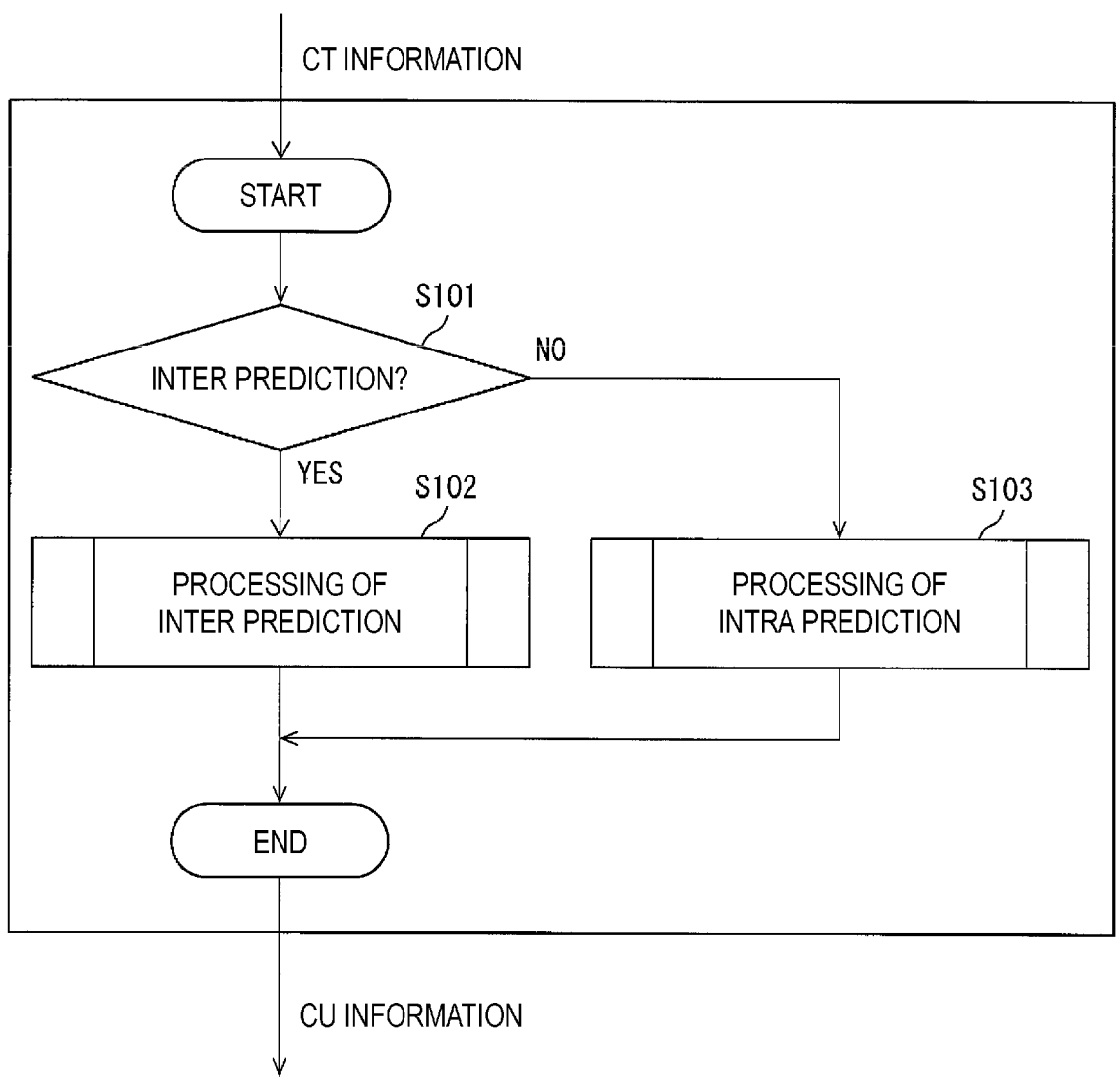
FIG. 8 is a flowchart illustrating an operation of a prediction parameter decoding unit of the image decoding apparatus illustrated in FIG. 5.

FIG. 8 is a flowchart illustrating an operation of the prediction parameter decoding unit 302 of the image decoding apparatus 31 illustrated in FIG. 5. The operation illustrated in FIG. 8 includes steps S101 to S103.

Step S101

The prediction parameter decoding unit 302 receives CN information related to CNs, and determines whether or not to perform the inter prediction. In step S101, in a case of determining that the prediction parameter decoding unit 302 performs the inter prediction (YES), step S102 is performed. In step S101, in a case of determining that the prediction parameter decoding unit 302 does not perform the inter prediction (NO), step S103 is performed.

Step S102

In the image decoding apparatus 31, the processing of the inter prediction is performed. The prediction parameter decoding unit 302 supplies CU information related to CUs depending on processing results of the inter prediction to the prediction image generation unit 308 (FIG. 5).

Step S103

In the image decoding apparatus 31, the processing of the intra prediction is performed. The prediction parameter decoding unit 302 supplies CU information related to CUs depending on processing results of the intra prediction to the prediction image generation unit 308.

Note that the above-mentioned processing is applicable to not only decoding processing but also coding processing. In coding processing, the "image decoding apparatus 31", the "prediction parameter decoding unit 302", the "prediction image generation unit 308" illustrated in FIG. 5 correspond to the "image coding apparatus 11", the "prediction parameter coding unit 111", the "prediction image generation unit 101" illustrated in FIG. 6, respectively. Note that, in the following processing, each unit of the image decoding apparatus 31 illustrated in FIG. 5 can be corresponded to each unit of the image coding apparatus 11 illustrated in FIG. 6.

Types of Intra Prediction Mode

Figure 9:
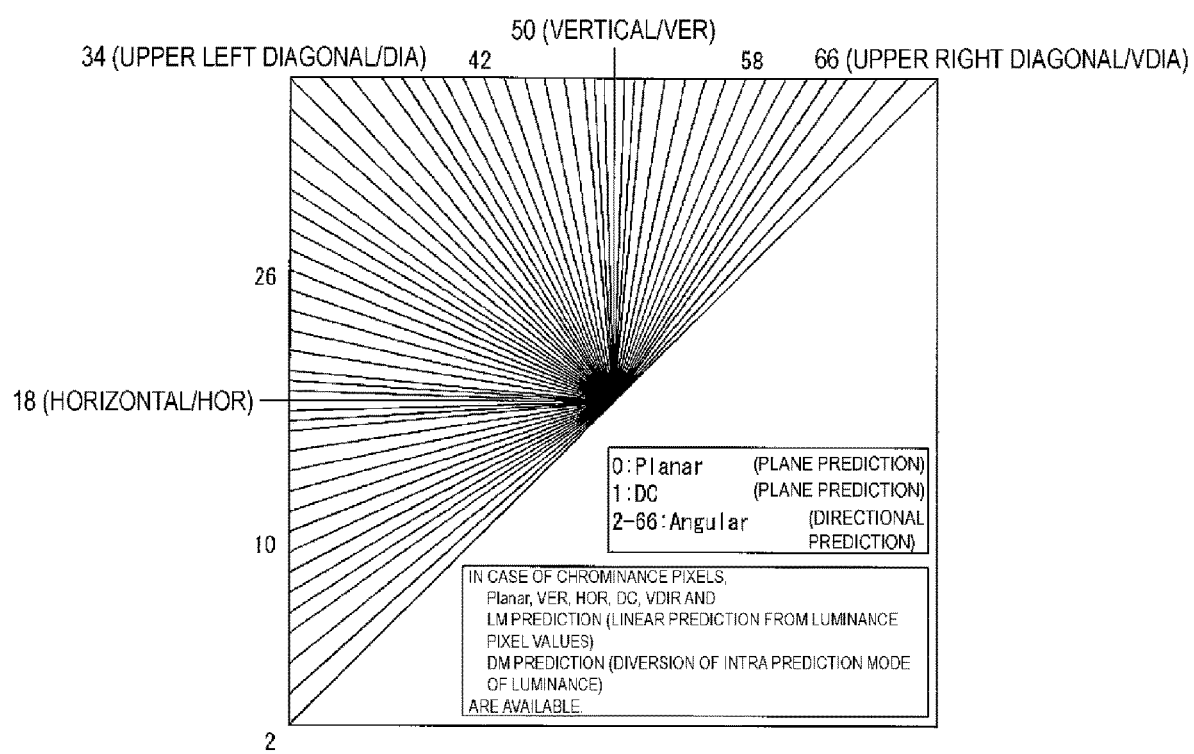
FIG. 9 is a schematic diagram illustrating types (mode numbers) of intra prediction modes used in step S103 included in the operation of the prediction parameter decoding unit illustrated in FIG. 8.

FIG. 9 is a schematic diagram illustrating types (mode numbers) of intra prediction modes used in step S103 included in the operation of the prediction parameter decoding unit 302 illustrated in FIG. 8, For example, as illustrated in FIG. 9, there are 67 types (0 to 66) of intra prediction modes.

Configuration of Intra Prediction Parameter Coding Unit 113

Figure 10:
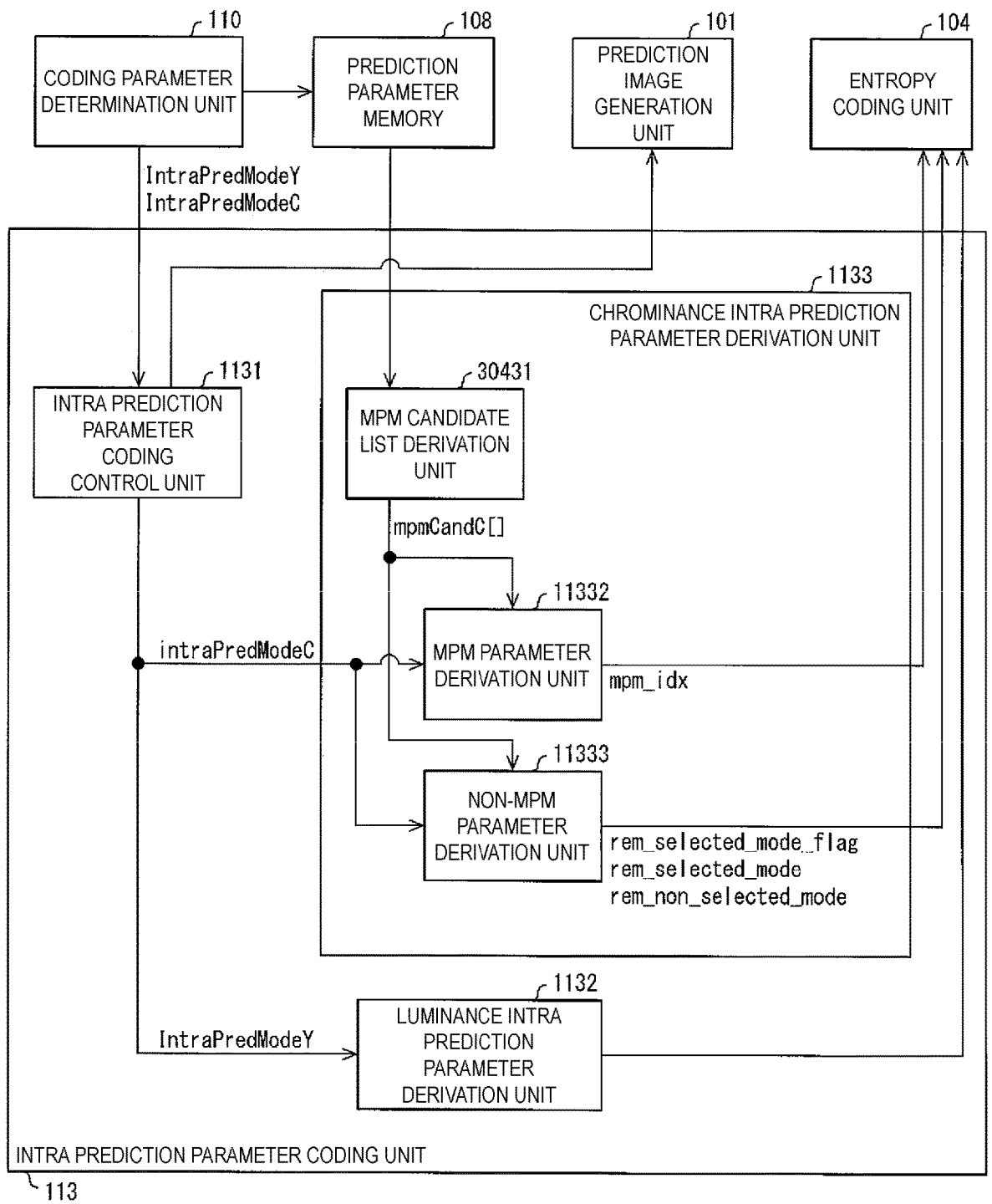
FIG. 10 is a schematic diagram illustrating a configuration of an intra prediction parameter coding unit of a prediction parameter coding unit of the image coding apparatus illustrated in FIG. 6.

FIG. 10 is a schematic diagram illustrating a configuration of the intra prediction parameter coding unit 113 of the prediction parameter coding unit 111 of the image coding apparatus 11 illustrated in FIG. 6. As illustrated in FIG. 10, the intra prediction parameter coding unit 113 is configured to include an intra prediction parameter coding control unit 1131, a luminance intra prediction parameter derivation unit 1132, and a chrominance intra prediction parameter derivation unit 1133.

The intra prediction parameter coding control unit 1131 receives supply of a luminance prediction mode IntraPredModeY and a chrominance prediction mode IntraPredModeC from the coding parameter determination unit 110. The intra prediction parameter coding control unit 1131 supplies (controls)) IntraPredModeY/C to the prediction image generation unit 101. The intra prediction parameter coding control unit 1131 supplies IntraPredModeY/C to an MPM parameter derivation unit 11332 and a non-MPM parameter derivation unit 11333 which are described below. The intra prediction parameter coding control unit 1131 supplies the luminance prediction mode IntraPredModeY to the luminance intra prediction parameter derivation unit 1132.

The chrominance intra prediction parameter derivation unit 1133 is configured to include an MPM candidate list derivation unit 30431, the MPM parameter derivation unit 11332, and the non-MPM parameter derivation unit 11333.

The MPM candidate list derivation unit 30431 receives supply of prediction parameters stored in the prediction parameter memory 108. The MPM candidate list derivation unit 30431 supplies an MPM candidate list mpmCand [ ] (mpmCandC [ ]) which is a list of intra prediction mode candidates to the MPM parameter derivation unit 11332 and the non-MPM parameter derivation unit 11333. The MPM candidate list mpmCand [ ] (mpmCandC [ ]) may be simply described as "an MPM candidate list" below.

The MPM parameter derivation unit 11332 supplies mpm_idx to the entropy coding unit 104. The non-MPM parameter derivation unit 11333 supplies the above-mentioned rem_selected_mode_flag, rem_selected_mode, and rem_non_selected_mode to the entropy coding unit 104. The luminance intra prediction parameter derivation unit 1132 derives intra prediction parameters of luminance.

Configuration of Intra Prediction Parameter Decoding Unit 304

Figure 11:
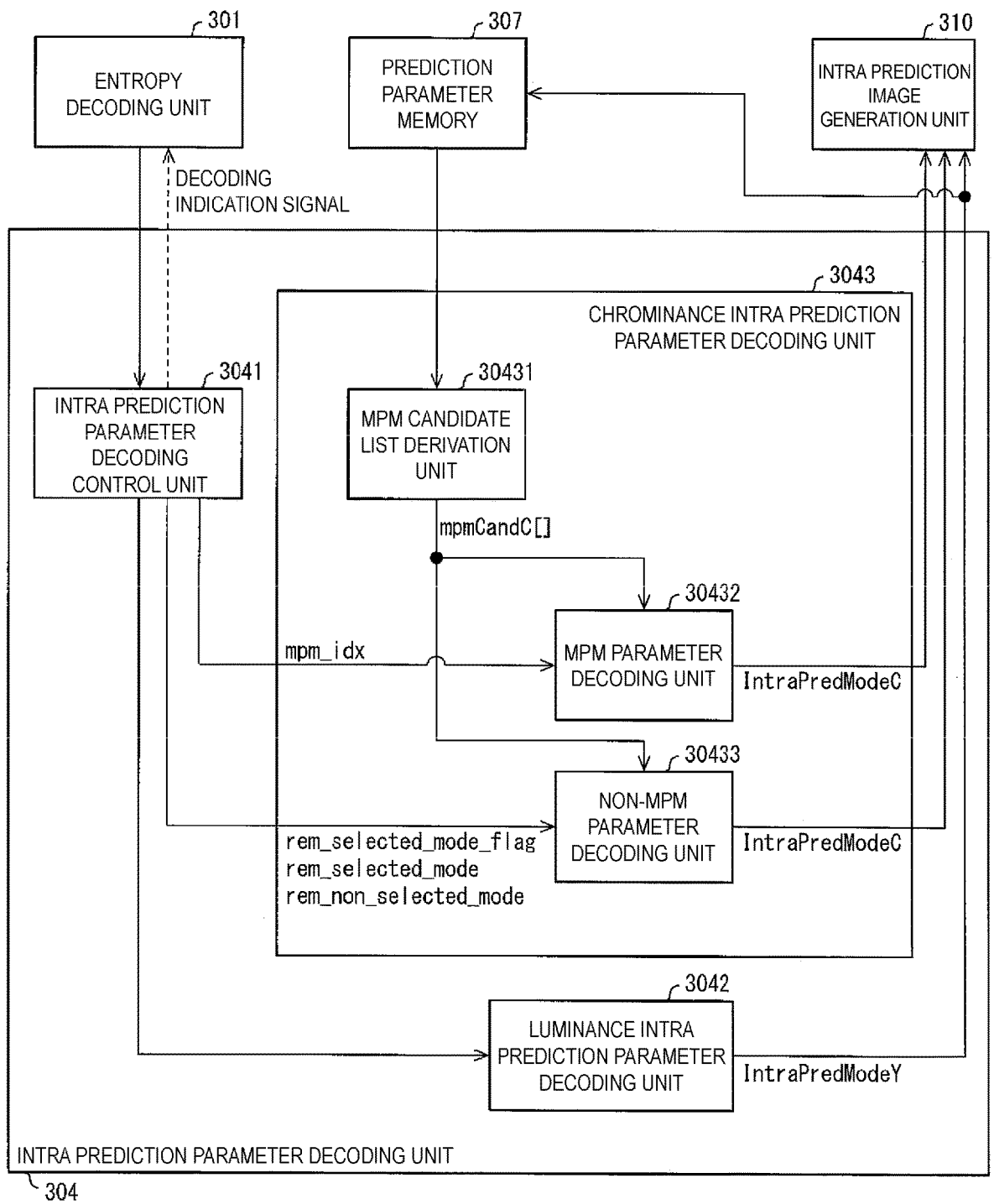
FIG. 11 is a schematic diagram illustrating a configuration of an intra prediction parameter decoding unit of the prediction parameter decoding unit of the image decoding apparatus illustrated in FIG. 5.

FIG. 11 is a schematic diagram illustrating a configuration of the intra prediction parameter decoding unit 304 of the prediction parameter decoding unit 302 of the image decoding apparatus 31 illustrated in FIG. 5. As illustrated in FIG. 11, the intra prediction parameter decoding unit 304 is configured to include an intra prediction parameter decoding control unit 3041, a luminance intra prediction parameter decoding unit 3042, and a chrominance intra prediction parameter decoding unit 3043.

The intra prediction parameter decoding control unit 3041 receives supply of codes from the entropy decoding unit 301. The intra prediction parameter decoding control unit 3041 supplies decoding indication signals to the entropy decoding unit 301. The intra prediction parameter decoding control unit 3041 supplies the above-mentioned mpm_idx to a following MPM parameter decoding unit 30432. The intra prediction parameter decoding control unit 3041 supplies the above-mentioned rem_selected_mode_flag, rem_selected_mode, and rem_non_selected_mode to a following non-MPM parameter decoding unit 30433, The intra prediction parameter decoding control unit 3041 performs control similar to control for the chrominance intra prediction parameter decoding unit 3043, for the luminance intra prediction parameter decoding unit 3042.

The chrominance intra prediction parameter decoding unit 3043 is configured to include the MPM candidate list derivation unit 30431, the MPM parameter decoding unit 30432, and the non-MPM parameter decoding unit 30433 (a decoding unit, a derivation unit).

The MPM candidate list derivation unit 30431 supplies an MPM candidate list to the MPM parameter decoding unit 30432 and the non-MPM parameter decoding unit 30433.

The MPM parameter decoding unit 30432 and the non-MPM parameter decoding unit 30433 supply the above-mentioned chrominance prediction mode IntraPredModeC to the intra prediction image generation unit 310. Note that, in the intra prediction of chrominance, configurations only using intra prediction modes derived by the MPM parameter decoding unit 30432 without the use of the non-MPM parameter decoding unit 30433 are possible.

The luminance intra prediction parameter decoding unit 3042 supplies the luminance prediction mode IntraPredModeY to the intra prediction image generation unit 310.

The derivation of the chrominance prediction mode IntraPredModeC by the chrominance intra prediction parameter decoding unit 3043 will be described in detail below. The MPM candidate list derivation unit 30431 derives the MPM candidate list mpmCandC [ ] in deriving the chrominance prediction mode IntraPredModeC. The MPM candidate list mpmCandC [ ] derived by the MPM candidate list derivation unit 30431 is exemplified as follows.

mpmCandC[ ]={PM,pm_L,pm_A,pm_BL,pm_AR, pm_AL}

Derivation Method of Intra Prediction Parameter (Luminance)

In a case that a flag prev_intra_luma_pred_flag [x0] [y0] indicating whether or not to derive the intra prediction mode from neighboring blocks is 1, the prediction parameter decoding unit 302 selects the intra prediction mode IntraPredModeY [x0] [y0] of the target block (CU or PU) in luminance pixels from the MPM candidate list mpmCand [ ]. The MPM candidate list (candidate list) is a list including multiple (for example, six) intra prediction modes, and is derived from intra prediction modes of neighboring blocks and prescribed intra prediction modes. For example, the following candidates are used.

mpmCand[ ]={pred_L,pred_A,pred_BL,pred_AR, pred_AL}

Note that pred_L, pred_A, pred_BL, pred_AR, and pred_AL are intra prediction modes IntraPredModeY of neighboring blocks next to the left, top, bottom right, top right, and top left of the target block, respectively, and correspond to pm_L, pm_A, pm_BL, pm_AR, and pm_AL in chrominance. mpmCand [ ] may store an intra prediction mode called a derivation mode. Note that the derivation mode is a mode (for example, a mode in which ±1 or ±2 is added) in the vicinity of an already derived intra prediction mode (for example, pred_L, pred_A, mpmCand [0], or mpmCand [1]).

The MPM parameter decoding unit 30432 selects the intra prediction mode IntraPredModeY [x0] [y0] stored in the MPM candidate list by using mpm_idx [x0] [y0]

Derivation Method of Intra Prediction Parameter (Chrominance)

A derivation method of the MPM candidate list will now be described. The MPM candidate list derivation unit 30431 determines at any time whether or not a certain prediction mode is already included in the MPM candidate list. The MPM candidate list derivation unit 30431 does not add prediction modes included in the MPM candidate list to the MPM candidate list redundantly. In a case that the number of prediction modes of the MPM candidate list becomes the prescribed number (for example, six), the MPM candidate list derivation unit 30431 finishes the derivation of the MPM candidate list.

FIG. 12 is a schematic diagram to describe prediction modes included in an MPM candidate list derived by the MPM candidate list derivation unit 30431 in the intra prediction parameter coding unit 113 illustrated in FIG. 10 and in the intra prediction parameter decoding unit 304 illustrated in FIG. 11. The MPM candidate list derivation unit 30431 derives the MPM candidate list mpmCandC [ ] including the modes described below.

(1) The intra prediction mode (neighboring mode) of the left block of the target block (2) The intra prediction mode (neighboring mode) of the top block of the target block (3) PLANAR prediction mode (plane mode)

(4) DC prediction mode (plane mode)

(5) The intra prediction mode (neighboring mode) of the bottom left block of the target block (6) The intra prediction mode (neighboring mode) of the top right block of the target block (7) The intra prediction mode (neighboring mode) of the top left block of the target block In FIG. 12, a pixel L is a reference point of (1), a pixel A is a reference point of (2), a pixel BL is a reference point of (5), a pixel AR is a reference point of (6), and a pixel AL is a reference point of (7).

Examples of the MPM candidate list mpmCandC [ ] include those described below.

Example 1 mpmCandC[ ]={PM,pm_L,pm_A,pm_BL,pm_AR, pm_AL}

Here, PM, pm_L, pm_A, pm_BL, pm_AR, and pm_AL included in the MPM candidate list refer to the following prediction modes.

PM: Luminance intra prediction mode used for a prediction of a luminance image and also used for a prediction of a chrominance image. PM is an intra prediction mode on a luminance block located at a position (reference point) of luminance corresponding to a target block of chrominance (a chrominance block). The reference point for luminance is not limited to one. For example, in a case that the luminance reference point is cCR, pm_cCR described below corresponds to PM.

The pm_X is a chrominance intra prediction mode intraPredModeC of a position X (a mode in which a prediction mode used for a prediction of a block of a chrominance image is also used in a prediction of another block of the chrominance image).

pm_L: Intra prediction mode of (1) above pm_A: Intra prediction mode of (2) above pm_BL: Intra prediction mode of (5) above
pm_AR: Intra prediction mode of (6) above
pm_AL: Intra prediction mode of (7) above Example 2 mpmCandC[0]={CCLM,pm_cCR,pm_cAL,pm_cAR,
pm_cBL,pm_cBR,pm_L,pm_A,pm_BL,pm_AR,
pm_AL}

Note that pm_cX refers to one of modes in which a prediction mode used for a prediction of a luminance image is also used in a prediction of a chrominance image, and a luminance intra prediction mode intraPredModeY at a position X is used.

Here, CCLM, pm_cCR, pm_cAL, pm_cBR, pm_cAR and pm_cBL refer to the following prediction modes.

CCLM: Mode in which a pixel value of a target pixel in a target color component is derived by a linear prediction with reference to pixel values of other color components that have been previously derived in the target pixel, Note that the color components include a luminance Y, a chrominance Cb, and a chrominance Cr.

pm_cCR: Intra prediction mode derived to predict a luminance image in a luminance block including cCR of FIG. 12.

pm_cAL: Intra prediction mode derived to predict a luminance image in a luminance block including cAL of FIG. 12.

pm_cBR: Intra prediction mode derived to predict a luminance image in a luminance block including cBR of FIG. 12.

pm_cAR: Intra prediction mode derived to predict a luminance image in a luminance block including cAR of FIG. 12.

pm_cBL: Intra prediction mode derived to predict a luminance image in a luminance block including cBL of FIG. 12.

All of cCR, cAL, cAR, cBL, and cBR above are reference points in a luminance block and are located inside a luminance block corresponding to a chrominance block. As illustrated in Example 1 and Example 2, the MPM candidate list mpmCandC [ ] is derived from a chrominance block around the target chrominance block and a luminance block inside the luminance block corresponding to the chrominance block.

Embodiment 2; Chrominance Sub-Block

In QTBT, chrominance and luminance can be split independently, but in related art, luminance information is not sufficiently leveraged in the generation of a prediction chrominance image. A configuration in which sub-block split of chrominance is performed to copy prediction information of luminance in units of sub-blocks will be described below. According to this configuration, it is possible to efficiently utilize the prediction information of luminance to improve coding efficiency. Note that configurations similar to those of the embodiment above are denoted by the same reference numerals, and descriptions thereof will be omitted. The same applies to Embodiment 3 and the subsequent embodiments.

Flow of Processing

Figure 13:
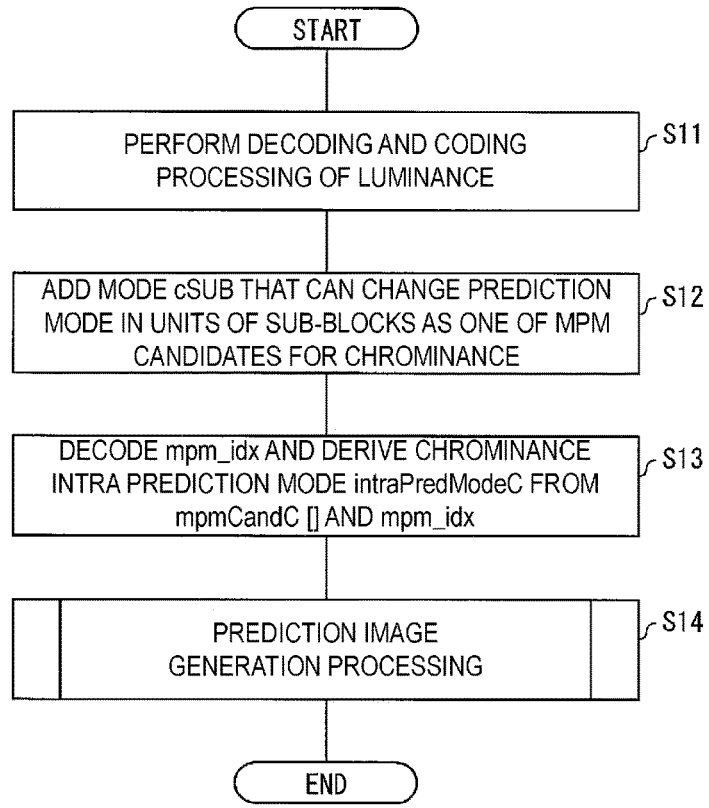
FIG. 13 is a flowchart illustrating an example of processing to generate a prediction image after having added a mode cSUB which can change the prediction mode in units of sub-blocks.
Figure 14:
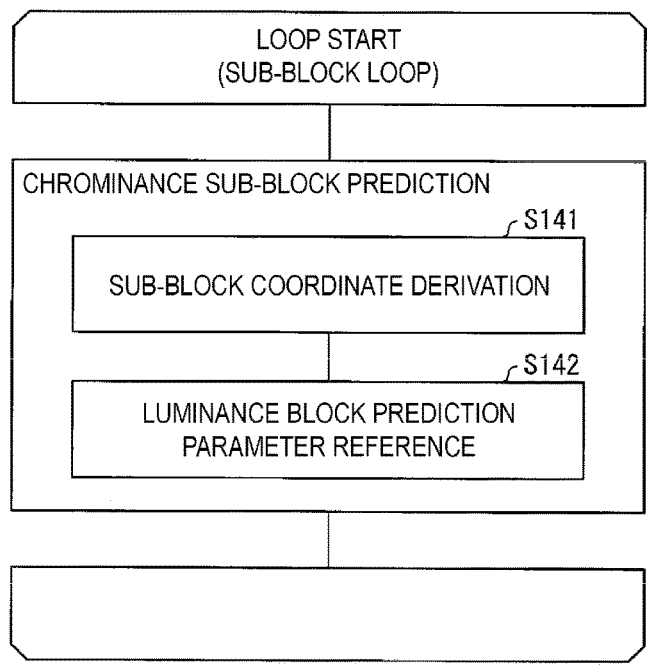
FIG. 14 is a flowchart illustrating an example of processing performed in step S14 in a case that a chrominance intra prediction mode intraPredModeC derived in step S13 in FIG. 13 is cSUB.

The flow of processing in the present embodiment will be described based on FIG. 13 and FIG. 14. FIG. 13 is a flowchart illustrating an example of processing to generate a prediction image after having added a mode cSUB (a mode for deriving a prediction mode in units of sub-blocks) which can change the prediction mode in units of sub-blocks to the MPM candidate list mpmCandC [ ]. FIG. 14 is a flowchart illustrating an example of the processing performed in step S14 in a case that a chrominance intra prediction mode intraPredModeC derived in step S13 in FIG. 13 is cSUB.

Step S11

Step S11 is performed in decoding processing or coding processing of a luminance block by the prediction image generation unit (the prediction parameter derivation unit) 308. As a result, prediction parameters are derived based on each of multiple luminance blocks included in the target coding unit.

Step S12

The MPM candidate list derivation unit 30431 adds a mode cSUB in which a prediction mode can be changed in units of sub-blocks as one of the MPM candidates for chrominance. As a result, the MPM candidate list mpmCandC [ ] is, for example, as follows. pm_X indicates a mode using intraPredModeC of a position X.

mpmCandC[ ]={CCLM,cSUB,pm_L,pm_A,pm_BL,
pm_AR,pm_AL}

Step S13

The MPM parameter decoding unit 30432 decodes mpm_idx and derives the chrominance intra prediction mode intraPredModeC from mpmCandC [ ] and mpm_idx, That is, intraPredModeC=mpmCandC[mpm_idx].

Step S14

The prediction image generation unit 308 generates the prediction image by performing the prediction image generation processing by using the chrominance prediction mode intraPredModeC derived in step S13.

In a case that the chrominance intra prediction mode intraPredModeC derived in step S13 is cSUB, the target block is split into sub-blocks (chrominance sub-blocks), and the processing in FIG. 14 is performed for the chrominance sub-blocks. In the process of FIG. 14, processing of step S141 and step S142 is performed for one sub-block, and the processing is performed for all chrominance sub-blocks.

Step S141

The prediction image generation unit (sub-block coordinate derivation unit) 308 derives coordinates (xL, yL) of the sub-blocks from top left coordinates (xP, yP), a width PbW, and a height PbH, and the sub-block sizes BW and of the chrominance block by the following equations.

$$xL = xP + BW*i$$

$$yL = yP + BH*j$$

$$i = 0 \ldots PbW/BW-1,$$

$$j = 0 \ldots PbH/BH-1 \quad \text{(Equation 1)}$$

Step S142

The prediction image generation unit 308 derives the prediction parameter of the chrominance sub-block, with reference to the prediction parameter of the luminance block corresponding to the sub-block coordinates (xL, yL) derived in step S141. Although not illustrated, the prediction image generation unit 308 derives the prediction parameters of each of the chrominance sub-blocks, and then generates the prediction image (intra prediction image) by using the prediction parameters.

Derivation of Prediction Parameter of Chrominance Sub-block

Figure 15:
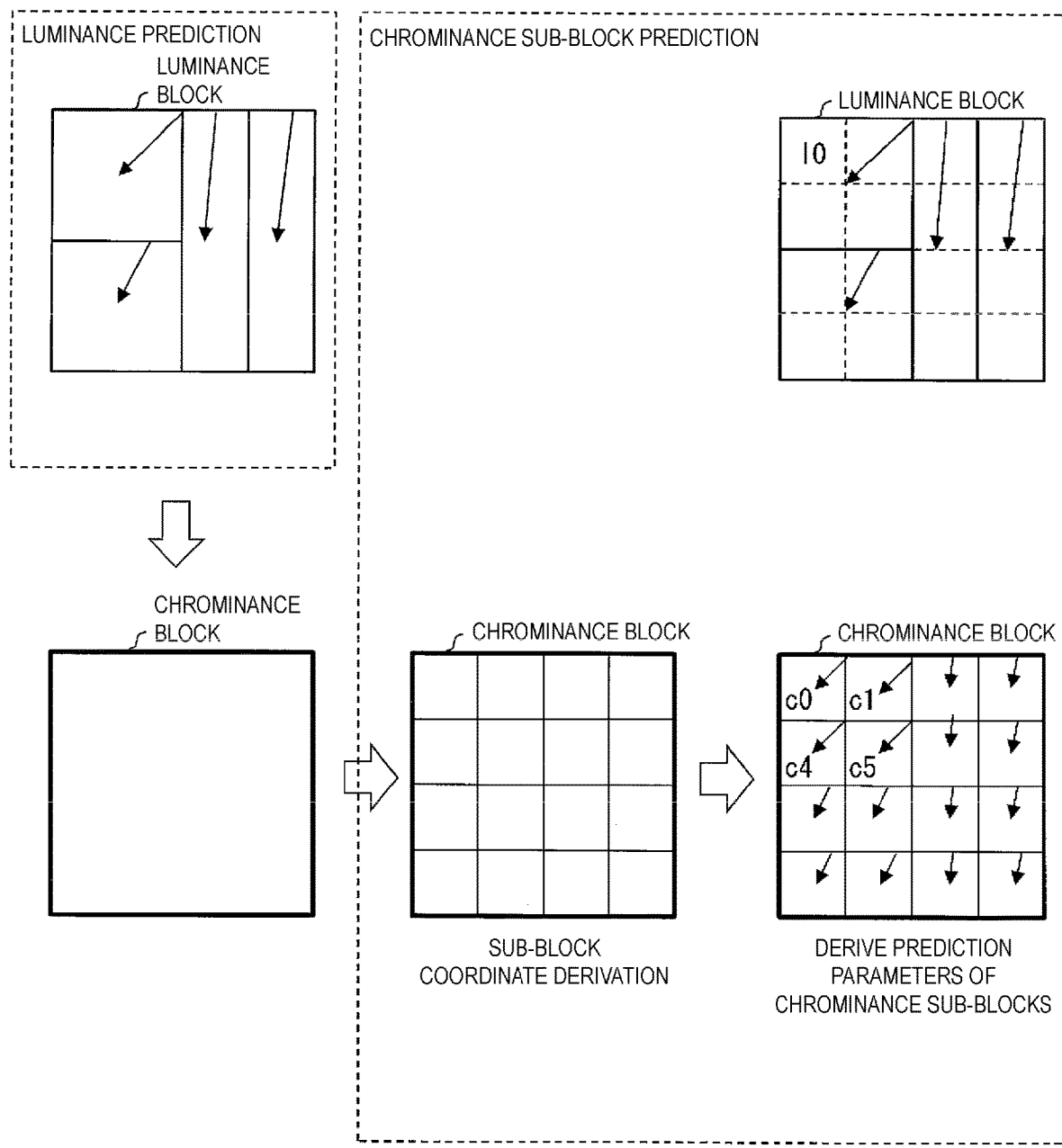
FIG. 15 is a schematic diagram illustrating an example of prediction parameter derivation of a chrominance sub-block.

An example of the prediction parameter derivation of the chrominance sub-blocks described above will be described based on FIG. 15. FIG. 15 is a schematic diagram illustrating an example of the prediction parameter derivation of chrominance sub-blocks.

In the present example, a luminance block is split into four blocks, and prediction parameters are derived for each block. In FIG. 15, a direction of a prediction parameter (a direction derived by a directional prediction) of each block is indicated by an arrow in the block. The derivation of prediction parameters is performed in step S11 of FIG. 13.

Next, for a chrominance block, sub-block coordinates are split in (Equation 1), and the chrominance block is split into sub-blocks. The processing in FIG. 14 is performed for each sub-block defined by such split. Then, for each sub-block of chrominance, corresponding luminance block coordinates are derived (step S142 in FIG. 14).

Finally, prediction parameters for each chrominance sub-block are derived, with reference to the prediction parameters derived for the corresponding luminance block. For example, in the example of FIG. 15, the top left four chrominance sub-blocks (c0, c1, c4, c5) correspond to one luminance block 1 (lower-case L) 0 at the top left. Thus, the prediction parameters of the top left four chrominance sub-blocks are derived with reference to the prediction parameters of one luminance block at the top left. As a result, the four chrominance sub-blocks at the top left and one luminance block at the top left have the same direction of the prediction parameters.

Embodiment 3: Chrominance Prediction Luminance Parameter Reference Point

As described based on FIG. 12, the MPM candidate list for a chrominance block may be derived from chrominance blocks around the chrominance block and the corresponding luminance block. However, in such a processing, in the generation of a prediction image of chrominance, the luminance information cannot be sufficiently utilized. Therefore, in the present embodiment, an example is described in which luminance information is further utilized to improve prediction accuracy than the example illustrated in FIG. 12.

Specifically, the MPM candidate list in the present embodiment includes the outside of the luminance block corresponding to the chrominance block as reference blocks. More specifically, the MPM candidate list includes prediction parameters derived with reference to a neighboring luminance block next to the corresponding luminance block corresponding to the chrominance block, the neighboring luminance block located on the lower side of the corresponding luminance block in the processing order. Then, in the image decoding apparatus 31 of the present embodiment, the MPM candidate list derivation unit 30431 derives the MPM candidate list including the prediction parameters, and the MPM parameter decoding unit (prediction parameter derivation unit) 30432 derives the prediction parameters for the chrominance block with reference to the derived MPM candidate list above. Then, the intra prediction image generation unit (prediction image generation unit) 310 generates an intra prediction image with reference to the prediction parameters. Similarly, in the image coding apparatus 11 of the present embodiment, the MPM candidate list derivation unit 30431 derives the MPM candidate list including the prediction parameters, and the MPM parameter derivation unit (prediction parameter derivation unit) 11332 derives the prediction parameters for the chrominance block with reference to the derived MPM candidate list above. Then, the prediction image generation unit 101 generates an intra prediction image with reference to the prediction parameters. As a result, it is possible to improve prediction accuracy of an intra prediction image because continuity with a subsequent prediction parameter can be considered.

Note that the block located on the lower side of the block in the processing order refer to the block that is processed later than the block in a case that processing is performed in the raster scanning order, for example.

Examples of Reference Points

Examples of reference points of the MPM candidate list of the present embodiment will be described with reference to FIG. 16 to FIG. 19. All of FIG. 16 to FIG. 19 are diagrams illustrating examples of reference points of the MPM candidate list. Note that in these diagrams, the coordinates of the top left of the chrominance block and the corresponding luminance block is denoted as (xP, yP), which indicates the coordinates of the top left of each reference point (pixel). In these examples, the color component (Y:Cb:Cr) is 4:4:4, and the coordinates may not be scaled, but coordinates may be scaled in 4:2:2, 4:2:0, and the like.

In the example of FIG. 16, the reference points of the chrominance block are the same as the example of FIG. 12, but two of the five reference points of the corresponding luminance block are outside of the corresponding luminance block. More specifically, two of cAR and cBR are outside of the corresponding luminance block (pixels on a neighboring luminance block). The neighboring luminance block is located on the lower side of the corresponding luminance block illustrated in the drawing (tower side in the processing order). The MPM candidate list in the example of FIG. 16 is mpmCandC [ ]={CCLM, pm_cCR, pm_cAL, pm_cAR, pm_cBL, pm_cBR, pm_L, pm_A, pm_BL, pm_AR, pm_AL}. As described above, pm_X is a mode using intraPredModeC of a position X. Of these, in a case that pm_cAR or pm_cBR is selected, the outside of the corresponding luminance block is a reference point.

The example of FIG. 17 is a simplified version with reference points of the corresponding luminance block less than those of the example of FIG. 16. In the example of FIG. 17, the reference points of the corresponding luminance blocks are two points, cCR and cBR. Of these, cBR is the outside of the corresponding luminance block (a pixel on the neighboring luminance block), similar to the example in FIG. 16. The MPM candidate list in the example of FIG. 17 is mpmCandC [ ]={CCLM, pm_cCR, pm_cBR, pm_L, pm_A, pm_BL, pm_AR, pm_AL}. Of these, in a case that pm_cBR is selected, the outside of the corresponding luminance block is the reference point.

As this example, the reference points of the corresponding luminance block preferably include at least one reference point near the center of the corresponding luminance block and one reference point on the outside of the corresponding luminance block (on the neighboring luminance block located on the lower side of the corresponding luminance block (lower side in the processing order).

The example of FIG. 18 is an example in which the number of reference points of the corresponding luminance block is three points. Of the three reference points of the corresponding luminance block, cBR is the outside of the corresponding luminance block (a pixel on the neighboring luminance block). The MPM candidate list in the example of FIG. 18 is mpmCandC [ ]={CCLM, pm_cCR, pm_cAL, pm_cBR, pm_L, pm_A, pm_BL, pm_AR, pm_AL}. Of these, in the case that pm_cBR is selected, the outside of the corresponding luminance block is the reference point.

The example of FIG. 19 is another example in which the number of reference points of the corresponding luminance block is three points. Of the three reference points of the corresponding luminance block, cAR is the outside of the corresponding luminance block (a pixel on the neighboring luminance block). The MPM candidate list in the example of FIG. 19 is mpmCandC [ ]={CCLM, pm_cCR, pm_cAR, pm pm_L, pm_A, pm_BL, pm_AR, pm_AL}. Of these, in a case that pm_cAR is selected, the outside of the corresponding luminance block is the reference point.

As each of the examples described above, by disposing the reference blocks so that the positions are not concentrated, degradation of performance caused by reducing the number of reference blocks can be suppressed, and the amount of processing can be reduced.

Outer Block Reference Point Avoidance

In QTBT, chrominance and luminance can be split independently, but in a case that the two color components are processed separately, there is a problem that the data transfer amount is large. It is preferable to interleave the luminance block and the chrominance block in the same unit (MaxPB size unit) as possible to operate. The MaxPB size unit block is referred to as a maximum prediction block.

Thus, in the present embodiment, in a case of deriving the MPM candidate list mpmCandC [ ] of the target block, the relative position of the luminance block to which the MPM candidate list derivation unit 30431 references from the chrominance block position is not greater than MaxPB size. This allows luminance and chrominance to be interleaved and processed for each MaxPB size. Then, by interleaving luminance and chrominance with a size of CTB or less to operate, the transfer amount can be reduced. The luminance block corresponding to the target chrominance block is referred to as a target luminance block (corresponding luminance block) below.

By dividing the coordinates of the luminance block by MaxPB, the coordinates of the maximum prediction block units can be obtained. For example, assuming that the top left coordinates of the target luminance block (target point) are (xPb, yPb) and the top left coordinates of the reference luminance block (reference point) are (xRef, yRef), each of the coordinates of the maximum prediction block units are (xPb/MaxPB, yPb/MaxPB) and (xRef/MaxPB, yRef/MaxPB). In a case that these coordinates are equal to each other, the target point and the reference point are on the same maximum prediction block. In a case that the reference point coordinates (xRef, yRef) are equal to the target point coordinates (xPb, yPb) or smaller than the target point coordinates (xPb, yPb) in the maximum prediction block units, the prediction parameter of the reference point have been derived even in a case of being interleaved with the maximum prediction block units. Conversely, in a case that the reference point coordinates (xRef, yRef) is greater than the target point coordinates (xPb, yPb) in maximum prediction block units, the prediction parameter of the reference point may not be derived, and therefore is not Available.

Specifically, in a case of satisfying the following condition, the intra prediction image generation unit 310 sets the value of Available to 0, and thus does not refer to the reference point outside the target luminance block. Note that (xPb, yPb) is the top left coordinates of the target luminance block, and (xRef, yRef) is a position included in the luminance block to be referred to in a case of deriving the candidate mpmCandC [ ] of the intra prediction mode of the target block.

$$(xPb/MaxPB) < (xRef/MaxPB)$$

Alternatively, in a case that the following condition is satisfied, $$(xPb >> \log 2MaxPB) < (xRef >> \log 2MaxPB),$$

the intra prediction image generation unit 310 may set the value of Available to 0. Note that log 2MaxPB=log 2(MaxPB).

According to the configuration, the reference position is not referred to in a case that the position xRef to refer to exceeds a position of a certain size, MaxPB size (logarithmic size log 2MaxPB) as a unit, from the top left coordinates xPB of the target luminance. In other words, no elements at positions greater than MaxPB sizes (for example, 32) are not utilized in the same CTU. In this case, the prediction parameter derived for the reference point outside the target luminance block is not used, and a prediction parameter is derived differently.

Note that, in the case that the position xRef to refer to exceeds the position of a certain size, MaxPB size as a unit, from the top left coordinates xPb of the target luminance block, the reference position may be moved to a position within a certain size, MaxPB size as a unit, from the top left coordinates xPb of the target luminance block. In this case, the prediction parameter derived for the reference point after having moved is derived as a prediction parameter for the chrominance block.

In particular, $$if(xPb/MaxPB) < (xRef/MaxPB),$$

then $xRef=(xRef/MaxPB)*MaxPB$.

Alternatively, $$if(xPb >> \log 2MaxPB) < (xRef >> \log 2MaxPB),$$

then $xRef=(xRef/MaxPB)*MaxPB$ may be used.

The Y coordinate may also be limited in the same manner as the X coordinate described above.

That is, $$if\ (yPb/MaxPB) < (yRef/MaxPB),$$

then Available=0 may be used.

Similarly, $$if(yPb >> \log 2MaxPB) < (yRef >> \log 2MaxPB),$$

then Available=0 may be used.

Moreover, $$if(yPb/MaxPB) < (yRef/MaxPB),$$

then $yRef=(yRef/MaxPB)*MaxPB$ may be used.

And, $$if(yPb >> \log 2MaxPB) < (yRef >> \log 2MaxPB),$$

then $yRef=(yRef/MaxPB)*MaxPB$ may be used.

For example, xRef and yRef may be derived as follows.

Any of xRef=xPb−1, xPb+PbW>>1, xPb+PbW−1, and xPb+PbW.

Any of yRef=yPb−1, yPb+PbH>>1, yPb+PbH−1, yPb+PbH.

Embodiment 4: Luminance Vector Reference Chrominance Prediction

In a case that a chrominance block and a luminance block are independently split and coded, coding is conventionally performed on the chrominance block with reference to a parameter of the luminance block, but it is considered not sufficiently efficient. In the present embodiment, in a case of splitting and coding the chrominance block and the luminance block independently, an intra block copy (IntraBC, also referred to as an intra block copy) parameter of the luminance block is also used for coding the chrominance block. As a result, there is no need to code a motion vector of the chrominance block, so the coding amount of the prediction parameter can be reduced, and the coding efficiency can be increased. An intra block copy is also referred to as a Current Picture Referencing (CPR).

Flow of Processing

Figure 20:
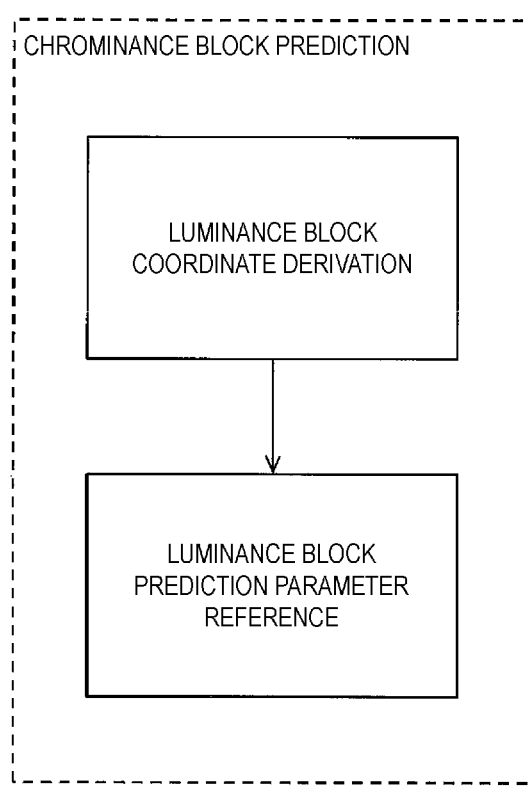
FIG. 20 is a diagram illustrating a flowchart of the prediction parameter derivation of a chrominance block.
Figure 21:
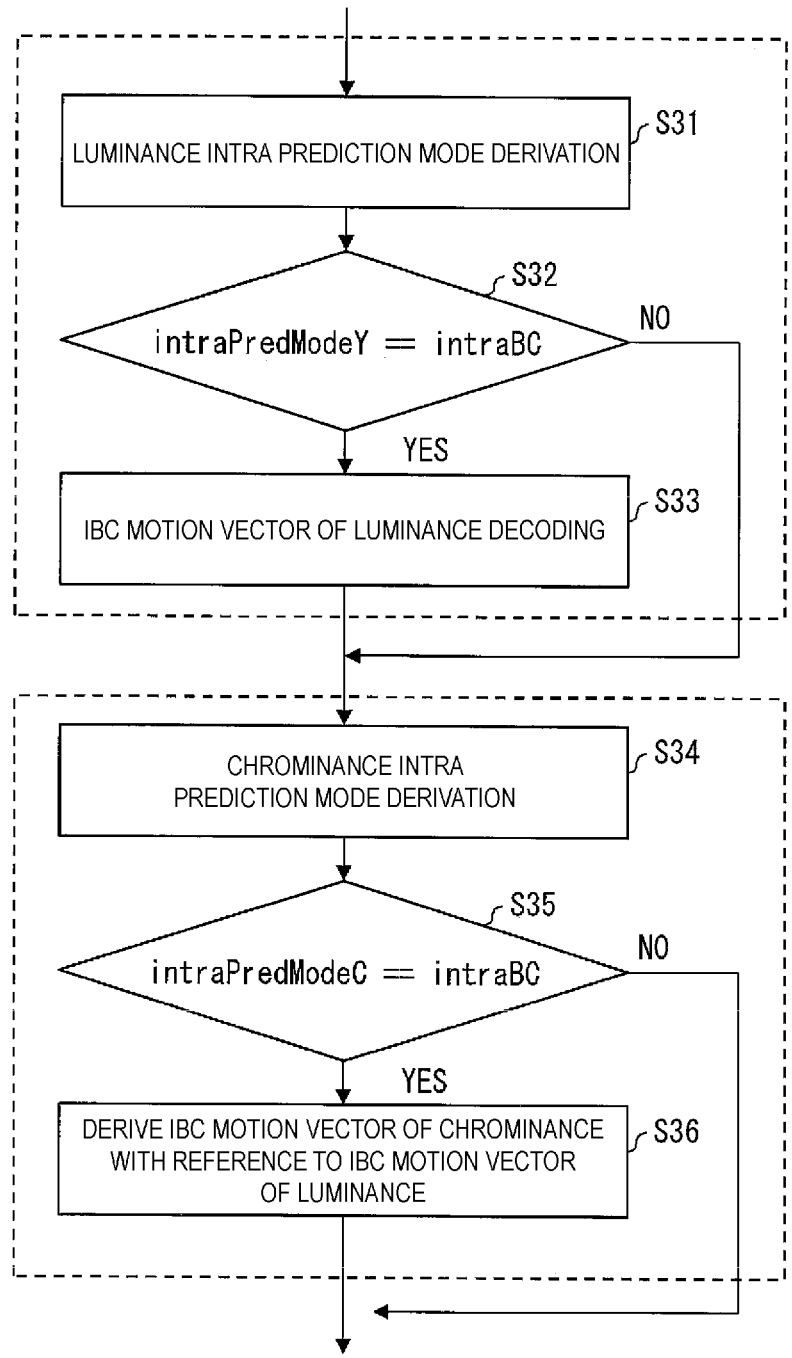
FIG. 21 is a flowchart illustrating an example of a prediction parameter derivation processing of a chrominance block.

The flow of the prediction image generation processing according to the present embodiment will be described based on FIG. 20 and FIG. 21. FIG. 20 is a diagram illustrating the flow of the prediction parameter derivation of a chrominance block according to the present embodiment, and FIG. 21 is a flowchart illustrating an example of the prediction parameter derivation processing of a chrominance block according to the present embodiment.

As illustrated in FIG. 20, in the prediction parameter derivation of a chrominance block according to the present embodiment, coordinates of the luminance block corresponding to the chrominance block are derived. Then, the prediction parameters of the chrominance block are derived with reference to the prediction parameters of the coordinates derived.

In a case that the coordinates of the chrominance block are expressed in units of luminance, the top left coordinates (xP, yP) of the chrominance block and the top left coordinates (xL, yL) of the luminance block matches (xL=xP, =yP) (xP, yP). Thus, in a case that the corresponding coordinates are calculated in block units, the top left coordinates (xP, yP) of the chrominance block may be the top left coordinates (xL, yL) of the luminance block as it is. In a case that the coordinates of the chrominance block are not expressed in units of luminance, the coordinates of the luminance block are derived in accordance with the color component. Specifically, in a case that the color component is 4:2:0, the coordinates of luminance are derived by doubling the X coordinate and the Y coordinate of chrominance. In a case that the color component is 4:2:2, the coordinates of chrominance are configured as the coordinates of luminance for the Y coordinate, and the coordinates of luminance are derived by doubling the coordinates of chrominance for the X coordinate. Then, in a case that the color component is 4:4:4, the coordinates of chrominance of both the X coordinate and the Y coordinate are configured as the coordinates of luminance.

The corresponding coordinates may be derived in units of sub-blocks. In this case, assuming that the width of the luminance block is PbW, the height is PbH, the width is BW, and the height is BH of the sub-block, the top left coordinates (xL, yL) of the luminance sub-block can be derived by the following equations.

$$xL = xP + BW * i$$

$$yL = yP + BH * j$$

$$i = 0 \ldots PbW/BW - 1,$$

$$j = 0 \ldots PbH/BH - 1$$

The processing of FIG. 21 will now be described.

Step S31

The intra prediction parameter decoding unit 304 derives the luminance intra prediction mode intraPredModeY.

Step S32

The intra prediction image generation unit 310 determines whether or not the derived luminance intra prediction mode intraPredModeY is an intra block copy IntraBC (IBC). In a case of IntraBC (YES), the processing proceeds to step S33, and in a case of not IntraBC (NO), the processing proceeds to step S34.

Step S33

The intra prediction image generation unit 310 decodes an IBC motion vector of luminance. Step S31 to step S33 are processes related to the prediction parameter derivation of the luminance block, and processes related to the prediction parameter derivation of the chrominance block begins from step S34.

Step S34

The intra prediction parameter decoding unit (prediction mode derivation unit) 304 derives the chrominance intra prediction mode intraPredModeC. More specifically, the intra prediction parameter decoding unit 304 derives the MPM candidate list mpmCandC including the prediction parameters of the luminance block. For example, the MPM candidate list may be derived, such as mpmCandC [ ]={CCLM, pm_cCR, pm_cBR, pm_L, pm_A, pm_BL, pm_AR, pm_AL}, including the prediction parameters pm_cCR and pm_cBR of cCR and cBR positions. The intra prediction parameter decoding unit 304 decodes mpm_idx and derives the chrominance prediction mode intraPredModeC from mpmCandC [ ] and mpm_idx. This chrominance prediction mode intraPredModeC may be denoted as intraPredModeC=mpmCandC [mpm_idx]. The syntax to decode may be intra_chroma_pred_mode instead of mpm_idx.

Step S35

The intra prediction image generation unit (prediction image generation unit) 310 determines whether or not the derived chrominance intra prediction mode intraPredModeC is an intra block copy IntraBC. In a case of IntraBC (YES), the processing proceeds to step S36. On the other hand, in a case of not IntraBC (NO), the intra prediction image generation unit 310 generates the prediction image in accordance with the intra prediction mode.

Step S36

The intra prediction image generation unit 310 refers to the IBC motion vector of luminance decoded in step S33 to derive the IBC motion vector of chrominance. Thereafter, the intra prediction image generation unit 310 generates the prediction image by the intraBC prediction using the IBC motion vector of chrominance derived.

The processing of step S36 depends on the color component. Specifically, in a case that the color component (Y:Cb: Cr) is 4:2:0, ½ of each component of the IBC motion vector of luminance is derived as the IBC motion vector of chrominance. Specifically, the luminance IBC motion vector mvY [ ] is scaled to derive the IBC motion vector mvC [ ] of chrominance by the following equations.

$$mvC[0]=mvY[0]>>1$$

$$mvC[1]=mvY[1]>>1$$

In a case that the color component is 4:4:4, assuming that the IBC motion vector of luminance is mvY [ ], then the IBC motion vector mvC [ ] of chrominance is derived by the following equations.

$$mvC[0]=mvY[0]$$

$$mvC[1]=mvY[1]$$

In a case that the color component is 4:2:2, ½ of the horizontal direction component of the IBC motion vector of luminance is derived as the IBC motion vector of chrominance. Specifically, the IBC motion vector mvC [ ] of chrominance is derived by the following equations.

$$mvC[0]=mvY[0]>>1$$

$$mvC[1]=mvY[1]$$

Other Examples of Prediction Parameter Derivation Processing

Figure 22:
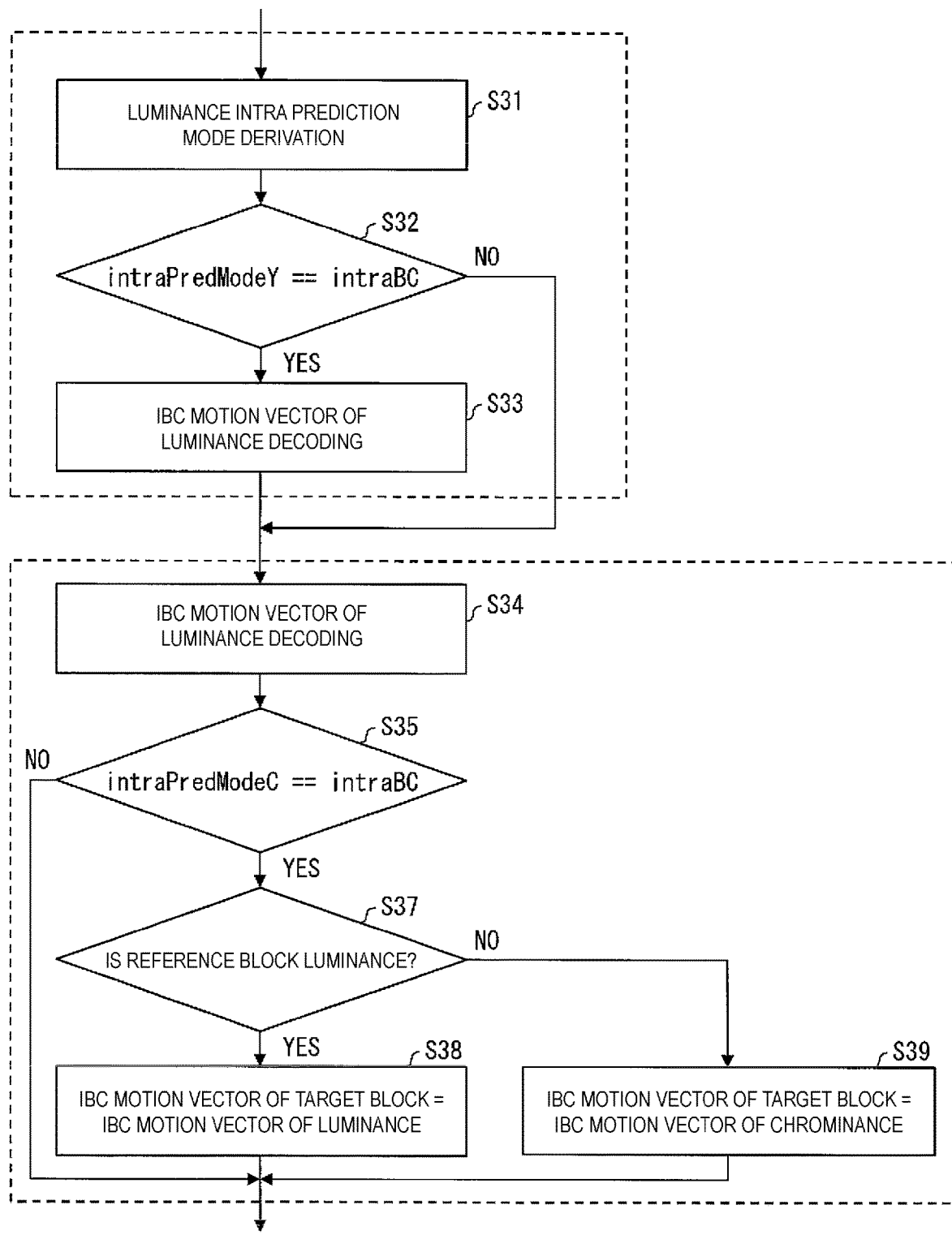
FIG. 22 is a flowchart illustrating another example of the prediction parameter derivation processing.

Another example of the prediction parameter derivation processing will be described based on FIG. 22. FIG. 22 is a flowchart illustrating another example of the prediction parameter derivation processing. Note that the same step numbers are denoted for the processing similar to FIG. 21, and the descriptions for the processing are omitted.

Step S37

The intra prediction image generation unit 310 determines whether or not the reference block is the luminance block. In a case of the luminance block (YES), the processing proceeds to step S38, or in a case of not the luminance block (NO), in other words, in a case of the chrominance block, the processing proceeds to step S39.

Step S38

The intra prediction image generation unit 310 assumes the IBC motion vector of luminance as the IBC motion vector of the target block. In this case, scaling is performed as needed as described above. Thereafter, the intra prediction image generation unit 310 generates the prediction image by intraBC prediction using the IBC motion vector described above.

Step S39

The intra prediction image generation unit 310 assumes the IBC motion vector of chrominance as the IBC motion vector of the target block. Thereafter, the intra prediction image generation unit 310 generates the prediction image by intraBC prediction using the IBC motion vector described above.

In a case that a neighbor block (for example, left block) of chrominance is intraBC and the block is selected as the reference block, the processing proceeds to step S39 as determined NO at step S37. In this case, intraPredModeC is intraBC, but the vector referenced is the motion vector of chrominance. Thus, in step S39, even in a case that the color component (Y:Cb:Cr) is 4:2:0, for example, the magnitude of the motion vector need not to be ½.

Derivation of Prediction Parameter of Chrominance Sub-block

Figure 23:
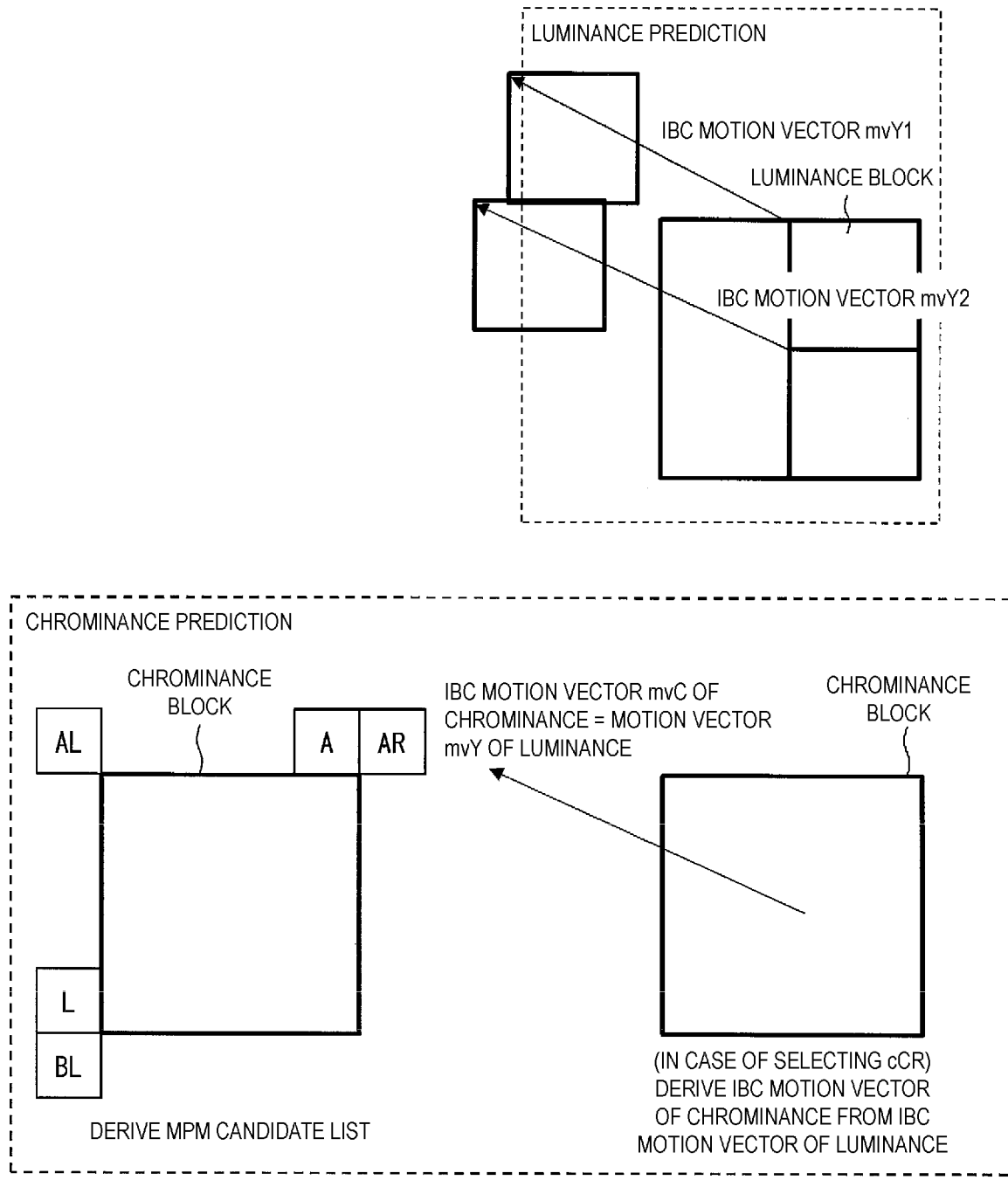
FIG. 23 is a schematic diagram illustrating an example of an IBC motion vector derivation of chrominance.

An example of the IBC motion vector derivation of chrominance described above will be described based on FIG. 23. FIG. 23 is a schematic diagram illustrating an example of the IBC motion vector derivation of chrominance.

In this example, the luminance block is split into three blocks. Of these, for the two blocks on the right, the luminance IBC motion vectors mvY1 and mvY2 have been decoded. The decoding of these IBC motion vectors mvY1 and mvY2 is performed in step S33 of FIG. 21.

Next, the MPM candidate list is derived for the chrominance block to derive the chrominance intra prediction mode intraPredModeC (step S34 of FIG. 21). Here, suppose that the chrominance intra prediction mode intraPredModeC derived is pm_cCR. In this case, the position of cCR is included in the right bottom luminance block (see FIG. 12 and the like). The luminance intra prediction mode intraPredModeY of the block is intraBC, and the IBC movement vector is mvY2.

In this case, the processing is determined YES in step S35 of FIG. 21 (the chrominance intra prediction mode intraPredModeC is also intraBC). Then, in S36, the IBC motion vector mvC of chrominance is derived with reference to the IBC motion vector mvY2. In the example of FIG. 23, the IBC motion vector mvC of chrominance=the IBC motion vector mvY2 of luminance.

Embodiment 5: CCLM+Angular Waiting

The chrominance intra prediction mode candidate list mpmCandC [ ] used in the chrominance intra prediction is exemplified in the following.

$$mpmCandC[\ ]=\{PM,L,A,BL,AR,AL\}//HEW$$

$$mpmCandC[\ ]=\{CCLM,cCR,cAL,cAR,cBL,cBR,L,A,BL,AR,AL\}//JEM\ PM$$

is a luminance intra prediction mode in which a prediction mode used for a prediction of a luminance image is also used in a prediction of a chrominance image. The Cross-component Linear Model (CCLM) is a mode for performing a color component-to-color component prediction.

The CCLM prediction is a prediction of deriving a linear prediction parameter by using a processed image next to the target block and generating a prediction image by, using the linear prediction parameter. The LM mode (35) of Embodiment 1 is a mode for performing the CCLM prediction.

Conventionally, there has been a technique for combining the CCLM prediction and the directional (Angular) prediction to generate a prediction image, but the weighting in combining is limited to 1:1. In other words, conventionally, in combining the CCLM prediction and the directional prediction, the prediction image Pred [x] [y] is generated according to the following equation. Pred [x] [y]=(PredLM [x] [y]+PredAngular [x] [y]+1)>>1

However, the conventional technique described above has a problem in that the accuracy of the prediction image is low. In order to solve the above-described problem, in the present embodiment, the intra prediction image generation unit (prediction image generation unit) 310 is configured to function as a weight configuration unit configured to set a first weight to be multiplied by a first pixel value derived by the CCLM prediction and a second weight to be multiplied by a second pixel value derived by the directional prediction. As a result, the accuracy of the prediction image can be improved.

CCLM Prediction Unit

Figure 24:
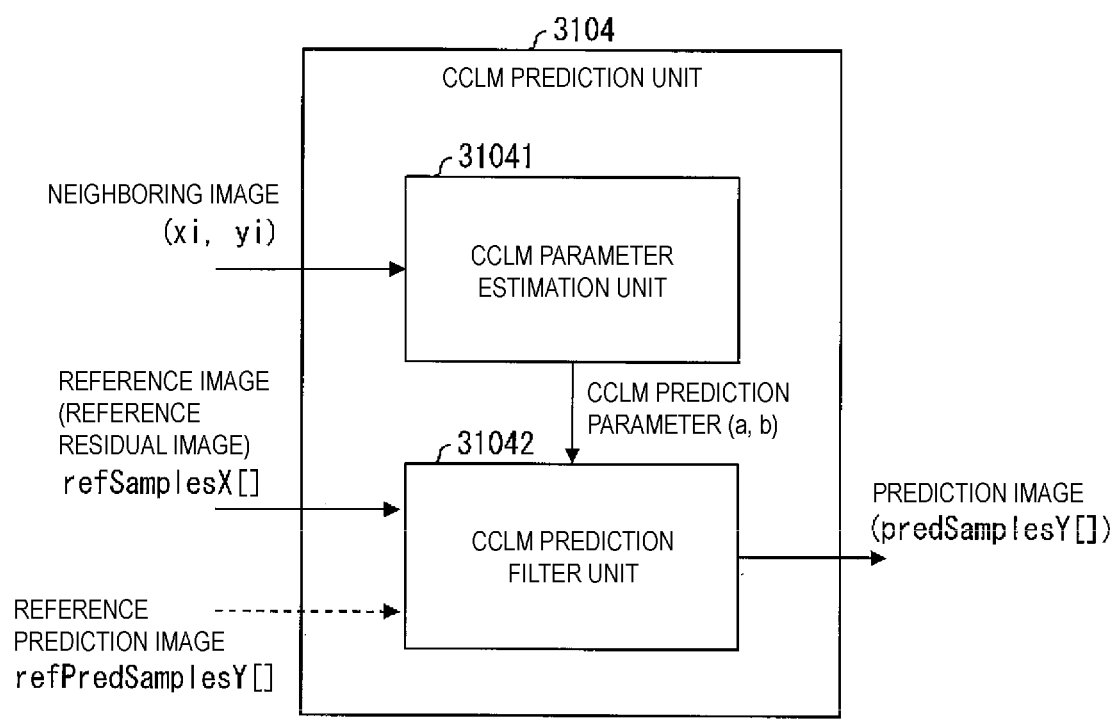
FIG. 24 is a block diagram illustrating an example of a configuration of a CCLM prediction unit.

A CCLM prediction unit (first derivation unit) 3104 included in the intra prediction image generation unit 310 will be described based on FIG. 24. FIG. 24 is a block diagram illustrating an example of a configuration of the CCLM prediction unit 3104. The CCLM prediction unit 3104 includes a CCLM parameter estimation unit 31041 and a CCLM prediction filter unit 31042.

The CCLM parameter estimation unit 31041 estimates (derives) the CCLM prediction parameter by using pixel values (x [i], y [i], i=0, . . . , N) of the processed image next to the target block as an input signal. The CCLM parameter estimation unit 31041 outputs the derived CCLM prediction parameter (a, b) to the CCLM prediction filter unit 31042. The details of the derivation of the CCLM prediction parameter (a, b) will be described below.

The CCLM prediction filter unit 31042 performs the CCLM prediction for the input signal refSamplesX [ ] [ ], and generates the prediction image predSamplesY [ ] [ ]. Note that, as will be described in detail below, there are Type® and Type1 for the CCLM prediction. Then, in Type0, the CCLM prediction filter unit 31042 generates the prediction image predSamplesY [ ] [ ] from the reference image refSamplesX [ ] H, which is an input signal. On the other hand, in Type1, the CCLM prediction filter unit 31042 generates the prediction image predSamplesY [ ] from the reference residual image refSamplesX [ ] [ ] (=refResSamplesX) and the reference prediction image refPredSamplesY [ ] [ ], which are input signals.

CCLM Parameter Estimation Unit

The CCLM parameter estimation unit 31041 derives the CCLM prediction parameter (a, b), which is the CCLM prediction parameter in a case that the prediction block predSamplesY [ ] [ ] of the target block is linearly predicted from the reference block refSamplesX [ ] [ ]. This will be described based on FIG. 25. FIG. 25 is a diagram describing pixels to refer to in the derivation of the CCLM prediction parameter. Note that the target block in the example of FIG. 25 is constituted by four pixels and four pixels.

In the example of FIG. 25, pixels x0 to x7 are located around the reference block refSamplesX [ ] [ ] (neighboring blocks that are next to the reference block), and pixels y0 to y7 are located around the target block (predSamplesY [ ] H (neighboring blocks next to the target block). The pixels included in the neighbor blocks of the reference block and the pixels included in the target block differ in the color component. The CCLM parameter estimation unit 31041 derives, based on the input reference pixel x [ ] and the target reference pixel y of these neighboring blocks, parameters in a case that the target reference pixel y [ ] is linearly predicted from the input reference pixel x [ ] as the CCLM prediction parameter (a, b) to apply to the target block.

In the derivation of the CCLM prediction parameter (a, b), the CCLM parameter estimation unit 31041 derives the CCLM prediction parameter (a, b) that minimizes a cost E of the least squares error expressed by the following equation by the least squares method. Note that in the following description, Σ (x) means the sum of 0 . . . N−1 of x.

$$E=\Sigma(y[i]-a*x[i]-b)^2$$

The derivation of the CCLM prediction parameter (a, b) is performed by the following equations.

$$a = (N*\Sigma x[i]y[i] - \Sigma x[i]\Sigma y[i])/(N*\Sigma(x[i]x[i]) - \Sigma x[i]\Sigma x[i])$$
$$= a1/a2 = ((a1*invTable[a2] + roundInv) >> shiftInv)$$
$$b = (\Sigma y[i] - \Sigma x[i]*a)/N$$

More specifically, the following processing is performed for integer computation.

First, the X, Y, XX, and YY are derived from the following equations.

$$X=\Sigma x[i]$$

$$Y=\Sigma y[i]$$

$$XX=\Sigma(x[i]*x[i])$$

$$XY=\Sigma(y[i]*[i])$$

Next, the count shift value iCountShift is calculated using the following equation. Note that N is the number of pixels in the reference region.

$$iCountShift=\log 2(N)$$

Next, the first parameter a1 and the second parameter a2 are derived from the following equations.

$$aveX=X>>iCountShift$$

$$aveY=Y>>iCountShift$$

$$a1=XY-((aveY*aveX)<<iCountShift);$$

$$a2=XX-((aveX*aveX)<<iCountShift);$$

Then, the table invTable is utilized to derive a1/a2.

$$a=a1/a2=(a1*invTable[a2]+roundInv)=>>shfitInv$$

$$b=(Y-X*a)>>\log 2(N)$$

Note that the first parameter a1 and the second parameter a2 may be derived by the following equations.

$$aveX=X>>iCountShift$$

$$remX=X-aveX$$

$$aveY=Y>>iCountShift$$

$$remX=Y-aveY$$

$$a1=XY((aveY*aveX)<<iCountShift)+(aveX*remY)+(aveY*remX),$$

$$a2=XX-((aveX*aveX)<<iCountShift)+2*(aveX*remX);$$

CCLM Prediction Type0 and Type1

The CCLM prediction filter unit 31042 uses the reference image refSamplesX [ ] [ ] as an input signal and outputs the prediction image predSamplesY [ ] [ ] by using the CCLM prediction parameter (a, b).

$$predSamplesY[\ ][\ ]=(a*refSamplesX[\ ][\ ])>>shift+b+refPredSampleY[\ ][\ ]$$

Here, refPredSampleY [ ] [ ] may be an offset of the prediction image predSamplesY H [ ] [ ] and may be 0, or a prediction value of the prediction image predSamplesY derived by another prediction method may be used as described later.

Figure 26A:
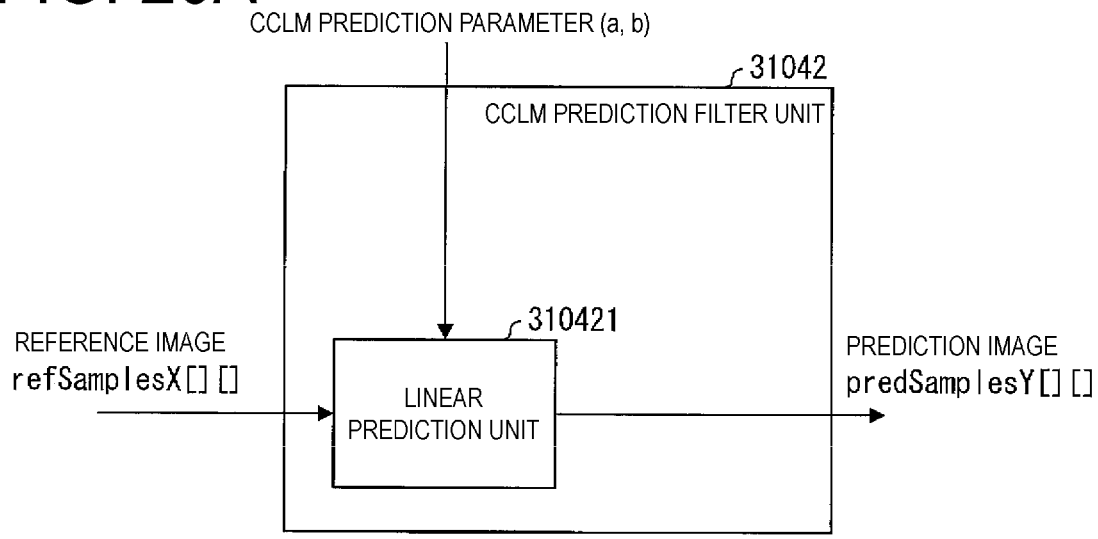
FIGS. 26A and 26B are block diagrams illustrating examples of configurations of a CCLM prediction filter unit of Type0 and a CCLM prediction filter unit of Type1.
Figure 26B:
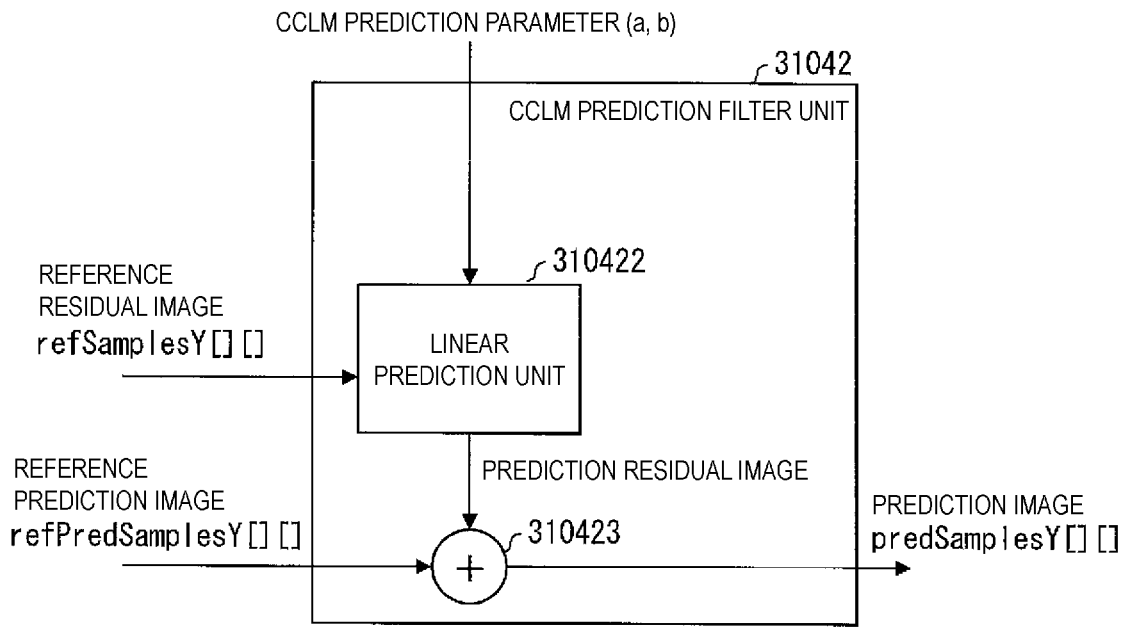

FIGS. 26A and 26B are block diagrams illustrating examples of the configurations of the CCLM prediction filter unit 31042 of Type0 and the CCLM prediction filter unit 31042 of Type1.

FIG. 26A illustrates the configuration of the CCLM prediction filter unit 31042 of Type0. The CCLM prediction filter unit 31042 of Type0 includes a linear prediction unit 310421. The linear prediction unit 310421 receives the reference image refSamplesX [ ] [ ] as the input signal, and outputs the prediction image predSamplesY [ ] [ ] by using the CCLM prediction parameter (a, b).

More specifically, the linear prediction unit 310421 derives the chrominance signals Cb and Cr of the prediction image by the following equation using the prediction parameter (a, b)), and outputs this as the prediction image predSamplesY [ ] [ ].

predSamplesY[ ][ ]=($a$*refSamplesX[ ][ ])>>shift+$b$
($Y$ is $Cb$ or $Cr$, $X$ is Luma)

On the other hand, FIG. 26B illustrates the configuration of the CCLM prediction filter unit 31042 of Type1, The CCLM prediction filter unit 31042 of Type1 includes a linear prediction unit 310422 and an addition unit 310423. The linear prediction unit 310422 assumes the reference residual image refSamplesY [ ] [ ] (=refResSamplesY) as the input signal and outputs the prediction residual image using the CCLM prediction parameter (a, b). Then, the addition unit 310423 adds the reference prediction image refPredSamplesY [ ] [ ] to the prediction residual image, and outputs the prediction image predSamplesY [ ] [ ].

$$predSamplesY [\,] [\,] = \\ refPredSamplesY [\,] [\,] + (a * refResSamplesX [\,] [\,] + round) >> \\ shift + b (Y \text{ is } Cr, X \text{ is } Cb) \text{ (if } a < 0) = \\ refPredSamplesX [\,] [\,] (\text{if } a >= 0)$$

Example of Weighting

As described above, the CCLM prediction unit 3104 included in the intra prediction image generation unit 310 derives the prediction image by the CCLM prediction. The intra prediction image generation unit 310 includes a directional prediction unit (second derivation unit), and the directional prediction unit derives a pixel value (second pixel value) of the target pixel by the directional prediction with reference to the decoded pixel values in the vicinity of the target pixel.

Then, the intra prediction image generation unit 310 combines the prediction image derived by the CCLM prediction and the prediction image derived by the directional prediction to derive a prediction image. Specifically, the intra prediction image generation unit 310 generates the prediction image Pred [x] [y] with by following equation. Note that w [x] [y] is a weight.

Pred[$x$][$y$]=($w$[$x$][$y$]*PredLM+(sum−$w$[$x$][$y$])
*PredAngular+offset)>>shift sum=1<<shift,offset=1<<(shift−1)

An example of the configuration of the weights will be described based on FIG. 27. FIG. 27 is a diagram illustrating an example of weights configured for each prediction image, in derivation of each prediction image by adding the prediction image derived by the CCLM prediction and the prediction image derived by the directional prediction. In the example of FIG. 27, the image weighted with the prediction image PredLM (prediction target block) derived by the CCLM prediction and the image weighted with the prediction image PredAngular (prediction target block) derived by the directional prediction are added together. The weight for the prediction image PredLM is configured for each of 16 sections obtained by splitting the prediction image PredLM into 4×4. The same applies to the prediction image PredAngular. All of the sums of the values of the weights of sections of the prediction image PredLM and corresponding sections of the prediction image PredAngular are 8. For example, the sum of the weight value 4 of the section of the top right of the prediction image PredLM and the weight value 4 of the section of the top right of the prediction image PredAngular is 8, and the sum of the weight value 2 of the section of the top left of the prediction image PredLM and the weight value 6 of the section of the top left of the prediction image PredAngular is also 8. The weight in the pixel located on the top left in the prediction image PredAngular is configured to be greater than the weight of the pixel located on the bottom right in the prediction image PredAngular. The accuracy of the prediction image PredAngular is to be higher being closer to the neighboring blocks and to be lower being further away from the neighboring blocks, and thus the accuracy of the prediction image can be increased by such weighting compared to the Related art in which the weighting in combining is defined as 1:1.

Such weights may be defined by a table having the weight of the top left greater than the bottom right. In this case, the intra prediction image generation unit 310 identifies the weight w [x] [y] with reference to the table, and uses the identified weight w [x] [y] to derive the prediction image. Note that the table described above satisfies w [x0] [y]>=w [x1] [y] in x0<=x1, and w [x] [y0]>=w [x] [y1] in y0<y1 in all x0 and x1. Note that w [x0] [y]>w [x1] [y] is satisfied in at least one (x0, x1) in x0<x1. In at least one (y0, y1), w [x] [y0]>=w [x] [y1] is satisfied in y0<y1.

Figure 28A:
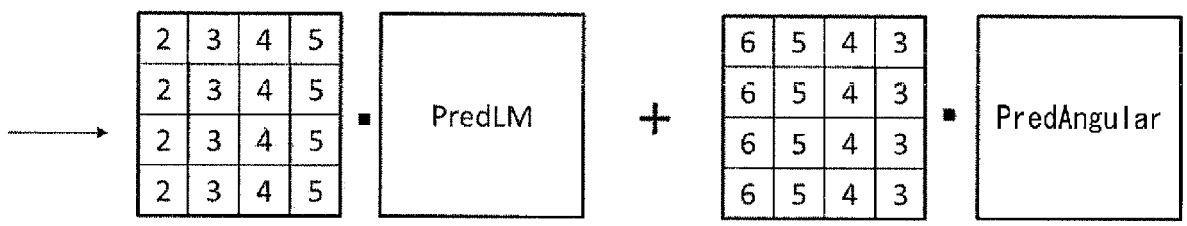
FIGS. 28A to 28C are diagrams illustrating an example of weights configured depending on prediction directions used for the directional prediction in adding the prediction image derived by the CCLM prediction and the prediction image derived by the directional prediction together to derive the prediction image.
Figure 28B:
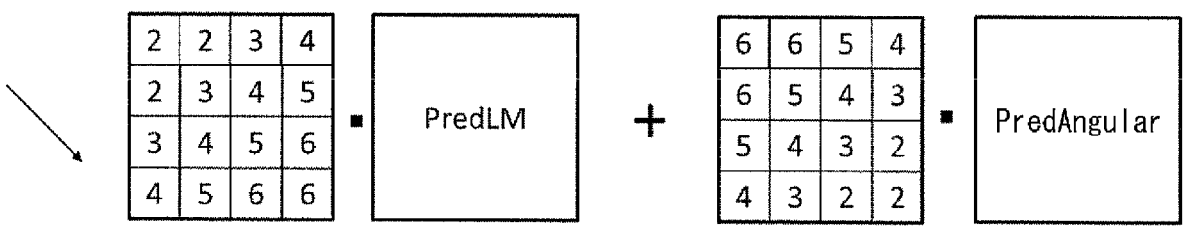
Figure 28C:
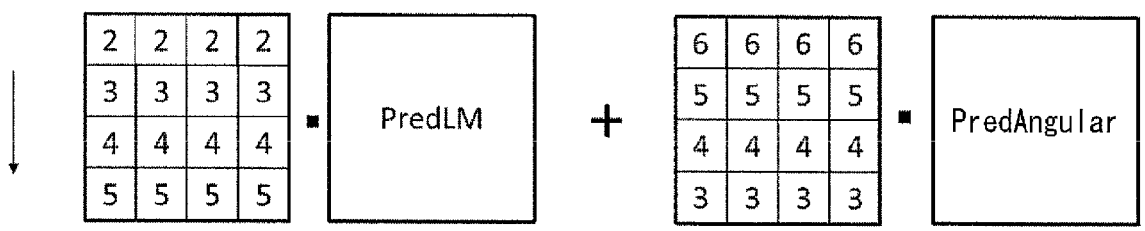

Example of Weighting in Accordance with Prediction Direction Used for Directional Prediction The intra prediction image generation unit 310 may set a weight in accordance with the prediction direction used for the directional prediction. As a result, the accuracy, of the prediction image can be further increased. This will be described based on FIGS. 28A to 28C. FIGS. 28A to 28C are diagrams illustrating an example of weights configured depending on prediction directions used for the directional prediction in adding the prediction image derived by the CCLM prediction and the prediction image derived by the directional prediction together to derive the prediction image. Note that in FIGS. 28A to 28C, the prediction direction used for the directional prediction is indicated by an arrow.

In the example of FIG. 28A, the prediction direction used for the directional prediction is the horizontal direction. In this case, the intra prediction image generation unit 310 configures the weight of the pixels located on the left side in the prediction image PredAngular to be greater than the weight of pixels located on the right side in the prediction image PredAngular.

In the example of FIG. 28B, the prediction direction used for the directional prediction is the top left diagonal direction. In this case, the intra prediction image generation unit 310 configures the weight in the pixel located in the top left in the prediction image PredAngular to be greater than the weight of the pixel located in the bottom right in the prediction image PredAngular.

In the example of FIG. 28C, the prediction direction used for the directional prediction is the vertical direction. In this case, the intra prediction image generation unit 310 configures the weights of the pixels located on the top side in the prediction image PredAngular to be greater than the weights of pixels located on the bottom side in the prediction image PredAngular.

Embodiment 6: Neighboring CCLM Model

The multiple-model CCLM that use multiple sets of CCLM prediction parameter (a, b) are considered to improve prediction accuracy compared to one model CCLM using a single set of CCLM prediction parameter (a, b). However, the number of reference points in the multiple-model CCLM may not be an exponential power of 2, and in such a case, the processing is complex. In order to solve the above-described problem, in the present embodiment, the CCLM parameter estimation unit 31041 derives the CCLM prediction parameter (left model) by the left neighboring region and the CCLM prediction parameter (top model) by the top neighboring region. Then, the CCLM prediction filter unit 31042 switches between using the left model and using the top model to generate a prediction image by the intra prediction image generation unit (prediction image generation unit) 310. As a result, the accuracy improving effect of the prediction image can be obtained by using the multiple models while reducing complexity.

Flow of Processing

Figure 29:
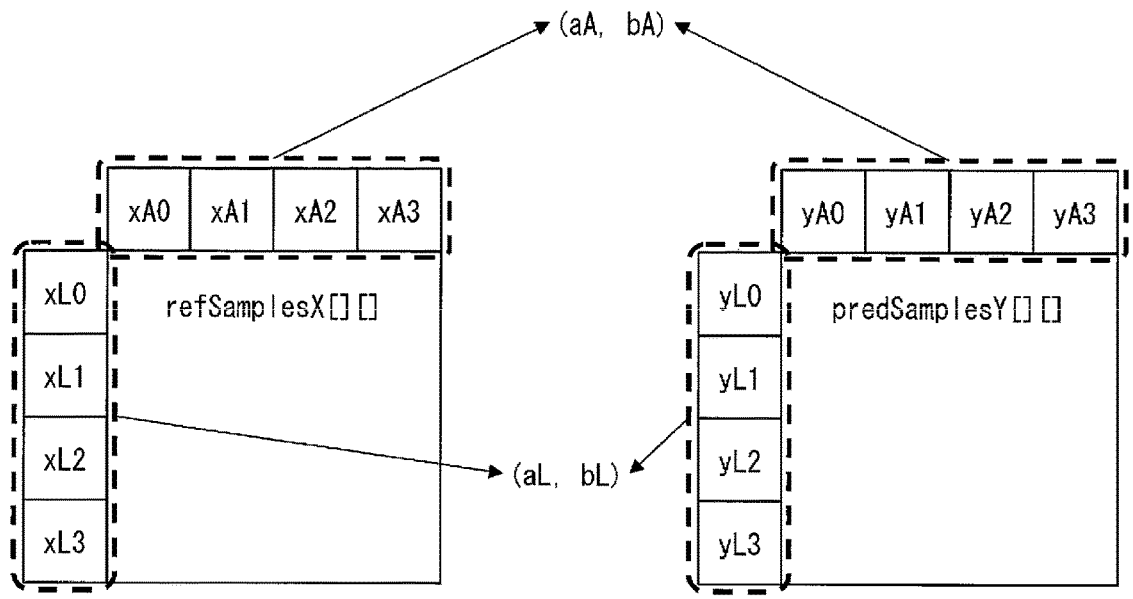
FIG. 29 is a diagram illustrating an example of a derivation method of CCLM prediction parameters.
Figure 30:
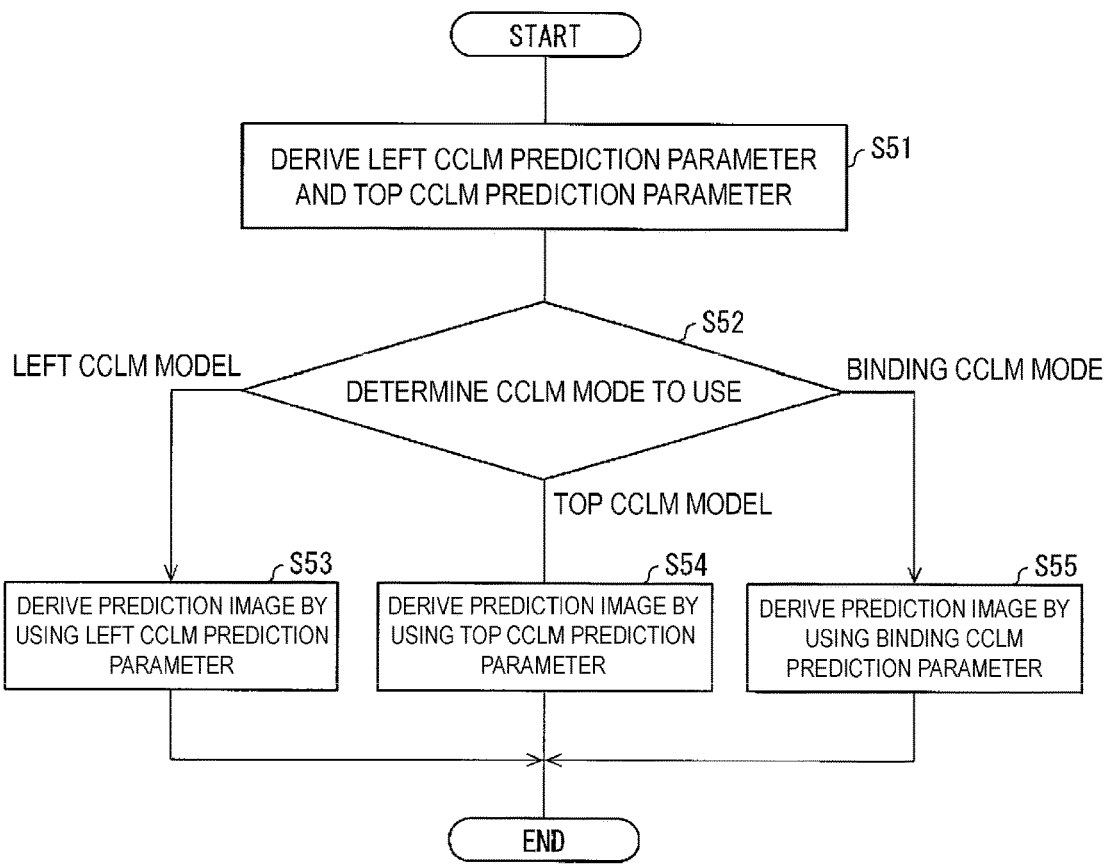
FIG. 30 is a flowchart illustrating an example of the processing performed by a CCLM parameter estimation unit and the CCLM prediction filter unit.

The flow of the processing performed by the CCLM parameter estimation unit (parameter derivation unit) 31041 and the CCLM prediction filter unit 31042 according to the present embodiment will be described based on FIG. 29 and FIG. 30. FIG. 29 is a diagram illustrating an example of a method for deriving the CCLM prediction parameter, and FIG. 30 is a flowchart illustrating an example of the processing performed by the CCLM parameter estimation unit 31041 and the CCLM prediction filter unit 31042. Although FIG. 29 is an example of a 4×4 size chrominance sub-block, the size of the chrominance sub-block is not limited to 4×4, but may be 8×8, 16×16 or the like.

As illustrated in FIG. 29, assume here that the top neighboring pixels of the target block (refSamplesX [ ] [ ]) are xA0 to xA3 and the left neighboring pixels are xL0 to xL3. Assume that the top neighboring pixels of the prediction image (predSamplesY [ ] [ ]) are yA0 to yA3 and the left neighboring pixels are yL0 to yL3. Note that, in the following description, a region where the top neighboring pixels exist may be referred to as a top reference region, and a region where the left neighboring pixels exist may be referred to as a left reference region.

Step S51

The CCLM parameter estimation unit 31041 derives the left CCLM prediction parameter and the top CCLM prediction parameter. The left CCLM prediction parameter is an CCLM prediction parameter derived from pixel values of pixels in the left neighboring region of the target block. The left CCLM prediction parameters aL and bL can be derived from the following equations.

$$aL=(N*\Sigma xL[i]yL[i]-\Sigma xL[i]\Sigma yL[i])/(N*\Sigma(xL[i]xL[i])-\Sigma xL[i]\Sigma xL[i])$$

$$bL=(\Sigma yL[i]-\Sigma xL[i]*aL)>>\log 2(NL)$$

Similarly, the top CCLM prediction parameter is a CCLM prediction parameter derived from pixel values of pixels in the top neighboring region of the target block. The top CCLM prediction parameters aA and bA can be derived from the following equations.

$$aA=(N*\Sigma xA[i]yA[i]-\Sigma xA[i]\Sigma yA[i])/(N*\Sigma(xA[i]xA[i])-\Sigma xA[i]\Sigma xA[i])$$

$$bA=(\Sigma yA[i]-\Sigma xA[i]*aA)>>\log 2(NA)$$

Here, NL and NA are the number of pixels in the left neighboring region and the top neighboring region.

Note that the left CCLM prediction parameter and the top CCLM prediction parameter may be determined from the weighted average of the left and the top parameters as follows. That is, the derived parameter (aL, bL, aA, bA) may be used as the intermediate parameter to derive linear parameters aL, bL, aA, bA to be used for the final prediction.

$$aL=(aL*w+(sum-w)*aA)>>SFT$$

$$aA=(aA\ w+(sum-w)aL)>>SFT$$

$$bL=(bL*w+(sum-w)*bA)>>SFT$$

$$bA=(bA*w-+(sum-w)bL)>>SFT$$

$$sum=1<<SFT$$

The CCLM parameter estimation unit 31041 may derive CCLM prediction parameters (combining CCLM parameters) and (a, b) from pixel values of pixels in both the left neighboring region and the top neighboring region. For example, (a, b) may be derived in the manner already described.

As described below, (a, b) may be derived from (aL, bL) and (aA, aL).

$$a=(aL+aA)>>1$$

$$b=(\Sigma y[i]-\Sigma x[i]*a)/N$$

Step S52

The CCLM prediction filter unit 31042 determines the CCLM model to be used. This processing is performed for each block or each pixel. The CCLM model to be used may be determined according to a preset flag. For example, the left CCLM model may be used for cclm_dir=1, the top CCLM model may be used for cclm_dir=2, and the combining CCLM model using both the left CCLM model and the top CCLM model may be used for cclm_dir=0. In the combining CCLM model, the prediction image is derived from the CCLM prediction parameters (the combining CCLM parameters described above) using both the left and top reference images.

In a case that the determination is made based on a predetermined value of cclm_dir, the CCLM prediction filter unit 31042 decodes the cclm_dir in CU units to determine a CCLM model to use for each CU from that value.

Step S53

In a case that using the left CCLM prediction parameter (cclm_dir=1), the CCLM prediction filter unit 31042 derives the prediction image by the following equation.

$$predSamplesY[x][y](aL*refSamplesX[x][y])>>shift+bL$$

Step S54

In a case that the top CCLM prediction parameter is used (cclm_dir=2), the CCLM prediction filter unit 31042 derives the prediction image by the following equation.

$$predSamplesY[x][y]=(aA*refSamplesX[x][y])>>shift+bA$$

Step S55

In a case that using the combining CCLM prediction parameter cclm_dir=0), the CCLM prediction filter unit 31042 derives the prediction image by the following equation.

$$predSamplesY[x][y]=(a*refSamplesX[x][y])>>shift+1)$$

Note that the combining CCLM model is not required to be included in the option of step S52, and in a case that the combining CCLM model is not included in the option, the process branches from step S52 to step S53 and step S54, and S55 is not processed.

Other Example 1 of CCLM Model Determination

In step S52 described above, the CCLM model to be used may be determined in accordance with the directionality indicated by the intra prediction mode intraPredModeC. In this case, the CCLM prediction filter unit 31042 may determine the value of cclm_dir as described below from a comparison with the prescribed intra prediction mode predModeLU.

$cclm\_dir=1$ for intraPredModeC<predModeLU,

Otherwise $cclm\_dir=2$.

As described below, the CCLM prediction filter unit 31042 may determine the value of cclm_dir depending on whether or not the directionality of intraPredModeC is around the vertical intra prediction mode predV and the horizontal intra prediction mode predModeH (closeness of thRange or less).

If |intraPredModeC−predModeV|<thRange, $cclm\_dir=2$,

If |intraPredModeC−predModeH|<thRange, $cclm\_dir=1$, otherwise $cclm\_dir=0$.

Note that, as illustrated in FIG. 12, predModeV is 50 (vertical direction), predModeff is 18 (horizontal direction), and thRange is 5. predModeLU being 34 is the top left diagonal direction. The intra prediction mode number and the range thRange are not limited to the above-described example (50, 18, 34, 5).

Other Example 2 of CCLM Model Determination

In step S52 described above, for each pixel in the target block, distance to the left reference region and distance to the top reference region may be compared and a CCLM model corresponding to the nearest distance neighboring pixel may be used. That is, the CCLM model may be switched depending on the position of the pixels in the target block.

The distance may be the Euclidean distance (city block distance). In this case, the CCLM prediction filter unit 31042 determines the cclm_dir value from the intra-block position (x, y) of the pixel as described below.

$cclm\_dir[x][y]=(x<y)?1:2$

Other Example 3 of CCLM Model Determination

The distance may be a distance between pixel values. In this case, the CCLM prediction filter unit 31042 determines the cclm_dir value as described below. cclm_dir [x] [y]=abs (refSamplesX [x] [y]−aveXL)<abs (refSamplesX [x] [y]−aveXA)?1:2

Note that in this case, the CCLM prediction filter unit 31042 derives XL and XA by the following equations for the left reference region and the top reference region.

$XL=\Sigma xL[i]$ $XA=\Sigma xA[i]$ iCountShiftL=log 2 (the number of pixels in the left reference region $NL$)

iCountShiftA=log 2 (the number of pixels in the top reference region $NA$)

aveXL=$XL$>>iCountShiftL aveXA=$XA$>>iCountShiftA

In the present example, prediction parameters of multiple models are generated in advance, and the CCLM model with the smaller distance between pixel values (the pixel value of the target block and the representative pixel value of the model) is selected to use. In other words, the model is switched depending of the pixel value of the previously derived other color component described above in the target pixel.

Using 3 Models

Figure 31:
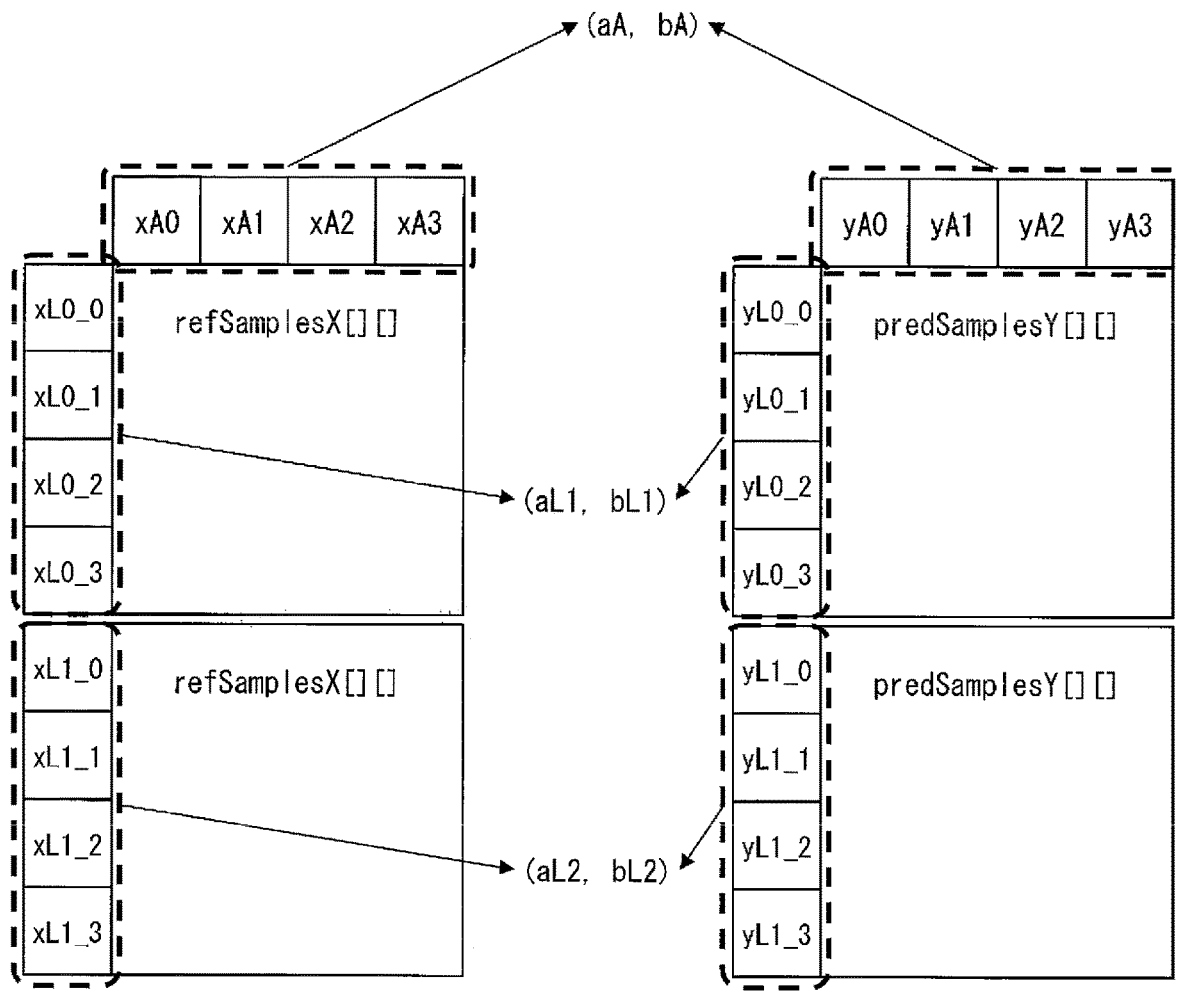
FIG. 31 is a diagram illustrating an example using two left CCLM models and one top CCLM model in the 8×4 block.

In the example described above, two of the top CCLM model and the left CCLM model are used, but three or more CCLM models can be used. Here, the example using three CCLM models will be described based on FIG. 31 and FIG. 32. FIG. 31 illustrates an example of using two left CCLM models and one top CCLM model in 8×4 blocks, and FIG. 32 illustrates an example of using a left CCLM model, a top CCLM model, and a common CCLM model in 4×4 blocks.

In the example of FIG. 31, two left reference regions are configured. In this case, the CCLM parameter estimation unit 31041 derives the left CCLM prediction parameter from each of the left reference regions. More specifically, the CCLM parameter estimation unit 31041 derives a first left CCLM prediction parameter (aL1, bL1) from one left reference region and a second left CCLM prediction parameter (aL2, bL2) from the other left reference region. The derivation of the top CCLM prediction parameter is similar to the example of FIG. 29. Note that, it is also possible to use two top CCLM models and one left CCLM model as well.

Figure 32:
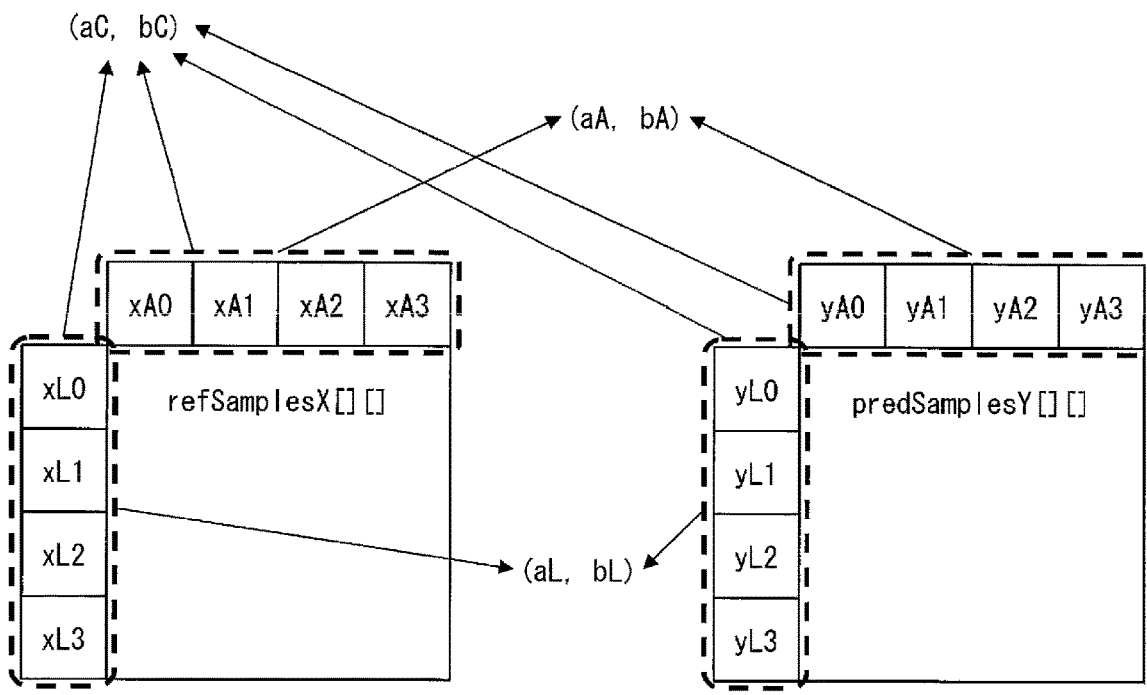
FIG. 32 is a diagram illustrating an example using a left CCLM model, a top CCLM model, and a common CCLM model in the 4×4 block.

In the example of FIG. 32, a left CCLM prediction parameter (aL, bL) is derived in the same manner as the example of FIG. 29, and a top CCLM prediction parameter bA) is derived. In the example of FIG. 32, in addition to these CCLM prediction parameters, CCLM prediction parameter (aC, bC) are derived from both the left reference region and the top reference region.

In a case that such three CCLM models are used, in step S52 of FIG. 30, each pixel value in the target block and the CCLM model with the smallest distance of each representative value of the CCLM model may be used. The representative value is the xi (i is 0 ... N) pixel average value of the left neighboring region and the top neighboring region in the CCLM prediction parameter (aC, bC), the xi pixel average value of the left neighboring region in the left CCLM prediction parameter (aL, bL), and the xi pixel average value of the top neighboring region in the top CCLM prediction parameter (aA, bA).

Embodiment 7: Multiple CCLM Model

Figure 33:
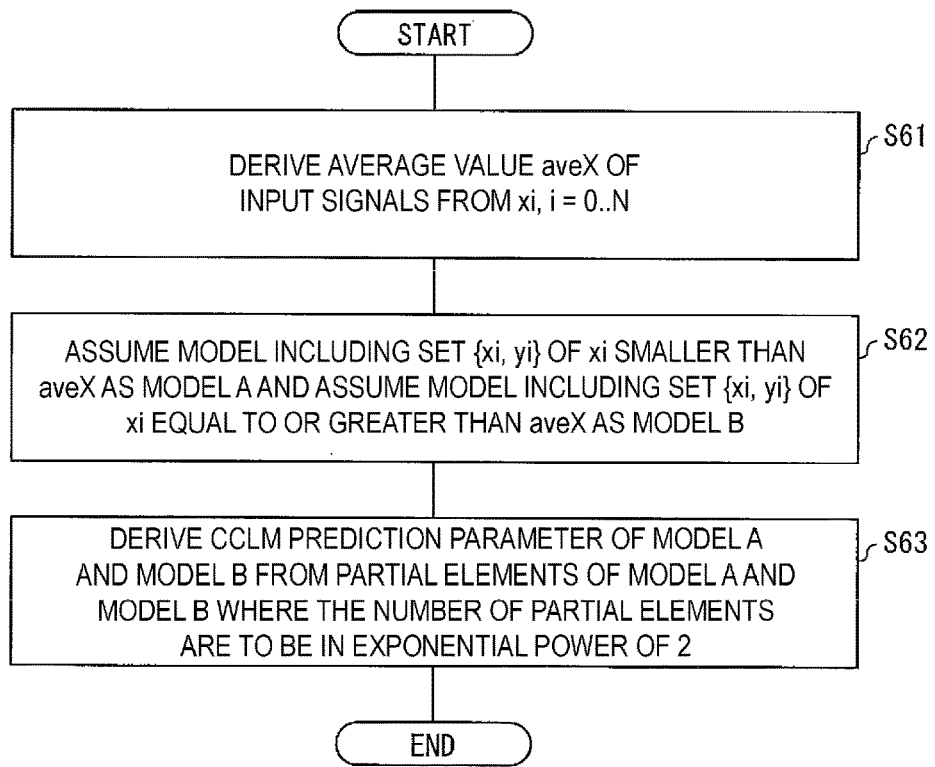
FIG. 33 is a flowchart illustrating an example of processing to derive CCLM prediction parameters after having adjusted the number of reference points to be a number of an exponential power of 2.

As described in the beginning of Embodiment 6, the number of reference points in the multiple-model CCLM may not be an exponential power of 2, and in such a case, the processing is complex. In the present embodiment, an example is described in which the CCLM prediction parameter is derived after adjusting the number of reference points to be an exponential power of 2. As a result, the accuracy improving effect of the prediction image can be obtained by using the multiple models while reducing complexity, Flow of Processing: Partial Element Extraction The flow of the processing for deriving the CCLM prediction parameter according to the present embodiment will be described based on FIG. 33. FIG. 33 is a flowchart illustrating an example of the processing to derive CCLM prediction parameter after having adjusted the number of reference points to be a number of an exponential power of 2.

Step S61

The CCLM parameter estimation unit (parameter derivation unit) 31041 derives the average value aveX of the input signal from the input signal xi, i=0 . . . N.

Step S62

The CCLM parameter estimation unit 31041 assumes a model constituted by a set {xi, yi} of xi smaller than aveX as model A, and a model constituted by a set of xi equal to or greater than aveX as model B. That is, in the processing of steps S61 and S62, elements of one model are classified into two. In other words, reference pixels (reference points) included in neighboring regions next to the target block including the target pixel are divided into multiple sets.

Step S63

The CCLM parameter estimation unit 31041 derives the CCLM prediction parameters of model A and model B from the partial elements of model A and model B such that the number of the partial elements is an exponential power of 2, respectively. In other words, the number of reference pixels (reference points) of an exponential power of 2 among the reference pixels included in each set obtained in the processing in step S62 are used to derive the CCLM prediction parameter. More specifically, the CCLM parameter estimation unit 31041 selects the elements of a maximum number of an exponential power of 2 NA2 equal or less than NA from the elements of model A in a case that the number of elements of model A is NA, and uses the partial elements constituted by these elements to derive the CCLM prediction parameter of model A.

Specifically, NA2 is calculated using the following equation.

$$NA2=POW(2,\text{floor}(\log 2(NA))$$

According to the above equation, an exponential power POW of 2 is calculated again by rounding off (floor) a number of log 2 of NA to integer. Thus, a maximum number NA2 of an exponential power of 2 equal to or less than NA can be derived.

Similarly to model A, for the CCLM prediction parameter of model B (the number of elements NB), first, the maximum number NB2 of the exponential power of 2 equal to or less than NB is derived by the following equation.

$$NB2=POW(2,\text{floor}(\log 2(NB))$$

Thereafter, the CCLM parameter estimation unit 31041 selects NA2 elements from the elements of model A. For example, the NA2 elements among elements {xi, yi} may be selected as i=0 . . . NA2−1. Then, the CCLM prediction parameters are derived using these elements. Similar to model B, the NB2 elements are selected from elements of model B and those elements are used to derive the CCLM prediction parameter. Since both of NA2 and NB2 are numbers of exponential power of 2, the CCLM prediction parameter b can be derived without division. That is, the quotient of NA2 in the case of deriving b of model A may be derived with a right shift by log 2 NA2=floor (log 2 (NA) without division. The quotient of NB2 in the case of deriving b of model A may be derived by a right shift by log 2 NB2 floor (log 2 (NB). Thereafter, the intra prediction image generation unit (prediction image generation unit) 310 generates the prediction image by linear prediction using the CCLM prediction parameter derived as described above.

Flow of Processing: Element Addition

Figure 34:
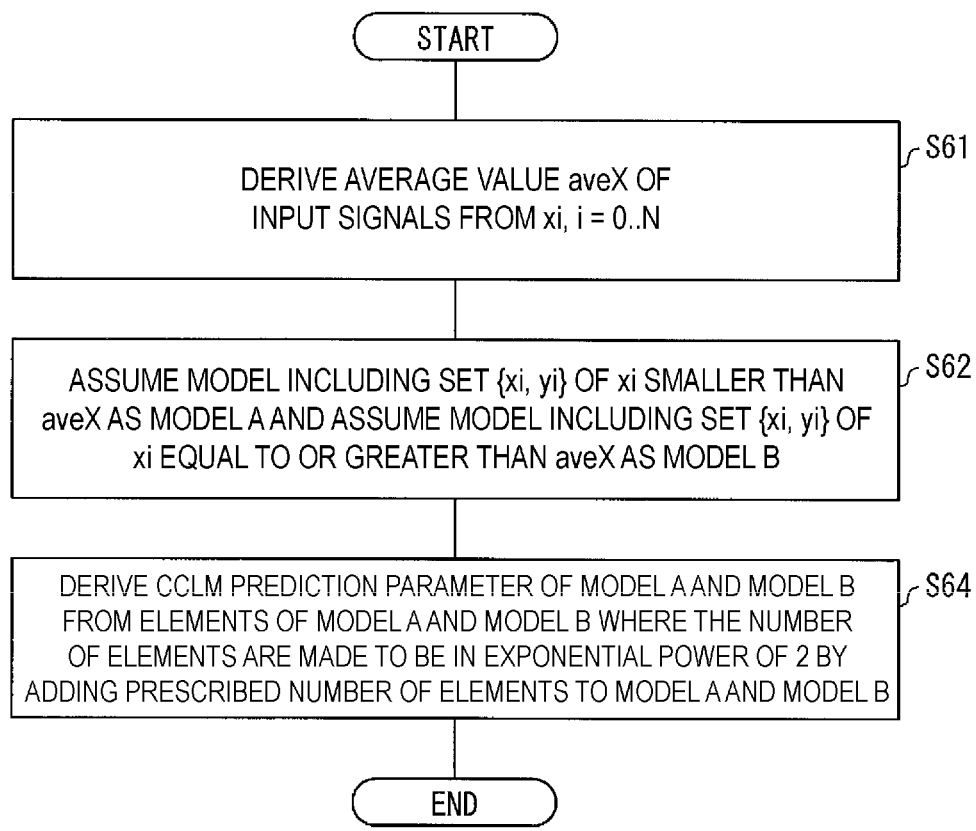
FIG. 34 is a flowchart illustrating an example of processing to derive CCLM prediction parameters after having added and adjusted the number of reference points to be a number of an exponential power of 2.

By adding the number of reference points and adjusting to be the number of exponential power of 2, it is not necessary to perform division at the time of the derivation of the CCLM prediction parameter b. This will be described based on FIG. 34. FIG. 34 is a flowchart illustrating an example of the processing to derive CCLM prediction parameters after having added and adjusted the number of reference points to be a number of an exponential power of 2. Note that steps S61 and S62 are the same as in FIG. 33, and thus the descriptions thereof will be omitted.

Step S64

The CCLM parameter estimation unit 31041 adds the prescribed number of elements to model A and model B, and derives the CCLM prediction parameters of model A and model B from the elements of model A and model B so that the number of elements is an exponential power of 2. In other words, one or multiple reference pixels are added to a set in which the number of reference pixels is not an exponential power of 2 among the sets obtained in the processing of step S62, the reference pixels included in each set is made to be in the numbers of exponential power of 2, and after that CCLM prediction parameters are derived.

The number of elements added can be calculated by the following equation. Note that NA2 in the following equation is the number of the smallest exponential power of 2 equal to or greater than the number of elements NA of model A.

$$NA2=POW(2,\text{ceil}(\log 2(NA)))$$

Similarly, the number NB2 of the smallest exponential power of 2 greater than or equal to the number of elements NB of model B can be calculated by the following equation.

$$NB2=POW(2,\text{ceil}(\log 2(NB)))$$

Since model A only has i=0 . . . NA−1 elements, the number of components in model A is adjusted to be NA2 by addition of the deficient (NA2−NA) elements. Elements can be added using xi, yi of the representative values of model A.

Representative values of xi and yi may be derived, for example, from an average value of xi and an average value of yi of model A. However, in a case that an average is derived from elements which number is other than the exponential power of 2, a division is also required. Therefore, (1) a median value (median) of three appropriately selected values (for example, three elements of position 0, position NA−1, and position NA/2), (2) an average of maximum and minimum values, or (3) an average value of the maximum number and the minimum number excluding the maximum value and the minimum value (in other words, the second largest number and the second smallest number), and the like are used. These configurations do not require division.

The same is true for model B and NB2−NB elements are added using xi, yi of the representative values of model B. The method of deriving the representative value of model B may be the same as model A.

Note that, in the above description, model A and model B are exemplified to describe a method for deriving representative values of two models, but the number of models is not limited to 2, Three models of model A, model B, and model C, or only one model may be used.

Others

Note that part of the image coding apparatus 11 or the image decoding apparatus 31 according to the previously described embodiments, for example, the prediction image generation unit 101, the intra prediction image generation unit 310, the CCLM prediction unit 3104, the CCLM parameter estimation unit 31041, the intra prediction parameter decoding unit 304, the MPM candidate list derivation unit 30431, the MPM parameter decoding unit 30432, the MPM parameter derivation unit 11332, and blocks included in each unit, may be implemented as a computer. In that case, this configuration may be realized by recording a program for realizing such control functions on a computer-readable recording medium and causing a computer system to read the program recorded on the recording medium for execution. Note that it is assumed that the "computer system" mentioned here refers to a computer system built into either the image coding apparatus 11 or the image decoding apparatus 31, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system. Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Part or all of the image coding apparatus 11 and the image decoding apparatus 31 in the above-described embodiments may be realized as an integrated circuit such as a Large Scale Integration (LSI). Each function block of the image coding apparatus 11 and the image decoding apparatus 31 may be individually realized as processors, or part or all may be integrated into processors. The circuit integration technique is not limited to an LSI, and the integrated circuits for the functional blocks may be realized as dedicated circuits or a multi-purpose processor. Furthermore, in a case that a circuit integration technology with which an LSI is replaced appears with advances in the semiconductor technology, integrated circuits based on the technology may be used.

Application Examples

The above-mentioned image coding apparatus 11 and the image decoding apparatus 31 can be utilized being installed to various apparatuses performing transmission, reception, recording, and regeneration of videos. Note that, videos may be natural videos imaged by cameras or the like, or may be artificial videos (including CG and GUI) generated by computers or the like.

At first, referring to FIGS. 35A and 35B, it will be described that the above-mentioned image coding apparatus 11 and the image decoding apparatus 31 can be utilized for transmission and reception of videos.

Figure 35A:
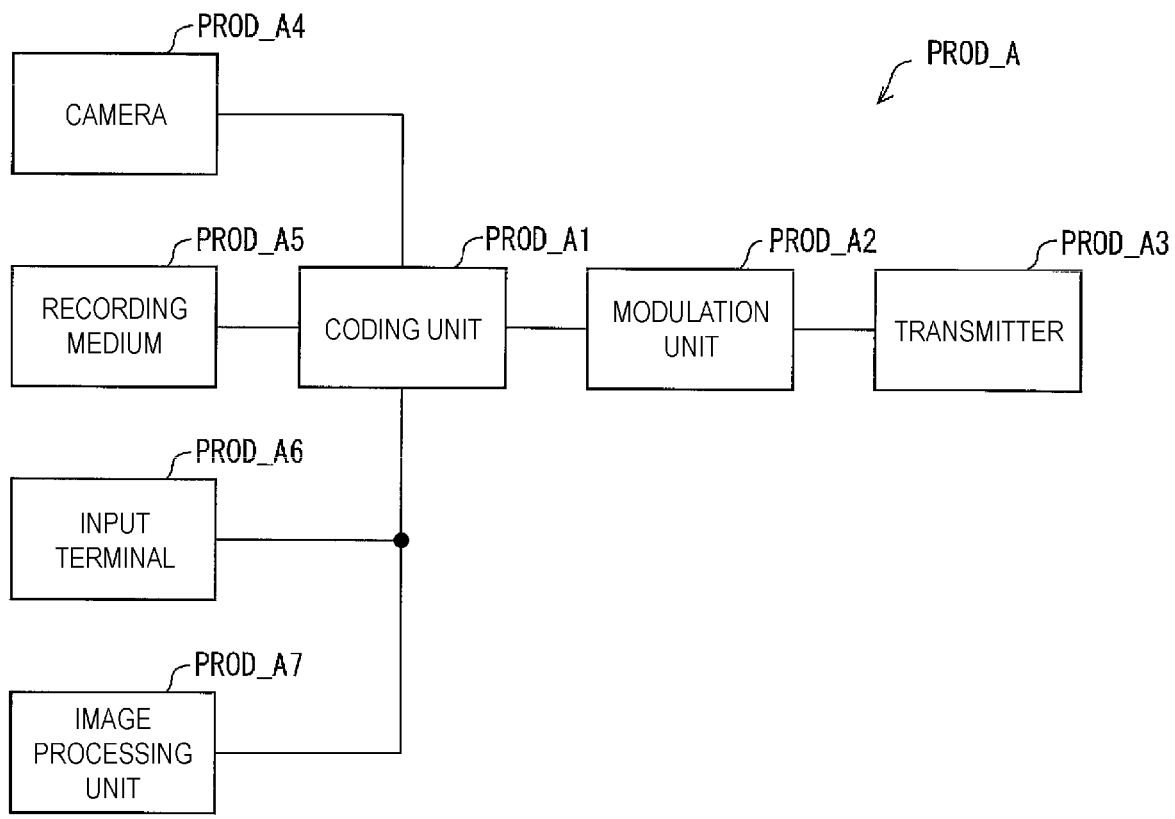
FIGS. 35A and 35B are diagrams illustrating configurations of a transmitting apparatus equipped with the image coding apparatus and a receiving apparatus equipped with the image decoding apparatus according to Embodiment 1.

FIG. 35A is a block diagram illustrating a configuration of a transmitting apparatus PROD_A installed with the image coding apparatus 11. As illustrated in FIG. 35A, the transmitting apparatus PROD_A includes a coding unit PROD_A1 which obtains coded data by coding videos, a modulation unit PROD_A2 which obtains modulating signals by modulating carrier waves with the coded data obtained by the coding unit PROD_A1, and a transmitter PROD_A3 which transmits the modulating signals obtained by the modulation unit PROD_A2. The above-mentioned image coding apparatus 11 is utilized as the coding unit PROD_A1.

The transmitting apparatus PROD_A may further include a camera PROD_A4 imaging videos, a recording medium PROD_A5 recording videos, an input terminal PROD_A6 to input videos from the outside, and an image processing unit A7 which generates or processes images, as sources of supply of the videos input into the coding unit PROD_A1. In FIG. 35A, although the configuration that the transmitting apparatus PROD_A includes these all is exemplified, part may be omitted.

Note that the recording medium PROD_A5 may record videos which are not coded, or may record videos coded in a coding scheme for recording different from a coding scheme for transmission. In the latter case, a decoding unit (not illustrated) to decode coded data read from the recording medium PROD_A5 according to the coding scheme for recording may be interleaved between the recording medium PROD_A5 and the coding unit PROD_A1.

Figure 35B:
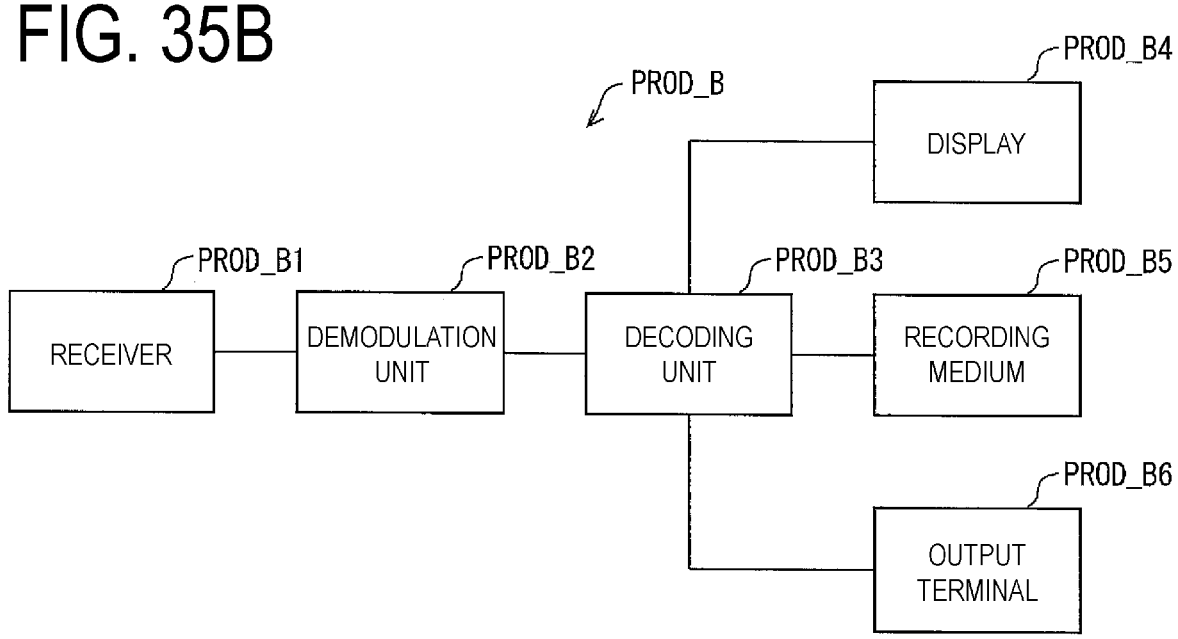

FIG. 35B is a block diagram illustrating a configuration of a receiving apparatus PROD_B installed with the image decoding apparatus 31. As illustrated in FIG. 35B, the receiving apparatus PROD_B includes a receiver PROD_B1 which receives modulating signals, a demodulation unit PROD_B2 which obtains coded data by demodulating the modulating signals received by the receiver PROD_B1, and a decoding unit PROD_B3 which obtains videos by decoding the coded data obtained by the demodulation unit PROD_B2. The above-mentioned image decoding apparatus 31 is utilized as the decoding unit PROD_B3.

The receiving apparatus PROD_B may further include a display PROD_B4 displaying videos, a recording medium PROD_B5 to record the videos, and an output terminal PROD_B6 to output videos to the outside, as supply destinations of the videos output by the decoding unit PROD_B3. In FIG. 35B, although the configuration that the receiving apparatus PROD_B includes these all is exemplified, part may be omitted.

Note that the recording medium PROD_B5 may record videos which are not coded, or may record videos which are coded in a coding scheme different from a coding scheme for transmission. In the latter case, a coding unit (not illustrated) to code videos acquired from the decoding unit PROD_B3 according to a coding scheme for recording may be interleaved between the decoding unit PROD_B3 and the recording medium PROD_B5.

Note that the transmission medium transmitting modulating signals may be wireless or may be wired. The transmission aspect to transmit modulating signals may be broadcasting (here, referred to as the transmission aspect where the transmission target is not specified beforehand) or may be telecommunication (here, referred to as the transmission aspect that the transmission target is specified beforehand). Thus, the transmission of the modulating signals may be realized by any of radio broadcasting, cable broadcasting, radio communication, and cable communication.

For example, broadcasting stations (broadcasting equipment, and the like)/receiving stations (television receivers, and the like) of digital terrestrial television broadcasting is an example of transmitting apparatus PROD_A/receiving apparatus PROD_B transmitting and/or receiving modulating signals in radio broadcasting. Broadcasting stations (broadcasting equipment, and the like)/receiving stations (television receivers, and the like) of cable television broadcasting are an example of transmitting apparatus PROD_A/ receiving apparatus PROD_B transmitting and/or receiving modulating signals in cable broadcasting.

Servers (work stations, and the like)/clients (television receivers, personal computers, smartphones, and the like) for Video On Demand (VOD) services, video hosting services using the Internet and the like are an example of transmitting apparatus PROD_A/receiving apparatus PROD_B transmitting and/or receiving modulating signals in telecommunication (usually, any of radio or cable is used as a transmission medium in the LAN, and cable is used for as a transmission medium in the WAN). Here, personal computers include a desktop PC, a laptop type PC, and a graphics tablet type PC. Smartphones also include a multi-functional portable telephone terminal.

Note that a client of a video hosting service has a function to code a video imaged with a camera and upload the video to a server, in addition to a function to decode coded data downloaded from a server and to display on a display. Thus, a client of a video hosting service functions as both the transmitting apparatus PROD_A and the receiving apparatus PROD_B.

Next, referring to FIGS. 36A and 36B, it will be described that the above-mentioned image coding apparatus 11 and the image decoding apparatus 31 can be utilized for recording and regeneration of videos.

Figure 36A:
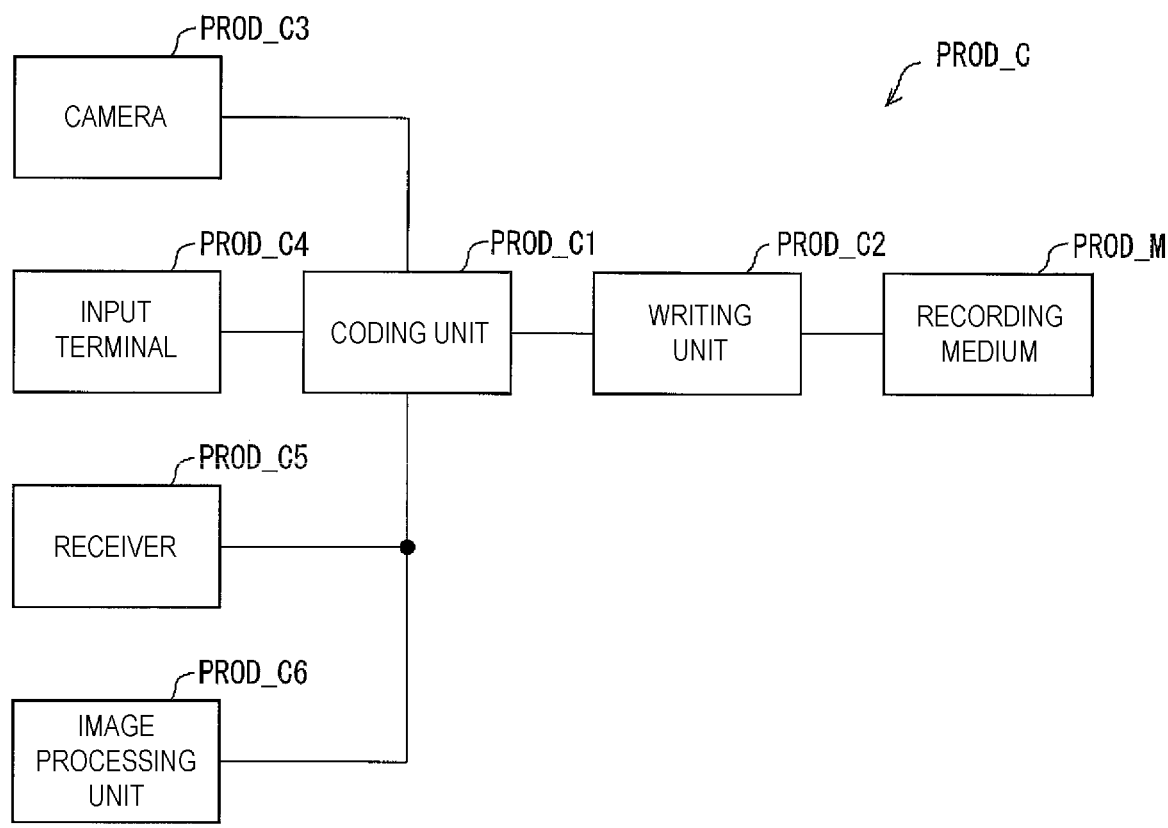
FIGS. 36A and 36B are diagrams illustrating configurations of a recording apparatus equipped with the image coding apparatus and a regeneration apparatus equipped with the image decoding apparatus according to Embodiment 1.

FIG. 36A is a block diagram illustrating the configuration of a recording apparatus PROD_C installed with the above-mentioned image coding apparatus 11. As illustrated in FIG. 36A, the recording apparatus PROD_C includes a coding unit PROD_C1 which obtains coded data by coding a video, and a writing unit PROD_C2 which writes the coded data obtained by the coding unit PROD_C1 in a recording medium PROD_M. The above-mentioned image coding apparatus 11 is utilized as the coding unit PROD_C1.

Note that the recording medium PROD_M may be (I) a type built in the recording apparatus PROD_C such as Hard Disk Drive (HDD) or Solid State Drive (SSD), may be (2) a type connected to the recording apparatus PROD_C such as an SD memory card or a Universal Serial Bus (USB) flash memory, and may be (3) a type loaded in a drive apparatus (not illustrated) built in the recording apparatus PROD_C such as Digital Versatile Disc (DVD) or Blu-ray Disc (BD: trade name).

The recording apparatus PROD_C may further include a camera PROD_C3 imaging a video, an input terminal PROD_C4 to input the video from the outside, a receiver PROD_C5 to receive the video, and an image processing unit PROD_C6 which generates or processes images, as sources of supply of the video input into the coding unit PROD_C1. In FIG. 36A, although the configuration that the recording apparatus PROD_C includes these all is exemplified, part may be omitted.

Note that the receiver PROD_C5 may receive a video which is not coded, or may receive coded data coded in a coding scheme for transmission different from a coding scheme for recording. In the latter case, a decoding unit (not illustrated) for transmission to decode coded data coded in a coding scheme for transmission may be interleaved between the receiver PROD_C5 and the coding unit PROD_C1.

Examples of such recording apparatus PROD_C include a DVD recorder, a BD recorder, a Hard Disk Drive (HDD) recorder, and the like (in this case, the input terminal PROD_C4 or the receiver PROD_C5 is the main source of supply of a video). A camcorder (in this case, the camera PROD_C3 is the main source of supply of a video), a personal computer (in this case, the receiver PROD_C5 or the image processing unit C6 is the main source of supply of a video), a smartphone (in this case, the camera PROD_C3 or the receiver PROD_C5 is the main source of supply of a video), or the like is an example of such recording apparatus PRODS.

Figure 36B:
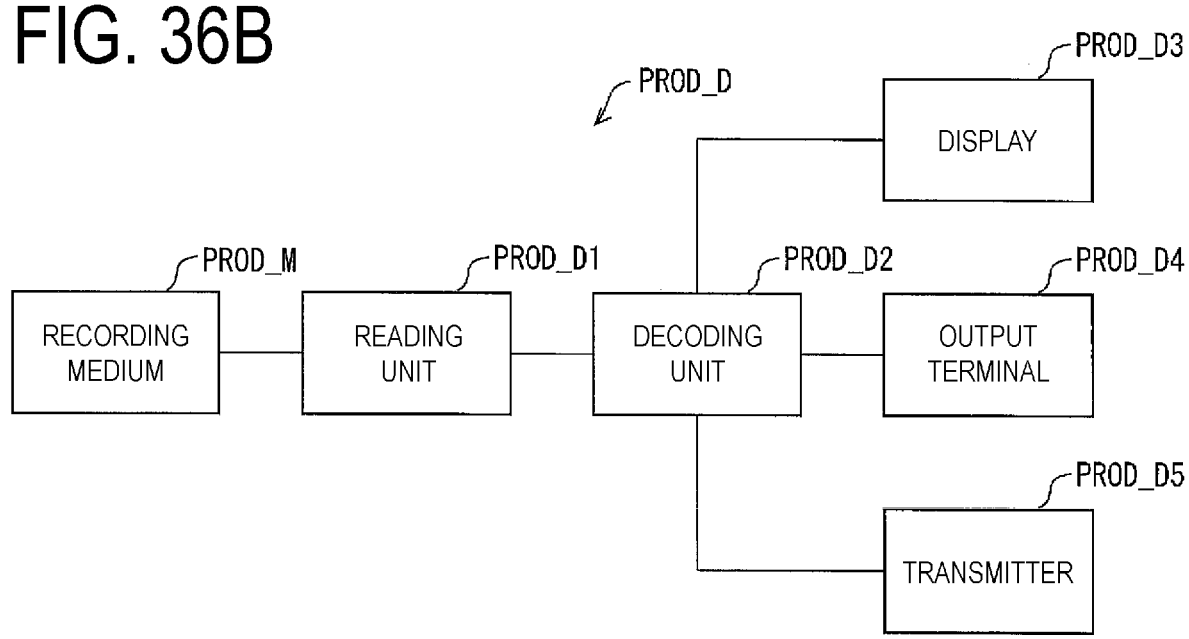

FIG. 36B is a block diagram illustrating the configuration of a regeneration apparatus PROD_D installed with the above-mentioned image decoding apparatus 31. As illustrated in FIG. 36B, the regeneration apparatus PROD_D includes a reading unit PROD_D1 which reads coded data written in the recording medium PROD_M, and a decoding unit PROD_D2 which obtains a video by decoding the coded data read by the reading unit PROD_D1. The above-mentioned image decoding apparatus 31 is utilized as the decoding unit PROD_D2.

Note that the recording medium PROD_M may be (1) a type built in the regeneration apparatus PROD_D such as HDD or SSD, may be (2) a type connected to the regeneration apparatus PROD_D such as an SD memory card or a USB flash memory, and may be (3) a type loaded in a drive apparatus (not illustrated) built in the regeneration apparatus PROD_D such as DVD or BD.

The regeneration apparatus PROD_D may further include a display PROD_D3 displaying a video, an output terminal PROD_D4 to output the video to the outside, and a transmitter PROD_D5 which transmits the video, as the supply destination of the video output by the decoding unit PROD_D2. In FIG. 36B, although the configuration that the regeneration apparatus PROD_D includes these all is exemplified, part may be omitted.

Note that the transmitter PROD_D5 may transmit a video which is not coded, or may transmit coded data coded in a coding scheme for transmission different from a coding scheme for recording. In the latter case, a coding unit (not illustrated) to code a video in a coding scheme for transmission may be interleaved between the decoding unit PROD_D2 and the transmitter PROD_D5.

Examples of such regeneration apparatus PROD_D include a DVD player, a BD player, an HDD player, and the like (in this case, the output terminal PROD_D4 to which a television receiver, and the like is connected is the main supply target of the video). A television receiver this case, the display PROD_D3 is the main supply target of the video), a digital signage (also referred to as an electronic signboard or an electronic bulletin board, and the like, the display PROD_D3 or the transmitter PROD_D5 is the main supply target of the video), a desktop PC (in this case, the output terminal PROD_D4 or the transmitter PROD_D5 is the main supply target of the video), a laptop type or graphics tablet type PC (in this case, the display PROD or the transmitter PROD_D5 is the main supply target of the video), a smartphone (in this case, the display PROD_D3 or the transmitter PROD_D5 is the main supply target of the video), or the like is an example of such regeneration apparatus PROD_D.

Realization as Hardware and Realization as Software

Each block of the above-mentioned image decoding apparatus 31 and the image coding apparatus 11 may be realized as a hardware by a logical circuit formed on an integrated circuit (IC chip), or may be realized as a software using Central Processing Unit (CPU).

In the latter case, each apparatus includes a CPU performing a command of a program to implement each function, a Read Only Memory (ROM) stored in the program, a Random Access Memory (RAM) developing the program, and a storage apparatus (recording medium) such as a memory storing the program and various data, and the like. The purpose of the embodiments of the present invention can be achieved by supplying, to each of the apparatuses, the recording medium recording readably the program code (an execution form program, an intermediate code program, a source program) of the control program of each of the apparatuses which is a software implementing the above-mentioned functions with a computer, and reading and performing the program code that the computer (or a CPU or an MPU) records in the recording medium.

For example, as the recording medium, a tape such as a magnetic tape or a cassette tape, a disc including a magnetic disc such as a floppy (trade name) disk/a hard disks and an optical disc such as a Compact Disc Read-Only Memory (CD-ROM)/Magneto-Optical disc (MO disc)/Mini Disc (MI))/Digital Versatile Disc (DVD)/CD Recordable (CD-R)/Btu-ray Disc (trade name), a card such as an IC card (including a memory card)/an optical memory card, a semiconductor memory such as a mask ROM/Erasable Programmable Read-Only Memory (EPROM)/Electrically Erasable and Programmable Read-Only Memory (EEPROM: trade name)/a flash ROM, or a Logical circuits such as a Programmable logic device (PLD) or a Field Programmable Gate Array (FPGA) can be used.

Each of the apparatuses is configured to be connectable with a communication network, and the program code may be supplied through the communication network. This communication network may be able to transmit a program code, and is not specifically limited. For example, the Internet, the intranet, the extranet, a Local Area Network (LAN), an Integrated Services Digital Network (ISDN), a Value-Added Network (VAN), a Community Antenna television/Cable Television (CATV) communication network, a Virtual Private Network, a telephone network, a mobile communication network, a satellite communication network, and the like are available. A transmission medium constituting this communication network may also be a medium which can transmit a program code, and is not limited to a particular configuration or a type. For example, a cable communication such as Institute of Electrical and Electronic Engineers (IEEE) 1394, a USB, a power line carrier, a cable TV line, a phone line, an Asymmetric Digital Subscriber Line (ADSL) line, and a radio communication such as infrared ray such as Infrared Data Association (IrDA) or a remote control, Bluetooth (trade name), IEEE 802.11 radio communication, High Data Rate (HDR), Near Field Communication (NFC), Digital Living Network Alliance (DLNA: trade name), a cellular telephone network, a satellite channel, a terrestrial digital broadcast network are available. Note that the embodiments of the present invention can be also realized in the form of computer data signals embedded in a carrier wave where the program code is embodied by electronic transmission.

Supplemental Note

The embodiments of the present invention are not limited to the above-mentioned embodiments, and various modifications are possible within the scope of the claims. Thus, embodiments obtained by combining technical means modified appropriately within the scope defined by claims are included in the technical scope of the present invention.

CROSS-REFERENCE OF RELATED APPLICATION

This application claims the benefit of priority to JP 2016-248198 filed on Dec. 21, 2016, which is incorporated herein by reference in its entirety.

INDUSTRIAL APPLICABILITY

The embodiments of the present invention can be preferably applied to an image decoding apparatus to decode coded data where graphics data is coded, and an image coding apparatus to generate coded data where graphics data is coded. The embodiments of the present invention can be preferably applied to a data structure of coded data generated by the image coding apparatus and referred to by the image decoding apparatus.

REFERENCE SIGNS LIST

11 Image coding apparatus
101 Prediction image generation unit (intra prediction image generation apparatus, prediction parameter derivation unit, sub-block coordinate derivation unit)
11332 MPM parameter derivation unit (prediction parameter derivation unit)
31 Image decoding apparatus
308 Prediction image generation unit (intra prediction image generation apparatus, prediction parameter derivation unit, sub-block coordinate derivation unit)
310 Intra prediction image generation unit (second derivation unit)
3104 CCLM prediction unit (first derivation unit)
31041 CCLM parameter estimation unit (parameter derivation unit)
304 Intra prediction parameter decoding unit (prediction mode derivation unit)
30431 MPM candidate list derivation unit
30432 MPM parameter decoding unit (prediction parameter derivation unit)

The invention claimed is:

1. An intra prediction image generation device for generating an intra prediction image, the intra prediction image generation device comprising:
  prediction parameter derivation circuitry that decodes a Cross-Component Linear Model (CCLM) index and derives prediction parameters of a current block when a cross-component linear model is applied; and
  prediction image generation circuitry that generates the intra prediction image by using the prediction parameters, a sample value of a luma component and a shift value,
  wherein:
  the prediction parameter derivation circuitry specifies one of three cross-component linear models by using the CCLM index,
  in a case that a top CCLM model of the three cross-component linear models is specified, the prediction parameter derivation circuitry derives the prediction parameters by using at least neighboring top luma pixel values and neighboring top chroma pixel values,
  in a case that a left CCLM model of the three cross-component linear models is specified, the prediction parameter derivation circuitry derives the prediction parameters by using at least neighboring left luma pixel values and neighboring left chroma pixel values, and in a case that a combining CCLM model of the three cross-component linear models is specified, the prediction parameter derivation circuitry derives the prediction parameters by using at least one of neighboring top luma pixel values, neighboring top chroma pixel values, neighboring left luma pixel values and neighboring left chroma pixel values.

2. An image decoding apparatus comprising the intra prediction image generation device according to claim 1.

3. An image coding apparatus comprising the intra prediction image generation device according to claim 1.

4. The intra prediction image generation device according to claim 1, wherein
in the case that the top CCLM model of the three cross-component linear models is specified,
the prediction parameters are derived by using a number of pixels on a top neighboring region of the current block.

5. The intra prediction image generation device according to claim 1, wherein
in the case that the left CCLM model of the three cross-component linear models is specified,
the prediction parameters are derived by using a number of pixels on a left neighboring region of the current block.

6. The intra prediction image generation device according to claim 1, wherein
in the case that the combining CCLM model of the three cross-component linear models is specified,
the prediction parameters are derived by using a number of pixels on a top neighboring region and a number of pixels on a left neighboring region.

* * * * *